United States Patent
You et al.

(10) Patent No.: US 12,124,007 B2
(45) Date of Patent: Oct. 22, 2024

(54) OPTICAL IMAGING LENS

(71) Applicant: ZHEJIANG SUNNY OPTICS CO., LTD., Zhejiang (CN)

(72) Inventors: Xinghai You, Zhejiang (CN); Kaiyuan Zhang, Zhejiang (CN); Lin Huang, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 814 days.

(21) Appl. No.: 17/256,662

(22) PCT Filed: Apr. 26, 2019

(86) PCT No.: PCT/CN2019/084431
§ 371 (c)(1),
(2) Date: Dec. 29, 2020

(87) PCT Pub. No.: WO2020/019794
PCT Pub. Date: Jan. 30, 2020

(65) Prior Publication Data
US 2021/0364754 A1 Nov. 25, 2021

(30) Foreign Application Priority Data
Jul. 26, 2018 (CN) .......................... 201810831543.6

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ...... G02B 13/0045; G02B 9/64; G02B 13/06; G02B 13/18
See application file for complete search history.

(56) References Cited

U.S. PATENT DOCUMENTS

2017/0329108 A1  11/2017  Hashimoto
2018/0180856 A1   6/2018  Jung et al.

FOREIGN PATENT DOCUMENTS

| CN | 106443987 A | 2/2017 | |
| CN | 106896473 A * | 6/2017 | ......... G02B 13/0045 |
| CN | 107656358 A * | 2/2018 | ............. G02B 13/00 |

(Continued)

OTHER PUBLICATIONS

Corresponding CN first search results issued on Jan. 19, 2023.

*Primary Examiner* — Wyatt A Stoffa
*Assistant Examiner* — Ray Alexander Dean
(74) *Attorney, Agent, or Firm* — Samson G. Yu

(57) ABSTRACT

An optical imaging lens sequentially includes, from an object side to an image side along an optical axis, a first lens (E1), a second lens (E2), a third lens (E3), a fourth lens (E4), a fifth lens (E5), a sixth lens (E6), a seventh lens (E7) and an eighth lens (E8) with refractive power. An object-side surface (S1) of the first lens (E1) is a convex surface. The fourth lens (E4) has positive refractive power. The seventh lens (E7) has negative refractive power, and an object-side surface (S13) thereof is a convex surface. There is an air space between any two adjacent lenses in the first lens (E1) to the eighth lens (E8). An effective focal length f1 of the first lens (E1) and an effective focal length f4 of the fourth lens (E4) meet $1.7<|f4/f1|<4$.

11 Claims, 23 Drawing Sheets

(56) References Cited

FOREIGN PATENT DOCUMENTS

| CN | 107703609 | A | | 2/2018 | |
|---|---|---|---|---|---|
| CN | 107741630 | A | | 2/2018 | |
| CN | 108121053 | A | | 6/2018 | |
| CN | 108254856 | A | | 7/2018 | |
| CN | 108254890 | A | * | 7/2018 | ............ G02B 1/041 |
| CN | 108646394 | A | | 10/2018 | |
| CN | 208607420 | A | | 3/2019 | |
| JP | 2016065906 | A | | 4/2016 | |

* cited by examiner

OPTICAL IMAGING LENS

CROSS-REFERENCE TO RELATED APPLICATION(S)

The disclosure claims priority to and the benefit of Chinese Patent Application No. 201810831543.6, filed in the China National Intellectual Property Administration (CNIPA) on Jul. 26, 2018, which is incorporated herein by reference in its entirety.

TECHNICAL FIELD

The disclosure relates to an optical imaging lens, and more particularly to an optical imaging lens including eight lenses.

BACKGROUND

In recent years, along with the rapid development of portable electronic products with an imaging function, requirements on miniature optical systems have also increased. An imaging lens usually includes two main types of photosensitive elements, i.e., a Charge Coupled Device (CCD) or a Complementary Metal Oxide Semiconductor (CMOS). Along with the progress of semiconductor fabrication technologies, the number of pixels of a photosensitive element has increased and sizes of the pixels have been reduced, so that higher requirements are made to high imaging quality and miniaturization of a matched imaging lens.

Reduction of sizes of pixels means decrease of a luminous flux of a lens in the same exposure time. However, under the condition of a dark environment, a lens requires a relatively high luminous flux to ensure the imaging quality. An F-number Fno usually configured for an existing lens (a total effective focal length of the lens/entrance pupil diameter of the lens) is 2.0 or above 2.0. Such a lens may meet a miniaturization requirement, but the imaging quality of the lens may not be ensured under the condition of inadequate light (for example, in rainy days and at dusk), shaking and the like. Therefore, a lens applicable to a portable electronic product and with a large aperture is needed to implement high-resolution imaging under the condition of inadequate light (for example, in rainy days and at dusk).

SUMMARY

Some embodiments of the disclosure provides an optical imaging lens applicable to a portable electronic product and capable of at least overcoming or partially overcoming at least one shortcoming in a related art.

An embodiment of the disclosure provides an optical imaging lens, which sequentially includes, from an object side to an image side along an optical axis, a first lens, a second lens, a third lens, a fourth lens, a fifth lens, a sixth lens, a seventh lens and an eighth lens with refractive power, wherein an object-side surface of the first lens may be a convex surface; the fourth lens may have positive refractive power; the seventh lens may have negative refractive power, and an object-side surface thereof may be a convex surface; and there may be an air space between any two adjacent lenses in the first lens to the eighth lens.

In an implementation mode, an effective focal length f1 of the first lens and an effective focal length f4 of the fourth lens may meet $1.7<|f4/f1|<4$.

In an implementation mode, a total effective focal length f of the optical imaging lens and an effective focal length f7 of the seventh lens may meet $-1<f/f7<0$.

In an implementation mode, a total effective focal length f of the optical imaging lens and a curvature radius R1 of the object-side surface of the first lens may meet $0<R1/f<1$.

In an implementation mode, a curvature radius R13 of the object-side surface of the seventh lens and a curvature radius R14 of an image-side surface of the seventh lens may meet $0<(R13-R14)/(R13+R14)<0.5$.

In an implementation mode, a curvature radius R3 of an object-side surface of the second lens and a curvature radius R4 of an image-side surface of the second lens may meet $0<|R4/R3|<1.5$.

In an implementation mode, a center thickness CT1 of the first lens on the optical axis and a center thickness CT5 of the fifth lens on the optical axis may meet $0<CT5/CT1<1$.

In an implementation mode, a spacing distance T12 between the first lens and the second lens on the optical axis, a spacing distance T23 between the second lens and the third lens on the optical axis, a spacing distance T34 between the third lens and the fourth lens on the optical axis and a spacing distance T45 between the fourth lens and the fifth lens on the optical axis may meet $0.5<(T12+T23+T34)/T45<1.5$.

In an implementation mode, a total effective focal length f of the optical imaging lens and a center thickness CT8 of the eighth lens on the optical axis may meet $0<CT8/f<0.5$.

In an implementation mode, a maximum effective semi-diameter DT32 of an image-side surface of the third lens and a maximum effective semi-diameter DT81 of an object-side surface of the eighth lens may meet $0<DT32/DT81<0.5$.

In an implementation mode, a total effective focal length f of the optical imaging lens, a spacing distance T56 between the fifth lens and the sixth lens on the optical axis and a maximum half field of view HFOV of the optical imaging lens may meet $0.5 \text{ mm}^2 < T56 * f * \tan(HFOV) < 1 \text{ mm}^2$.

In an implementation mode, TTL is a distance from the object-side surface of the first lens to an imaging surface of the optical imaging lens on the optical axis, ImgH is a half of a diagonal length of an effective pixel region on the imaging surface of the optical imaging lens, TTL and ImgH meet $TTL/ImgH<1.6$.

In an implementation mode, TTL is a distance from the object-side surface of the first lens to the imaging surface of the optical imaging lens on the optical axis, a sum $\Sigma AT$ of center thicknesses of the first lens to the eighth lens on the optical axis and TTL meet $0.5 \leq \Sigma CT/TTL<0.8$.

According to the disclosure, the eight lenses are adopted, and the refractive power of each lens, a surface type, the center thickness of each lens, on-axis distances between the lenses and the like are reasonably configured to achieve at least one beneficial effect of ultra-small thickness, small size, large aperture, high imaging quality and the like of the optical imaging lens.

BRIEF DESCRIPTION OF THE DRAWINGS

Detailed descriptions are made to unrestrictive implementation modes below in combination with the drawings to make the other characteristics, purposes and advantages of the disclosure more apparent. In the drawings.

DETAILED DESCRIPTION OF THE EMBODIMENTS

Figure 1:
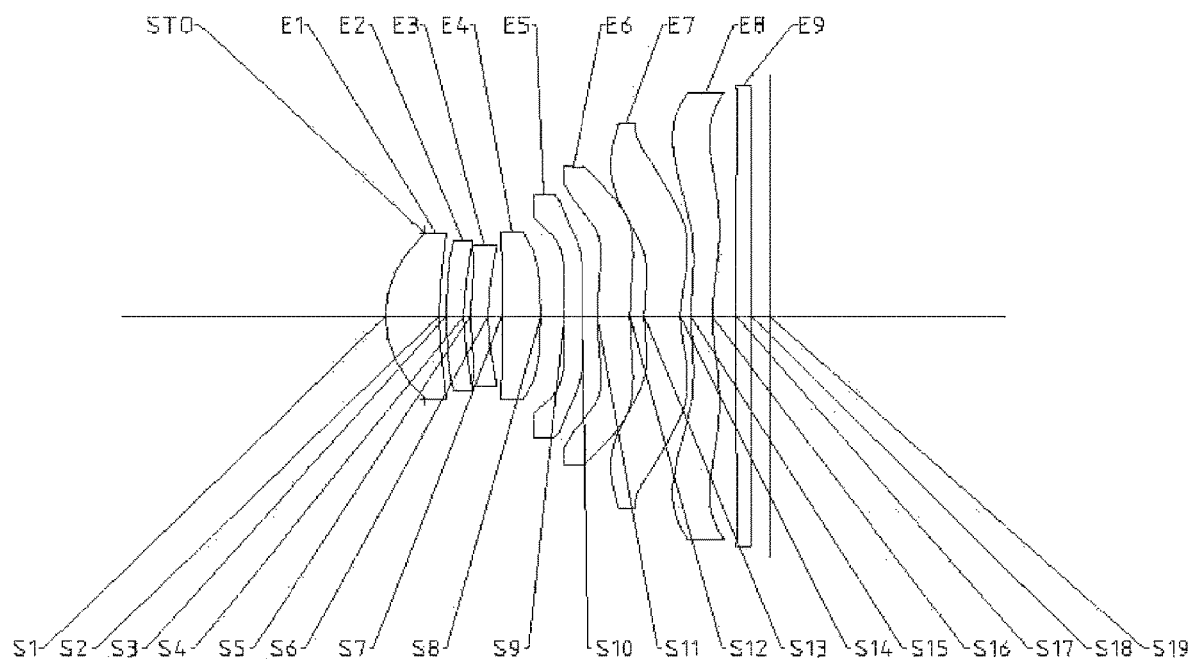
FIG. 1 shows a structure diagram of an optical imaging lens according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It is to be noted that, in the specification, expressions like first, second and third are adopted not to represent any limit to characteristics but only to distinguish one characteristic from another characteristic. Therefore, a first lens discussed below may also be called a second lens or a third lens under the condition of not departing from the teachings of the disclosure.

In the drawings, the thickness, size and shape of the lens have been slightly exaggerated for ease illustration. In particular, a spherical shape or an aspherical shape shown in the drawings is shown by some embodiments. That is, the spherical shape or the aspherical shape is not limited to the spherical shape or the aspherical shape shown in the drawings. The drawings are by way of example only and not strictly to scale.

In the disclosure, a paraxial region refers to a region nearby an optical axis. If a surface of a lens is a convex surface and a position of the convex surface is not defined, it is indicated that at least a paraxial region of the surface of the lens is a convex surface; and if a surface of a lens is a concave surface and a position of the concave surface is not defined, it is indicated that at least a paraxial region of the surface of the lens is a concave surface. In each lens, a surface close to an object side is called an object-side surface of the lens. In each lens, a surface close to an image side is called an image-side surface of the lens.

It is also to be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments of the disclosure and characteristics in the embodiments may be combined without conflicts. The disclosure will be described below with reference to the drawings and in combination with the embodiments in detail. The features, principles and other aspects of the disclosure will be described below in detail.

An optical imaging lens according to an exemplary implementation mode of the disclosure may include, for example, eight lenses with refractive power, i.e., a first lens, a second lens, a third lens, a fourth lens, a fifth lens, a sixth lens, a seventh lens and an eighth lens. The eight lenses are sequentially arranged from an object side to an image side along an optical axis, and there may be air spaces between adjacent lenses.

In the exemplary implementation mode, the first lens has positive refractive power or negative refractive power, and an object-side surface thereof may be a convex surface; the second lens has positive refractive power or negative refractive power; the third lens has positive refractive power or negative refractive power; the fourth lens may have positive refractive power; the fifth lens has positive refractive power or negative refractive power; the sixth lens has positive refractive power or negative refractive power; the seventh lens may have negative refractive power, and an object-side surface thereof may be a convex surface; and the eighth lens has positive refractive power or negative refractive power. A surface type of the object-side surface of the first lens, the refractive power of the fourth lens, the refractive power of the seventh lens and a surface type of the object-side surface thereof are limited, so that the optical imaging lens is endowed with high imaging quality.

In the exemplary implementation mode, an image-side surface of the first lens may be a concave surface.

In the exemplary implementation mode, an object-side surface of the second lens may be a convex surface, and an image-side surface may be a concave surface.

In the exemplary implementation mode, an object-side surface of the third lens may be a convex surface, and an image-side surface may be a concave surface.

In the exemplary implementation mode, an object-side surface of the fourth lens may be a convex surface, and an image-side surface may be a convex surface.

In the exemplary implementation mode, an object-side surface of the sixth lens may be a convex surface, and an image-side surface may be a concave surface.

In the exemplary implementation mode, an image-side surface of the seventh lens may be a concave surface.

In the exemplary implementation mode, the eighth lens may have negative refractive power, an object-side surface thereof may be a convex surface, and an image-side surface may be a concave surface.

In the exemplary implementation mode, the optical imaging lens of the disclosure may meet a conditional expression $1.7<|f4/f1|<4$, where f1 is an effective focal length of the first lens, and f4 is an effective focal length of the fourth lens. More specifically, f4 and f1 may further meet $2.16≤|f4/f1|≤3.51$. Reasonable refractive power distribution is favorable for achieving the characteristics of high pixel, low sensitivity, easiness for machining and the like of a system.

In the exemplary implementation mode, the optical imaging lens of the disclosure may meet a conditional expression $-1<f1/f7<0$, where f is a total effective focal length of the optical imaging lens, and f7 is an effective focal length of the seventh lens. More specifically, f and f7 may further meet $-0.5≤f/f7≤-0.1$, for example, $-0.35≤f/f7≤-0.29$. A ratio of the total effective focal length of the optical imaging lens to the effective focal length of the seventh lens is restricted, so that a spherical aberration generated by the seventh lens may be used for balancing a spherical aberration generated by the first lens to the six lens to further finely adjust and control a spherical aberration of the system to implement accurate control over an aberration of an on-axis field of view.

In the exemplary implementation mode, the optical imaging lens of the disclosure may meet a conditional expression $0<R1/f<1$, where f is the total effective focal length of the optical imaging lens, and R1 is a curvature radius of the object-side surface of the first lens. More specifically, f and R1 may further meet $0.3≤R1/f≤0.5$, for example, $0.40≤R1/f≤0.42$. The curvature radius of the object-side surface of the first lens is reasonably controlled, so that a contribution rate of a fifth-order spherical aberration of the first lens may be controlled to a certain extent to ensure that the fifth-order spherical aberration that the first lens contributes may balance fifth-order spherical aberrations generated by the other lenses at the image-side surfaces to further control a fifth-order spherical aberration of the system in a reasonable range.

In the exemplary implementation mode, the optical imaging lens of the disclosure may meet a conditional expression $0<(R13-R14)/(R13+R14)<0.5$, where R13 is a curvature radius of the object-side surface of the seventh lens, and R14 is a curvature radius of the image-side surface of the seventh lens. More specifically, R13 and R14 may further meet $0.17≤(R13-R14)/(R13+R14)≤0.21$. The curvature radii of the object-side surface and the image-side surface of the seventh lens are reasonably controlled, so that astigmatism contributions of the object-side surface and the image-side surface may be effectively controlled to further control the image quality of middle field of view region and an aperture band reasonably and effectively.

In the exemplary implementation mode, the optical imaging lens of the disclosure may meet a conditional expression $0<|R4/R3|<1.5$, where R3 is a curvature radius of the object-side surface of the second lens, and R4 is a curvature radius of the image-side surface of the second lens. More specifically, R3 and R4 may further meet $0.3≤|R4/R3|≤1.2$, for example, $0.41≤|R4/R3|≤0.99$. A ratio of the curvature radius of the object-side surface of the second lens to the curvature radius of the image-side surface is limited, so that a shape of the second lens may be effectively restricted to further effectively control aberration contributions of the object-side surface and the image-side surface of the second lens and effectively improve the imaging quality of the system.

In the exemplary implementation mode, the optical imaging lens of the disclosure may meet a conditional expression $0<CT5/CT1<1$, where CT1 is a center thickness of the first lens on the optical axis, and CT5 is a center thickness of the fifth lens on the optical axis. More specifically, CT1 and CT5 may further meet $0.2≤CT5/CT1≤0.6$, for example, $0.35≤CT5/CT1≤0.50$. The center thicknesses of the first lens and the fifth lens are reasonably controlled to make distortion contributions of the first and fifth lenses in a reasonable range and further make a final distribution of each field of view in 2% to avoid a software post-debugging requirement.

In the exemplary implementation mode, the optical imaging lens of the disclosure may meet a conditional expression $TTL/ImgH<1.6$, where TTL is a distance from the object-side surface of the first lens to an imaging surface of the optical imaging lens on the optical axis, and ImgH is a half of a diagonal length of an effective pixel region on the imaging surface of the optical imaging lens. More specifically, TTL and ImgH may further meet $1.38≤TTL/ImgH≤1.40$. A ratio of the on-axis distance from the object-side surface of the first lens to the imaging surface to a half of the diagonal length of the effective pixel region on the imaging surface may be reasonably restricted to simultaneously achieve ultra-small thickness and high pixel of the optical imaging lens.

In the exemplary implementation mode, the optical imaging lens of the disclosure may meet a conditional expression $0.5<(T12+T23+T34)/T45<1.5$, where T12 is a spacing distance between the first lens and the second lens on the optical axis, T23 is a spacing distance between the second lens and the third lens on the optical axis, T34 is a spacing distance between the third lens and the fourth lens on the optical axis, and T45 is a spacing distance between the fourth lens and the fifth lens on the optical axis. More specifically, T12, T23, T34 and T45 may further meet $0.7≤(T12+T23+T34)/T45:1.3$, for example, $0.95≤(T12+T23+T34)/T45≤1.18$. The air spaces between the first lens and the second lens, between the second lens and the third lens, between the third lens and the fourth lens and between the fourth lens and the fifth lens on the optical axis may be reasonably restricted to effectively balance a curvature of field generated by a previous lens and a curvature of field generated by the next, thereby controlling a curvature of field of the system in a reasonable range.

In the exemplary implementation mode, the optical imaging lens of the disclosure may meet a conditional expression $0<CT8/f<0.5$, where f is the total effective focal length of the optical imaging lens, and CT8 is a center thickness of the eighth lens on the optical axis. More specifically, f and CT8 may further meet $0<CT8/f≤0.2$, for example, $0.07≤CT8/f≤0.08$. The total effective focal length of the optical imaging lens and the center thickness of the eighth lens on the optical axis may be controlled to reasonably restrict a third-order distortion contribution of the eighth lens and improve the image quality of an edge field of view to further achieve high imaging quality of the system.

In the exemplary implementation mode, the optical imaging lens of the disclosure may meet a conditional expression 0<DT32/DT81<0.5, where DT32 is a maximum effective semi-diameter of the image-side surface of the third lens, and DT81 is a maximum effective semi-diameter of the object-side surface of the eighth lens. More specifically, DT32 and DT81 may further meet 0.1≤DT32/DT81≤0.4, for example, 0.26≤DT32/DT81≤0.29. A ratio of the maximum effective semi-diameter of the image-side surface of the third lens to the maximum effective semi-diameter of the object-side surface of the eighth lens may be reasonably controlled to effectively reduce the size of the lens, meet a miniaturization requirement and improve the resolving power of the lens.

In the exemplary implementation mode, the optical imaging lens of the disclosure may meet a conditional expression 0.5 mm$^2$<T56*f*tan(HFOV)<1 mm$^2$, where f is the total effective focal length of the optical imaging lens, T56 is a spacing distance between the fifth lens and the sixth lens on the optical axis, and HFOV is a maximum half field of view of the optical imaging lens. More specifically, T56, f and HFOV may further meet a conditional expression 0.64 mm$^2$≤T56*f*tan(HFOV)≤0.81 mm$^2$. The air space between the fifth lens and the sixth lens on the optical axis is optimized, and an image height is limited, so that it may be ensured that the lens is matched with a chip with a large image surface, and achievement of the characteristics of high pixel, low sensitivity, easiness for machining and the like of the system is facilitated.

In the exemplary implementation mode, the optical imaging lens of the disclosure may meet a conditional expression 0.5≤ΣCT/TTL<0.8, where ΣCT is a sum of the center thicknesses of the first lens to the eighth lens on the optical axis, and TTL is the distance from the object-side surface of the first lens to the imaging surface of the optical imaging lens on the optical axis. More specifically, ΣCT and TTL may further meet 0.61≤ΣCT/TTL≤0.63. A range of the sum of the center thicknesses of the first lens to the eighth lens on the optical axis may be controlled to effectively balance the distribution generated by each lens to achieve high distortion performance of the optical imaging lens.

In the exemplary implementation mode, the optical imaging lens may further include a diaphragm to improve the imaging quality of the lens. The diaphragm may be arranged at any position as required. For example, the diaphragm may be arranged between the object side and the first lens.

Optionally, the optical imaging lens may further include an optical filter configured to correct the chromatic aberration and/or protective glass configured to protect a photosensitive element on the imaging surface.

The optical imaging lens according to the implementation mode of the disclosure may adopt multiple lenses, for example, the abovementioned eight lenses. By reasonable distribution of the refractive power of each lens and optimization selection of a high-order aspherical parameter, the disclosure discloses an ultra-thin large-aperture eight-lens optical imaging lens with high imaging quality. Furthermore, the center thickness of each lens, on-axis distances between the lenses and the like are reasonably configured to effectively reduce the size of the imaging lens, reduce the sensitivity of the imaging lens, improve the manufacturability of the imaging lens and ensure that the optical imaging lens is more favorable for production and machining and may be applied to a portable electronic product.

In the implementation mode of the disclosure, at least one of mirror surfaces of the lenses is an aspherical mirror surface. An aspherical lens has a characteristic that a curvature keeps changing from a center of the lens to a periphery of the lens. Unlike a spherical lens with a constant curvature from a center of the lens to a periphery of the lens, an aspherical lens has a better curvature radius characteristic and the advantages of improving distortions and improving astigmatic aberrations. With adoption of the aspherical lens, the astigmatic aberrations during imaging may be eliminated as much as possible, thereby improving the imaging quality.

However, those skilled in the art should know that the number of the lenses forming the optical imaging lens may be changed without departing from the technical solutions claimed in the disclosure to achieve each result and advantage described in the specification. For example, although descriptions are made in the implementation with eight lenses as an example, the optical imaging lens is not limited to eight lenses. If necessary, the optical imaging lens may further include another number of lenses. Specific embodiments of the optical imaging lens applied to the abovementioned implementation mode will further be described below with reference to the drawings.

Embodiment 1

An optical imaging lens according to embodiment 1 of the disclosure will be described below with reference to FIG. 1 to FIG. 2D. FIG. 1 shows a structure diagram of an optical imaging lens according to embodiment 1 of the disclosure.

As shown in FIG. 1, the optical imaging lens according to an exemplary implementation mode of the disclosure sequentially includes, from an object side to an image side along an optical axis, a diaphragm STO, a first lens E1, a first lens E2, a third lens E3, a fourth lens E4, a fifth lens E5, a sixth lens E6, a seventh lens E7, an eighth lens E8, an optical filter E9 and an imaging surface S19.

The first lens E1 has positive refractive power, an object-side surface S1 thereof is a convex surface, and an image-side surface S2 is a concave surface. The second lens E2 has negative refractive power, an object-side surface S3 thereof is a convex surface, and an image-side surface S4 is a concave surface. The third lens E3 has negative refractive power, an object-side surface S5 thereof is a convex surface, and an image-side surface S6 is a concave surface. The fourth lens E4 has positive refractive power, an object-side surface S7 thereof is a convex surface, and an image-side surface S8 is a convex surface. The fifth lens E5 has negative refractive power, an object-side surface S9 thereof is a convex surface, and an image-side surface S10 is a concave surface. The sixth lens E6 has positive refractive power, an object-side surface S11 thereof is a convex surface, and an image-side surface S12 is a concave surface. The seventh lens E7 has negative refractive power, an object-side surface S13 thereof is a convex surface, and an image-side surface S14 is a concave surface. The eighth lens E8 has negative refractive power, an object-side surface S15 thereof is a convex surface, and an image-side surface S is a concave surface. The optical filter E9 has an object-side surface S17 and an image-side surface S18. Light from an object sequentially penetrates through each of the surfaces S1 to S18 and is finally imaged on the imaging surface S19.

Table 1 shows a surface type, curvature radius, thickness, material and Conic coefficient of each lens of the optical imaging lens according to embodiment 1. Units of the curvature radius and the thickness are millimeter (mm).

TABLE 1

| Surface number | Surface type | Curvature radius | Thickness | Material Refractive index | Material Abbe number | Conic coefficient |
|---|---|---|---|---|---|---|
| OBJ | Spherical | Infinite | Infinite | | | |
| STO | Spherical | Infinite | −0.5448 | | | |
| S1 | Aspherical | 1.8264 | 0.7549 | 1.54 | 56.11 | −0.0509 |
| S2 | Aspherical | 5.1200 | 0.0990 | | | −16.0771 |
| S3 | Aspherical | 6.6246 | 0.2500 | 1.64 | 23.53 | −56.1493 |
| S4 | Aspherical | 4.1881 | 0.0921 | | | −4.4078 |
| S5 | Aspherical | 4.1849 | 0.2500 | 1.68 | 19.25 | −0.5612 |
| S6 | Aspherical | 3.9024 | 0.1947 | | | −0.4713 |
| S7 | Aspherical | 13.8260 | 0.5487 | 1.55 | 56.11 | 94.2702 |
| S8 | Aspherical | −12.0010 | 0.3321 | | | −34.1985 |
| S9 | Aspherical | 24.4734 | 0.2626 | 1.64 | 23.53 | 27.5730 |
| S10 | Aspherical | 24.2017 | 0.2080 | | | 89.5295 |
| S11 | Aspherical | 6.5994 | 0.4611 | 1.68 | 19.25 | 0.7795 |
| S12 | Aspherical | 7.4372 | 0.1992 | | | 5.0755 |
| S13 | Aspherical | 2.5818 | 0.5032 | 1.54 | 55.87 | −0.8035 |
| S14 | Aspherical | 1.8153 | 0.1545 | | | −0.8366 |
| S15 | Aspherical | 4.7745 | 0.3000 | 1.68 | 19.25 | −21.6561 |
| S16 | Aspherical | 3.5153 | 0.3420 | | | −1.1578 |
| S17 | Spherical | Infinite | 0.2100 | 1.52 | 64.17 | |
| S18 | Spherical | Infinite | 0.2578 | | | |
| S19 | Spherical | Infinite | Infinite | | | |

From Table 1, it can be seen that both the object-side surface and the image-side surface of any lens in the first lens E1 to the eighth lens E8 are aspherical surfaces. In the embodiment, the surface type x of each aspherical lens may be defined by use of, but not limited to, the following aspherical surface formula:

$$x = \frac{ch^2}{1 + \sqrt{1 - (k+1)c^2h^2}} + \Sigma A_i h^i \quad (1)$$

wherein, x is the distance vector height from a vertex of the aspherical surface when the aspherical surface is at a height of h along the optical axis direction; c is a paraxial curvature of the aspherical surface, c=1/R (namely, the paraxial curvature c is a reciprocal of the curvature radius R in Table 1); k is the Conic coefficient (given in Table 1); and Ai is the correction coefficient of the i-th order of the aspherical surface. Table 2 shows higher-order coefficients $A_4$, $A_6$, $A_8$, $A_{10}$, $A_{12}$, $A_{14}$, $A_{16}$, $A_{18}$ and $A_{20}$ that can be used for each of aspherical mirror surfaces S1-S16 in embodiment 1.

TABLE 2

| Surface number | A4 | A6 | A8 | A10 | A12 |
|---|---|---|---|---|---|
| S1 | 1.1242E−03 | −1.8631E−02 | 6.5148E−02 | −1.3533E−01 | 1.6995E−01 |
| S2 | −2.1603E−02 | 6.0628E−04 | −3.4296E−03 | 3.5992E−02 | −6.0929E−02 |
| S3 | −1.3090E−02 | 6.3036E−04 | 3.8997E−02 | −6.9467E−02 | 1.0714E−01 |
| S4 | −6.2714E−03 | 1.6316E−03 | −7.9506E−03 | 4.8960E−02 | −1.1987E−01 |
| S5 | −5.3482E−02 | −2.4317E−02 | 6.7723E−02 | −2.6032E−01 | 5.7664E−01 |
| S6 | −3.8667E−02 | 3.0657E−02 | −1.9506E−01 | 6.7128E−01 | −1.3756E+00 |
| S7 | −3.0401E−02 | 8.3030E−03 | −5.9337E−02 | 1.0036E−01 | −7.5086E−02 |
| S8 | −3.5876E−02 | −5.8289E−03 | −5.6966E−03 | −6.3097E−03 | 2.6249E−02 |
| S9 | −3.4846E−02 | 4.5482E−03 | −1.3642E−01 | 3.4833E−01 | −4.6712E−01 |
| S10 | 5.5981E−03 | −1.4512E−01 | 1.7128E−01 | −1.1747E−01 | 4.3287E−02 |
| S11 | 5.9653E−02 | −1.4734E−01 | 1.1885E−01 | −6.8597E−02 | 2.4228E−02 |
| S12 | −1.3599E−02 | −1.0375E−02 | −1.4009E−03 | 2.2594E−03 | −9.4126E−04 |
| S13 | −2.7452E−01 | 1.0558E−01 | −2.4342E−02 | 4.1465E−03 | −5.6102E−04 |
| S14 | −2.4184E−01 | 1.1543E−01 | −4.6149E−02 | 1.3091E−02 | −2.4293E−03 |
| S15 | −5.6783E−02 | 1.2652E−02 | −1.4311E−03 | 9.8037E−05 | −4.1036E−06 |
| S16 | −6.5382E−02 | 1.4773E−02 | −2.2544E−03 | 2.3117E−04 | −1.4749E−05 |

| Surface number | A14 | A16 | A18 | A20 |
|---|---|---|---|---|
| S1 | −1.3303E−01 | 6.3212E−02 | −1.6761E−02 | 1.8955E−03 |
| S2 | 4.9417E−02 | −2.1284E−02 | 4.3464E−03 | −2.3812E−04 |
| S3 | −1.2321E−01 | 8.8731E−02 | −3.4816E−02 | 5.7553E−03 |
| S4 | 1.3472E−01 | −8.7297E−02 | 3.0098E−02 | −4.4023E−03 |
| S5 | −7.6183E−01 | 5.9379E−01 | −2.5106E−01 | 4.3988E−02 |
| S6 | 1.7647E+00 | −1.3393E+00 | 5.7742E−01 | −1.0339E−01 |
| S7 | −5.0850E−02 | 1.4211E−01 | −1.0267E−01 | 2.6731E−02 |
| S8 | −4.4203E−02 | 3.7605E−02 | −1.6474E−02 | 3.0529E−03 |
| S9 | 3.5973E−01 | −1.6115E−01 | 3.8894E−02 | −3.8818E−03 |

TABLE 2-continued

| | | | | |
|---|---|---|---|---|
| S10 | −5.4999E−03 | −1.752E−03 | 4.3633E−04 | −3.7637E−05 |
| S11 | −4.7010E−03 | 4.3229E−04 | −7.4303E−06 | −9.8345E−07 |
| S12 | 2.2373E−04 | −2.9001E−05 | 1.7098E−06 | −2.3707E−08 |
| S13 | 5.8132E−05 | −4.1546E−06 | 1.7624E−07 | −3.2876E−09 |
| S14 | 2.8484E−04 | −2.0232E−05 | 7.9264E−07 | −1.3123E−08 |
| S15 | 1.0547E−07 | −1.6319E−09 | 1.4019E−11 | −5.1597E−14 |
| S16 | 5.6724E−07 | −1.2757E−08 | 1.5443E−10 | −7.7739E−13 |

Table 3 shows ImgH (ImgH is a half of a diagonal length of an effective pixel region on the imaging surface S19), TTL (TTL is a distance from the object-side surface S1 of the first lens E1 to the imaging surface S19 on the optical axis), a maximum half field of view HFOV, an F-number Fno, a total effective focal length f of the optical imaging lens and effective focal lengths f1 to f8 of each lens in embodiment 1.

TABLE 3

| | | | |
|---|---|---|---|
| ImgH (mm) | 3.93 | f3 (mm) | −132.75 |
| TTL (mm) | 5.42 | f4 (mm) | 11.86 |
| HFOV (°) | 41.8 | f5 (mm) | −5443.16 |
| Fno | 1.59 | f6 (mm) | 70.74 |
| f (mm) | 4.33 | f7 (mm) | −14.78 |
| f1 (mm) | 4.81 | f8 (mm) | −21.77 |
| f2 (mm) | −18.41 | | |

Figure 2A:
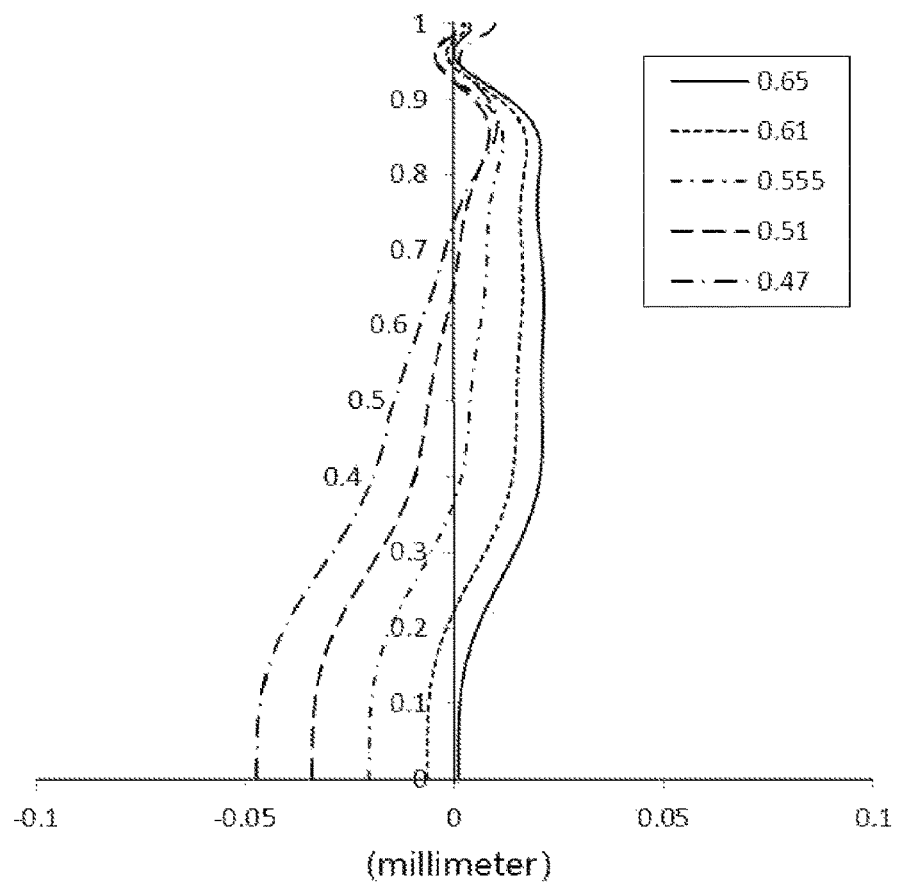
FIG. 2A to FIG. 2D show a longitudinal aberration curve, an astigmatism curve, a distortion curve and a lateral color curve of an optical imaging lens according to embodiment 1 respectively.
Figure 2B:
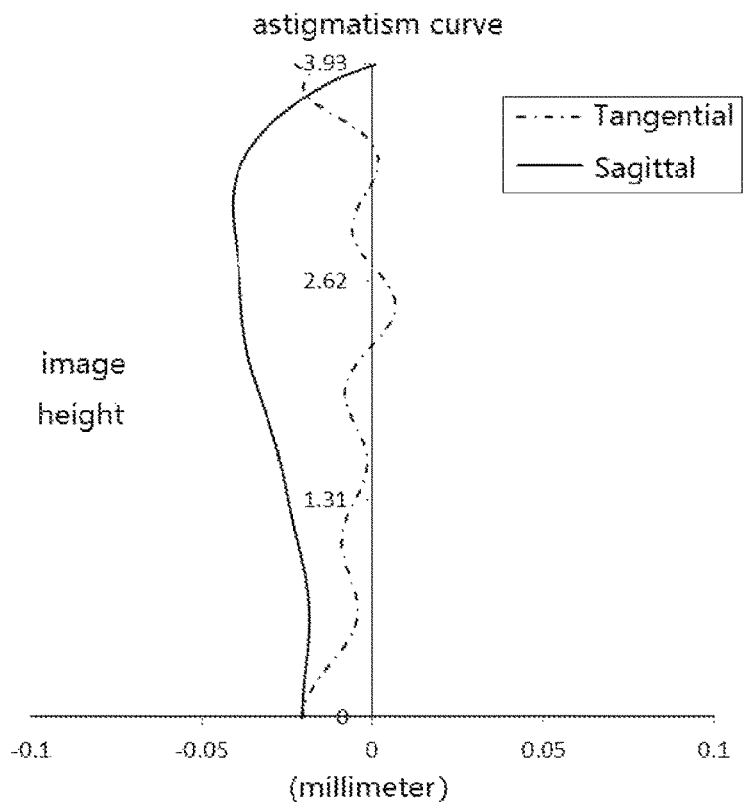
Figure 2C:
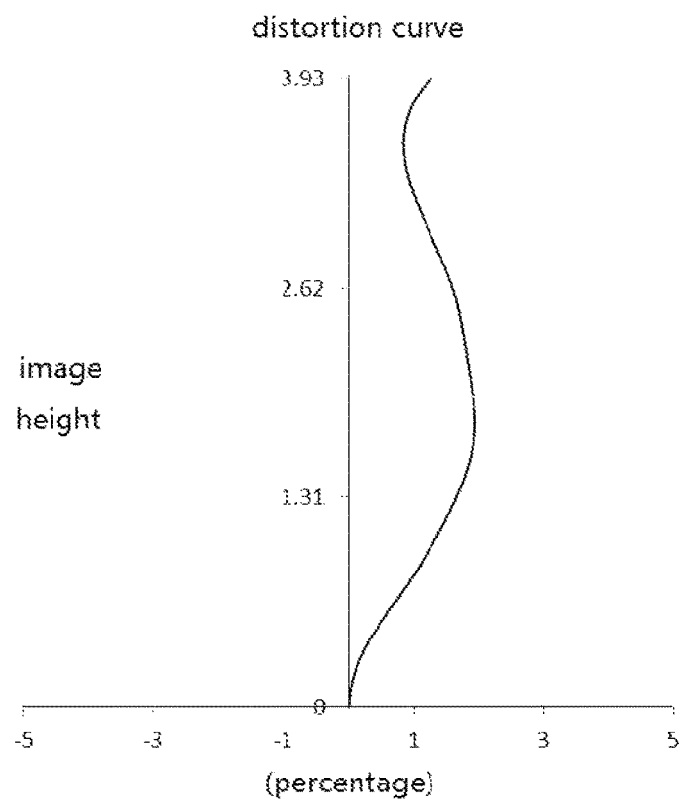
Figure 2D:
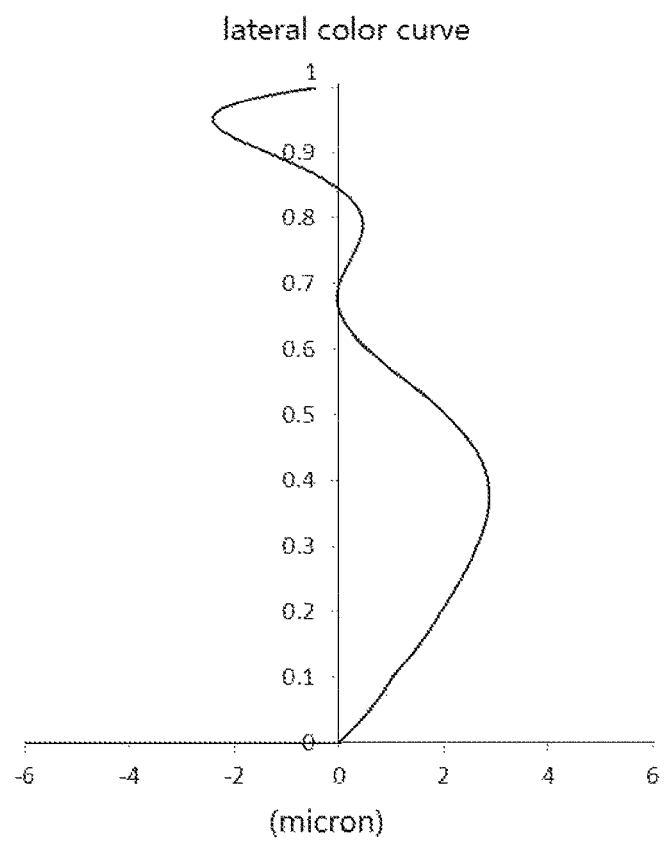

FIG. 2A shows a longitudinal aberration curve of the optical imaging lens according to embodiment 1 to represent deviation of a convergence focal point after light with different wavelengths passes through the lens. FIG. 2B shows an astigmatism curve of the optical imaging lens according to embodiment 1 to represent a meridian image surface curvature and a sagittal image surface curvature. FIG. 2C shows a distortion curve of the optical imaging lens according to embodiment 1 to represent distortion values corresponding to different image heights. FIG. 2D shows a lateral color curve of the optical imaging lens according to embodiment 1 to represent deviation of different image heights on the imaging surface after the light passes through the lens. According to FIG. 2A to FIG. 2D, it can be seen that the optical imaging lens provided in embodiment 1 may achieve high imaging quality.

Embodiment 2

Figure 3:
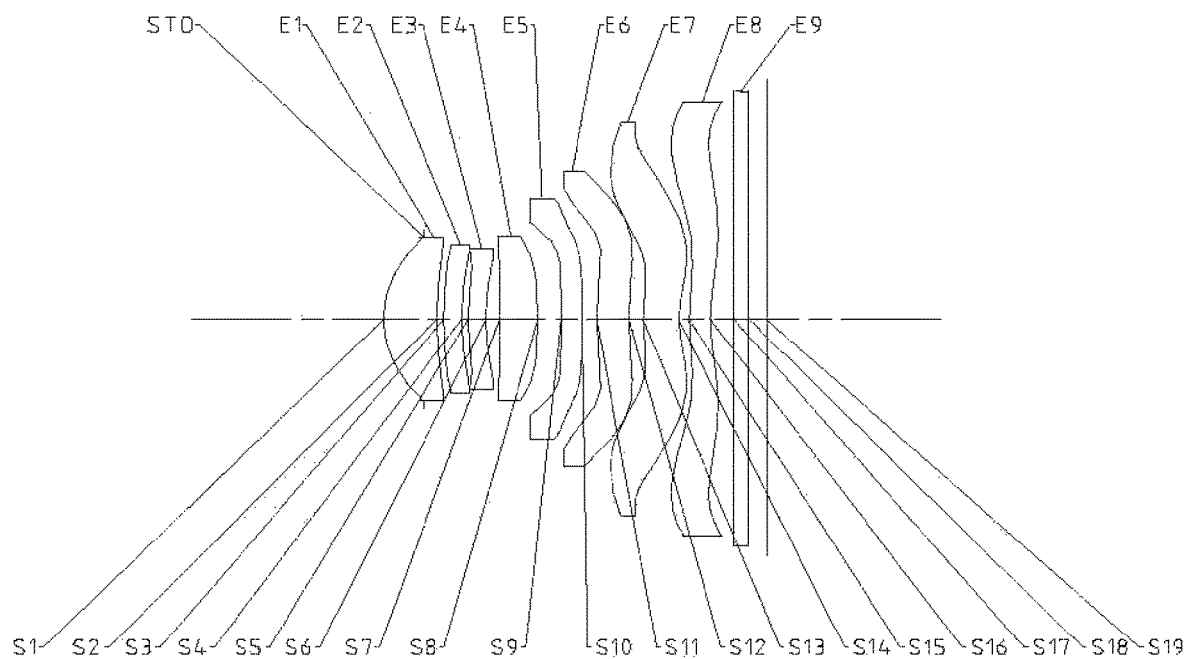
FIG. 3 shows a structure diagram of an optical imaging lens according to embodiment 2 of the disclosure.

An optical imaging lens according to embodiment 2 of the disclosure will be described below with reference to FIG. 3 to FIG. 4D. In the embodiment and the following embodiments, part of descriptions similar to those about embodiment are omitted for simplicity. FIG. 3 shows a structure diagram of an optical imaging lens according to embodiment 2 of the disclosure.

As shown in FIG. 3, the optical imaging lens according to an exemplary implementation mode of the disclosure sequentially includes, from an object side to an image side along an optical axis, a diaphragm STO, a first lens E1, a first lens E2, a third lens E3, a fourth lens E4, a fifth lens E5, a sixth lens E6, a seventh lens E7, an eighth lens E8, an optical filter E9 and an imaging surface S19.

The first lens E1 has positive refractive power, an object-side surface S1 thereof is a convex surface, and an image-side surface S2 is a concave surface. The second lens E2 has negative refractive power, an object-side surface S3 thereof is a convex surface, and an image-side surface S4 is a concave surface. The third lens E3 has negative refractive power, an object-side surface S5 thereof is a convex surface, and an image-side surface S6 is a concave surface. The fourth lens E4 has positive refractive power, an object-side surface S7 thereof is a convex surface, and an image-side surface S8 is a convex surface. The fifth lens E5 has positive refractive power, an object-side surface S9 thereof is a convex surface, and an image-side surface S10 is a concave surface. The sixth lens E6 has positive refractive power, an object-side surface S11 thereof is a convex surface, and an image-side surface S12 is a concave surface. The seventh lens E7 has negative refractive power, an object-side surface S13 thereof is a convex surface, and an image-side surface S14 is a concave surface. The eighth lens E8 has negative refractive power, an object-side surface S15 thereof is a convex surface, and an image-side surface S16 is a concave surface. The optical filter E9 has an object-side surface S17 and an image-side surface S18. Light from an object sequentially penetrates through each of the surfaces S1 to S18 and is finally imaged on the imaging surface S19.

Table 4 shows a surface type, curvature radius, thickness, material and Conic coefficient of each lens of the optical imaging lens according to embodiment 2. Units of the curvature radius and the thickness are millimeter (mm). Table 5 shows high-order coefficients applied to each aspherical mirror surface in embodiment 2. A surface type of each aspherical surface may be defined by formula (1) given in embodiment 1. Table 6 shows ImgH (ImgH is a half of a diagonal length of an effective pixel region on the imaging surface S19), TTL (TTL is a distance from the object-side surface S1 of the first lens E1 to the imaging surface S19 on the optical axis), a maximum half field of view HFOV, an F-number Fno, a total effective focal length f of the optical imaging lens and effective focal lengths f1 to f8 of each lens in embodiment 2.

TABLE 4

| | | | | Material | | |
|---|---|---|---|---|---|---|
| Surface number | Surface type | Curvature radius | Thickness | Refractive index | Abbe number | Conic coefficient |
| OBJ | Spherical | Infinite | Infinite | | | |
| STO | Spherical | Infinite | −0.5652 | | | |
| S1 | Aspherical | 1.8267 | 0.7551 | 1.54 | 56.11 | −0.0498 |
| S2 | Aspherical | 5.1348 | 0.0989 | | | −16.1218 |
| S3 | Aspherical | 6.6484 | 0.2500 | 1.64 | 23.53 | −55.9664 |
| S4 | Aspherical | 4.1693 | 0.0920 | | | −4.4136 |
| S5 | Aspherical | 4.1653 | 0.2500 | 1.68 | 19.25 | −0.4960 |

TABLE 4-continued

| Surface number | Surface type | Curvature radius | Thickness | Material Refractive index | Abbe number | Conic coefficient |
|---|---|---|---|---|---|---|
| S6 | Aspherical | 3.8980 | 0.1921 | | | −0.5691 |
| S7 | Aspherical | 13.6884 | 0.5485 | 1.55 | 56.11 | 93.2526 |
| S8 | Aspherical | −12.2316 | 0.3295 | | | −25.1534 |
| S9 | Aspherical | 24.0363 | 0.3002 | 1.64 | 23.53 | −38.8520 |
| S10 | Aspherical | 24.8431 | 0.2088 | | | 84.9019 |
| S11 | Aspherical | 6.5776 | 0.4595 | 1.68 | 19.25 | 0.8840 |
| S12 | Aspherical | 7.3584 | 0.1999 | | | 5.2542 |
| S13 | Aspherical | 2.5766 | 0.4974 | 1.54 | 55.87 | −0.8032 |
| S14 | Aspherical | 1.8129 | 0.1531 | | | −0.8348 |
| S15 | Aspherical | 4.7522 | 0.3000 | 1.68 | 19.25 | −21.6307 |
| S16 | Aspherical | 3.4753 | 0.3338 | | | −1.1526 |
| S17 | Spherical | Infinite | 0.2100 | 1.52 | 64.17 | |
| S18 | Spherical | Infinite | 0.2497 | | | |
| S19 | Spherical | Infinite | Infinite | | | |

TABLE 5

| Surface number | A4 | A6 | A8 | A10 | A12 |
|---|---|---|---|---|---|
| S1 | 1.1269E−03 | −1.8697E−02 | 6.5454E−02 | −1.3615E−01 | 1.7115E−01 |
| S2 | −2.1507E−02 | 6.0223E−04 | −3.3992E−03 | 3.5593E−02 | −6.0119E−02 |
| S3 | −1.3074E−02 | 6.2924E−04 | 3.8905E−02 | −6.9262E−02 | 1.0676E−01 |
| S4 | −6.2658E−03 | 1.6294E−03 | −7.9365E−03 | 4.8852E−02 | −1.1955E−01 |
| S5 | −5.3515E−02 | −2.4339E−02 | 6.7806E−02 | −2.6072E−01 | 5.7769E−01 |
| S6 | −3.8715E−02 | 3.0715E−02 | −1.9556E−01 | 6.7340E−01 | −1.3808E+00 |
| S7 | −3.0387E−02 | 8.2972E−03 | −5.9282E−02 | 1.0024E−01 | −7.4982E−02 |
| S8 | −3.5947E−02 | −5.8461E−03 | −5.7190E−03 | −6.3406E−03 | 2.6404E−02 |
| S9 | −3.4925E−02 | 4.5635E−03 | −1.3703E−01 | 3.5029E−01 | −4.7027E−01 |
| S10 | 5.5233E−03 | −1.4223E−01 | 1.6674E−01 | −1.1359E−01 | 4.1576E−02 |
| S11 | 5.9537E−02 | −1.4691E−01 | 1.1839E−01 | −6.8263E−02 | 2.4086E−02 |
| S12 | −1.3617E−02 | −1.0396E−02 | −1.4045E−03 | 2.2668E−03 | −9.4495E−04 |
| S13 | −2.7392E−01 | 1.0523E−01 | −2.4237E−02 | 4.1240E−03 | −5.5738E−04 |
| S14 | −2.4196E−01 | 1.1552E−01 | −4.6194E−02 | 1.3107E−02 | −2.4329E−03 |
| S15 | −5.5848E−02 | 1.2302E−02 | −1.3768E−03 | 9.3510E−05 | −3.8830E−06 |
| S16 | −6.4717E−02 | 1.4534E−02 | −2.2070E−03 | 2.2564E−04 | −1.4367E−05 |

| Surface number | A14 | A16 | A18 | A20 |
|---|---|---|---|---|
| S1 | −1.3413E−01 | 6.3809E−02 | −1.6939E−02 | 1.9179E−03 |
| S2 | 4.8651E−02 | −2.0908E−02 | 4.2599E−03 | −2.3287E−04 |
| S3 | −1.2270E−01 | 8.8312E−02 | −3.4631E−02 | 5.7213E−03 |
| S4 | 1.3430E−01 | −8.6988E−02 | 2.9979E−02 | −4.3829E−03 |
| S5 | −7.6346E−01 | 5.9523E−01 | −2.5175E−01 | 4.4122E−02 |
| S6 | 1.7726E+00 | −1.3663E+00 | 5.8071E−01 | −1.0404E−01 |
| S7 | −5.0768E−02 | 1.4185E−01 | −1.0246E−01 | 2.6670E−02 |
| S8 | −4.4507E−02 | 3.7901E−02 | −1.6619E−02 | 3.0829E−03 |
| S9 | 3.6256E−01 | −1.6260E−01 | 3.9289E−02 | −3.9256E−03 |
| S10 | −5.2472E−03 | −1.1136E−03 | 4.1072E−04 | −3.5191E−05 |
| S11 | −4.6690E−03 | 4.2893E−04 | −7.3653E−06 | −9.7391E−07 |
| S12 | 2.2476E−04 | −2.9152E−05 | 1.7199E−06 | −2.3862E−08 |
| S13 | 5.7692E−05 | −4.1186E−06 | 1.7452E−07 | −3.2520E−09 |
| S14 | 2.8533E−04 | −2.0272E−05 | 7.9439E−07 | −1.3156E−08 |
| S15 | 9.8993E−08 | −1.5189E−09 | 1.2937E−11 | −4.7217E−14 |
| S16 | 5.5149E−07 | −1.2378E−08 | 1.4952E−10 | −7.5099E−13 |

TABLE 6

| | | | |
|---|---|---|---|
| ImgH (mm) | 3.93 | f3 (mm) | −144.12 |
| TTL (mm) | 5.43 | f4 (mm) | 11.92 |
| HFOV (°) | 41.8 | f5 (mm) | 1002.15 |
| Fno | 1.59 | f6 (mm) | 73.92 |
| f (mm) | 4.33 | f7 (mm) | −14.75 |
| f1 (mm) | 4.81 | f8 (mm) | −21.09 |
| f2 (mm) | −18.06 | | |

Figure 4A:
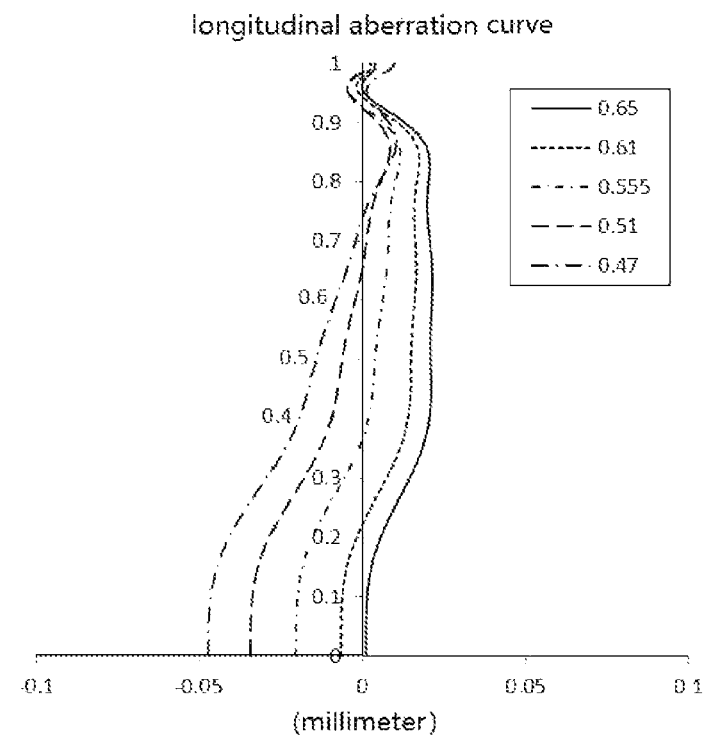
FIG. 4A to FIG. 4D show a longitudinal aberration curve, an astigmatism curve, a distortion curve and a lateral color curve of an optical imaging lens according to embodiment 2 respectively.
Figure 4B:
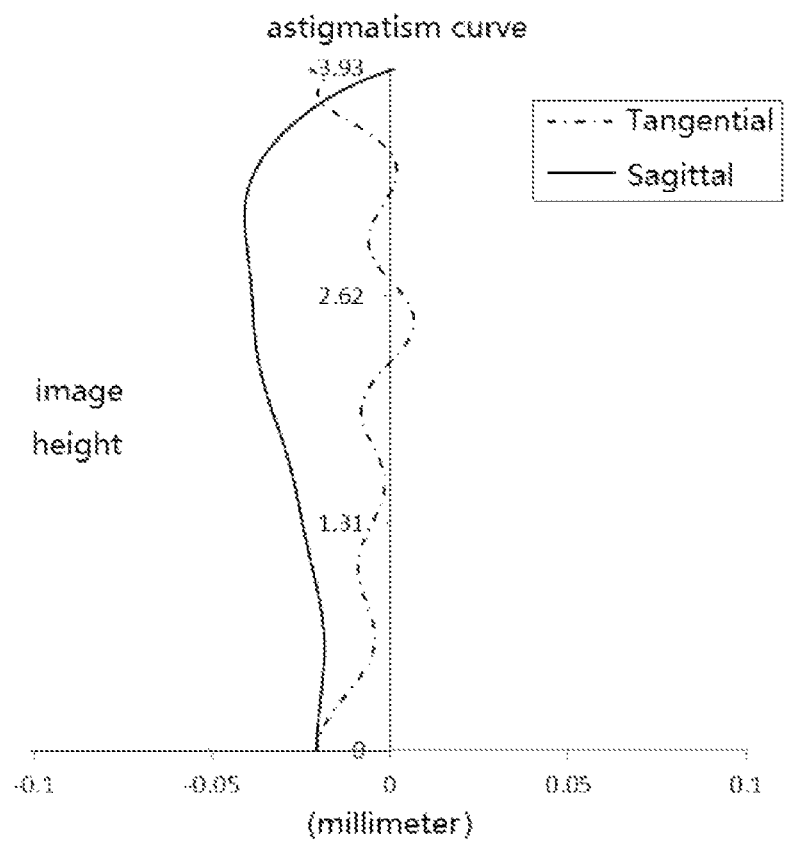
Figure 4C:
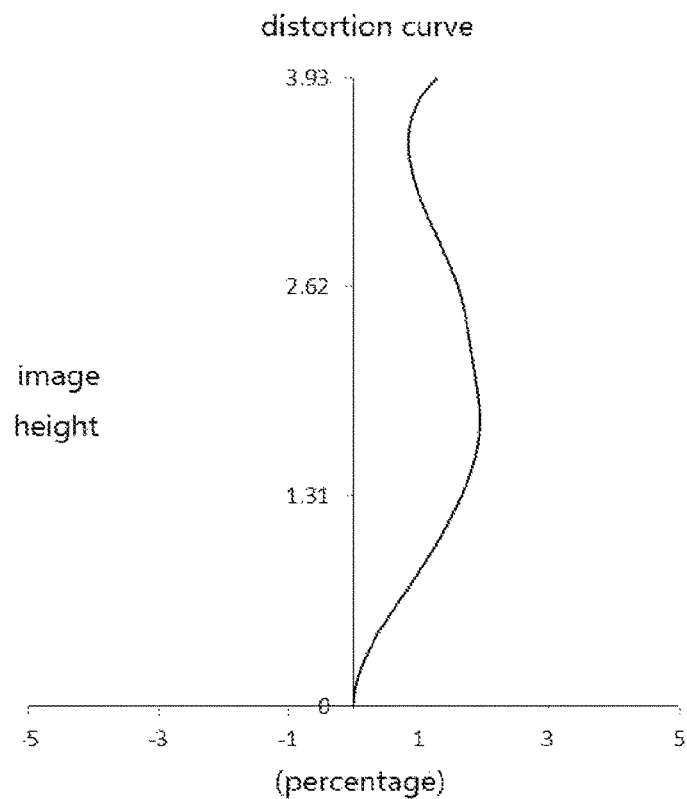
Figure 4D:
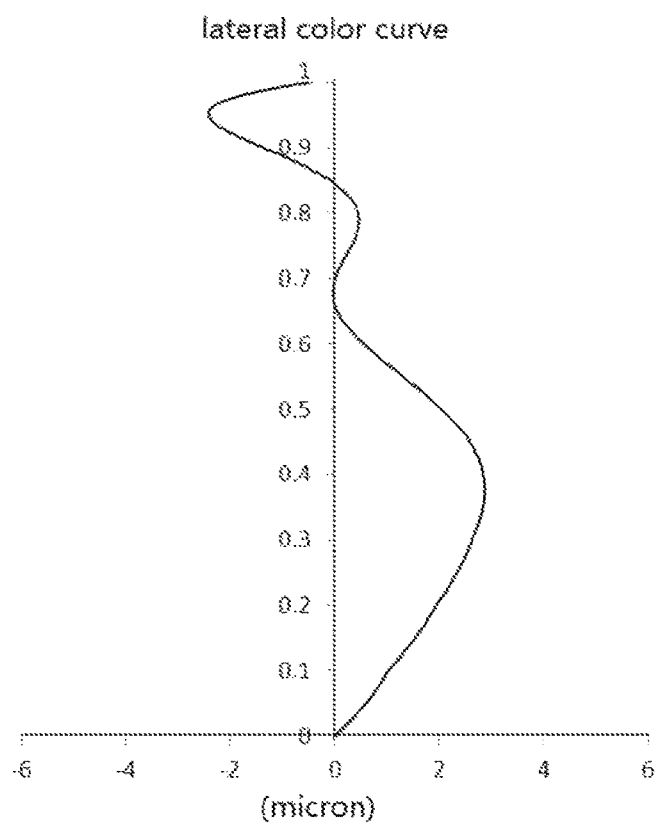

FIG. 4A shows a longitudinal aberration curve of the optical imaging lens according to embodiment 2 to represent deviation of a convergence focal point after light with different wavelengths passes through the lens. FIG. 4B shows an astigmatism curve of the optical imaging lens according to embodiment 2 to represent a meridian image surface curvature and a sagittal image surface curvature. FIG. 4C shows a distortion curve of the optical imaging lens according to embodiment 2 to represent distortion values corresponding to different image heights. FIG. 4D shows a lateral color curve of the optical imaging lens according to embodiment 2 to represent deviation of different image heights on the imaging surface after the light passes through the lens. According to FIG. 4A to FIG. 4D, it can be seen that the optical imaging lens provided in embodiment 2 may achieve high imaging quality.

Embodiment 3

Figure 5:
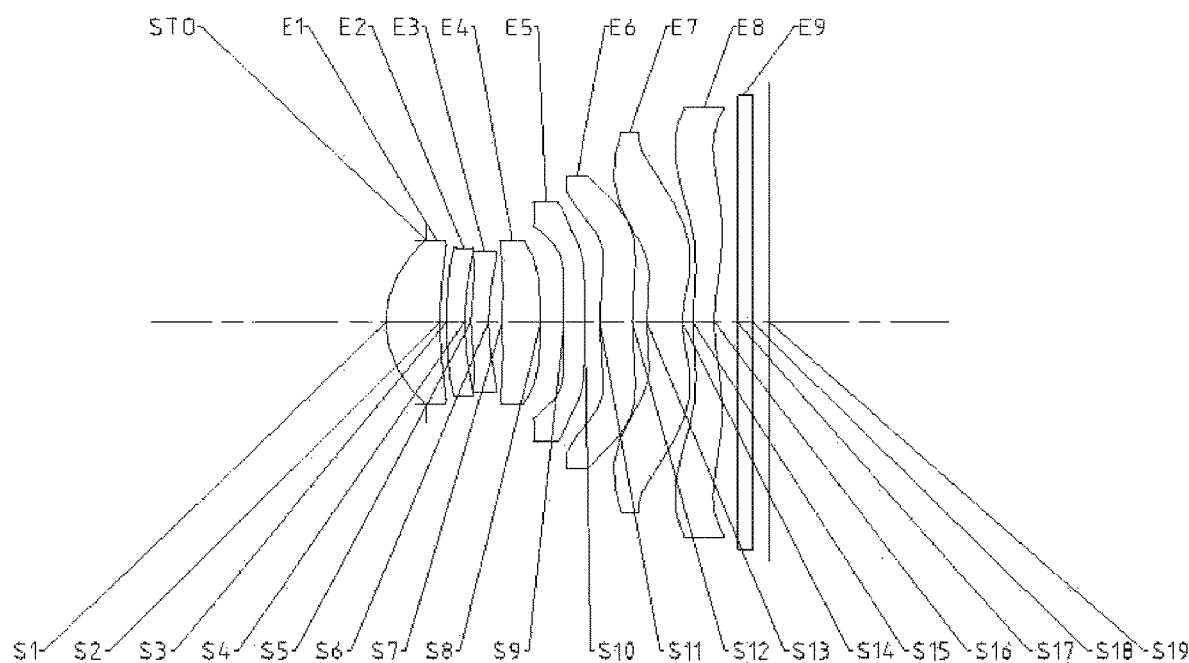
FIG. 5 shows a structure diagram of an optical imaging lens according to embodiment 3 of the disclosure.

An optical imaging lens according to embodiment 3 of the disclosure is described below with reference to FIG. 5 to FIG. 6D. FIG. 5 shows a structure diagram of an optical imaging lens according to embodiment 3 of the disclosure.

As shown in FIG. 5, the optical imaging lens according to an exemplary implementation mode of the disclosure sequentially includes, from an object side to an image side along an optical axis, a diaphragm STO, a first lens E1, a first lens E2, a third lens E3, a fourth lens E4, a fifth lens E5, a sixth lens E6, a seventh lens E7, an eighth lens E8, an optical filter E9 and an imaging surface S19.

The first lens E1 has positive refractive power, an object-side surface S1 thereof is a convex surface, and an image-side surface S2 is a concave surface. The second lens E2 has negative refractive power, an object-side surface S3 thereof is a convex surface, and an image-side surface S4 is a concave surface. The third lens E3 has positive refractive power, an object-side surface S5 thereof is a convex surface, and an image-side surface S6 is a concave surface. The fourth lens E4 has positive refractive power, an object-side surface S7 thereof is a convex surface, and an image-side surface S8 is a convex surface. The fifth lens E5 has positive refractive power, an object-side surface S9 thereof is a convex surface, and an image-side surface S10 is a concave surface. The sixth lens E6 has positive refractive power, an object-side surface S11 thereof is a convex surface, and an image-side surface S12 is a concave surface. The seventh lens E7 has negative refractive power, an object-side surface S13 thereof is a convex surface, and an image-side surface S14 is a concave surface. The eighth lens E8 has negative refractive power, an object-side surface S15 thereof is a convex surface, and an image-side surface S16 is a concave surface. The optical filter E9 has an object-side surface S17 and an image-side surface S18. Light from an object sequentially penetrates through each of the surfaces S1 to S18 and is finally imaged on the imaging surface S19.

Table 7 shows a surface type, curvature radius, thickness, material and Conic coefficient of each lens of the optical imaging lens according to embodiment 3. Units of the curvature radius and the thickness are millimeter (mm). Table 8 shows high-order coefficients applied to each aspherical mirror surface in embodiment 3. A surface type of each aspherical surface may be defined by formula (1) given in embodiment 1. Table 9 shows ImgH (ImgH is a half of a diagonal length of an effective pixel region on the imaging surface S19), TTL (TTL is a distance from the object-side surface S1 of the first lens E1 to the imaging surface S19 on the optical axis), a maximum half field of view HFOV, an F-number Fno, a total effective focal length f of the optical imaging lens and effective focal lengths f1 to f8 of each lens in embodiment 3.

TABLE 7

| Surface number | Surface type | Curvature radius | Thickness | Material Refractive index | Abbe number | Conic coefficient |
|---|---|---|---|---|---|---|
| OBJ | Spherical | Infinite | Infinite | | | |
| STO | Spherical | Infinite | −0.5699 | | | |
| S1 | Aspherical | 1.8269 | 0.7571 | 1.54 | 56.11 | −0.0545 |
| S2 | Aspherical | 5.2157 | 0.0987 | | | −15.8694 |
| S3 | Aspherical | 6.7726 | 0.2500 | 1.64 | 23.53 | −55.9438 |
| S4 | Aspherical | 4.0119 | 0.0908 | | | −4.4284 |
| S5 | Aspherical | 4.0103 | 0.2500 | 1.68 | 19.25 | −0.4959 |
| S6 | Aspherical | 3.9292 | 0.1927 | | | −0.6928 |
| S7 | Aspherical | 14.0218 | 0.5473 | 1.55 | 56.11 | 94.9464 |
| S8 | Aspherical | −12.2066 | 0.3299 | | | −22.6385 |
| S9 | Aspherical | 24.5066 | 0.3001 | 1.64 | 23.53 | −4.9715 |
| S10 | Aspherical | 25.2393 | 0.2077 | | | 79.3114 |
| S11 | Aspherical | 6.6103 | 0.4587 | 1.68 | 19.25 | 0.8333 |
| S12 | Aspherical | 7.3865 | 0.2048 | | | 5.1641 |
| S13 | Aspherical | 2.5825 | 0.4967 | 1.54 | 55.87 | −0.8056 |
| S14 | Aspherical | 1.8141 | 0.1519 | | | −0.8327 |
| S15 | Aspherical | 4.7653 | 0.3000 | 1.68 | 19.25 | −21.4915 |
| S16 | Aspherical | 3.4592 | 0.3281 | | | −1.1400 |
| S17 | Spherical | Infinite | 0.2100 | 1.52 | 64.17 | |
| S18 | Spherical | Infinite | 0.2440 | | | |
| S19 | Spherical | Infinite | Infinite | | | |

TABLE 8

| Surface number | A4 | A6 | A8 | 10 | A12 |
|---|---|---|---|---|---|
| S1 | 1.1282E−03 | −1.8730E−02 | 6.5612E−02 | −1.3656E−01 | 1.7177E−01 |
| S2 | −2.1222E−02 | 5.9033E−04 | −3.3099E−03 | 3.4428E−02 | −5.7766E−02 |
| S3 | −1.3047E−02 | 6.2722E−04 | 3.8739E−02 | −6.8892E−02 | 1.0607E−01 |
| S4 | −6.2577E−03 | 1.6262E−03 | −7.9159E−03 | 4.8693E−02 | −1.1909E−01 |
| S5 | −5.3564E−02 | −2.4373E−02 | 6.7930E−02 | −2.6132E−01 | 5.7929E−01 |
| S6 | −3.8649E−02 | 3.0637E−02 | −1.9489E−01 | 6.7053E−01 | −1.3738E+00 |
| S7 | −3.0496E−02 | 8.3416E−03 | −5.9706E−02 | 1.0114E−01 | −7.5787E−02 |
| S8 | −3.5962E−02 | −5.8498E−03 | −5.7238E−03 | −6.3473E−03 | 2.6437E−02 |
| S9 | −3.4964E−02 | 4.5713E−03 | −1.3735E−01 | 3.5128E−01 | −4.7187E−01 |
| S10 | 5.4896E−03 | −1.4093E−01 | 1.6471E−01 | −1.1186E−01 | 4.0819E−02 |
| S11 | 5.9550E−02 | −1.4696E−01 | 1.1844E−01 | −6.8301E−02 | 2.4103E−02 |
| S12 | −1.3606E−02 | −1.0384E−02 | −1.4024E−03 | 2.2625E−03 | −9.4279E−04 |

TABLE 8-continued

| | | | | |
|---|---|---|---|---|
| S13 | −2.7379E−01 | 1.0516E−01 | −2.4213E−02 | 4.1190E−03 | −5.5657E−04 |
| S14 | −2.4284E−01 | 1.1616E−01 | −4.6534E−02 | 1.3228E−02 | −2.4598E−03 |
| S15 | −5.5763E−02 | 1.2239E−02 | −1.3646E−03 | 9.2397E−05 | −3.8259E−06 |
| S16 | −6.3990E−02 | 1.4280E−02 | −2.1645E−03 | 2.2131E−04 | −1.4089E−05 |

| Surface number | A14 | A16 | A18 | A20 |
|---|---|---|---|---|
| S1 | −1.3470E−01 | 6.4116E−02 | −1.7031E−02 | 1.9295E−03 |
| S2 | 4.6437E−02 | −1.9824E−02 | 4.0123E−03 | −2.1788E−04 |
| S3 | −1.2179E−01 | 8.7558E−02 | −3.4298E−02 | 5.6603E−03 |
| S4 | 1.3369E−01 | −8.6535E−02 | 2.9803E−02 | −4.3544E−03 |
| S5 | −7.6591E−01 | 5.9743E−01 | −2.5280E−01 | 4.4325E−02 |
| S6 | 1.7620E+00 | −1.3570E+00 | 5.7627E−01 | −1.0316E−01 |
| S7 | −5.1405E−02 | 1.4388E−01 | −1.0411E−01 | 2.7148E−02 |
| S8 | −4.4573E−02 | 3.7965E−02 | −1.6651E−02 | 3.0894E−03 |
| S9 | 3.6400E−01 | −1.6334E−01 | 3.9490E−02 | −3.9479E−03 |
| S10 | −5.1360E−03 | −1.0867E−03 | 3.9956E−04 | −3.4130E−05 |
| S11 | −4.6727E−03 | 4.2932E−04 | −7.3728E−06 | −9.7500E−07 |
| S12 | 2.2416E−04 | −2.9064E−05 | 1.7140E−06 | −2.3772E−08 |
| S13 | 5.7595E−05 | −4.1107E−06 | 1.7415E−07 | −3.2442E−09 |
| S14 | 2.8901E−04 | −2.0571E−05 | 8.0759E−07 | −1.3399E−08 |
| S15 | 9.7265E−08 | −1.4882E−09 | 1.2641E−11 | −4.6017E−14 |
| S16 | 5.4043E−07 | −1.2117E−08 | 1.4619E−10 | −7.3320E−13 |

TABLE 9

| | | | |
|---|---|---|---|
| ImgH (mm) | 3.93 | f3 (mm) | 1170.34 |
| TTL (mm) | 5.42 | f4 (mm) | 12.04 |
| HFOV (°) | 41.9 | f5 (mm) | 1128.40 |
| Fno | 1.59 | f6 (mm) | 74.95 |
| f (mm) | 4.33 | f7 (mm) | −14.67 |
| f1 (mm) | 4.77 | f8 (mm) | −21.53 |
| f2 (mm) | −15.83 | | |

Figure 6A:
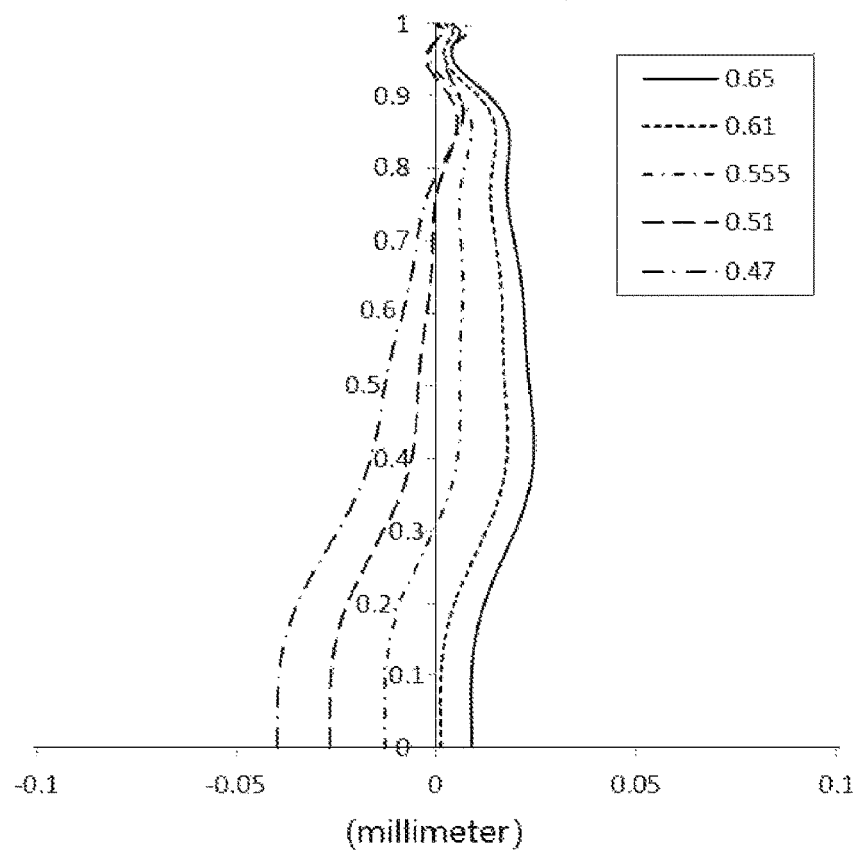
FIG. 6A to FIG. 6D show a longitudinal aberration curve, an astigmatism curve, a distortion curve and a lateral color curve of an optical imaging lens according to embodiment 3 respectively.
Figure 6B:
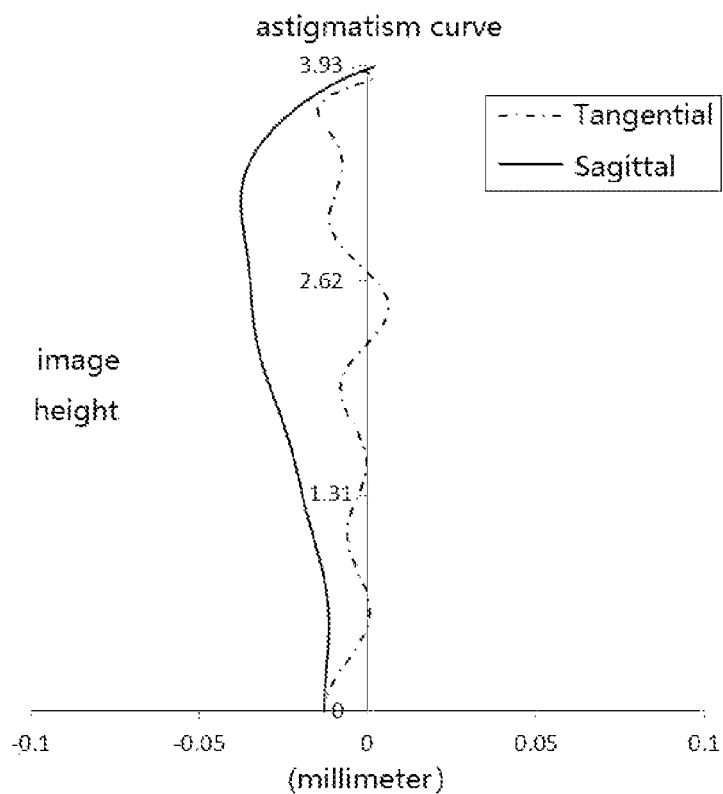
Figure 6C:
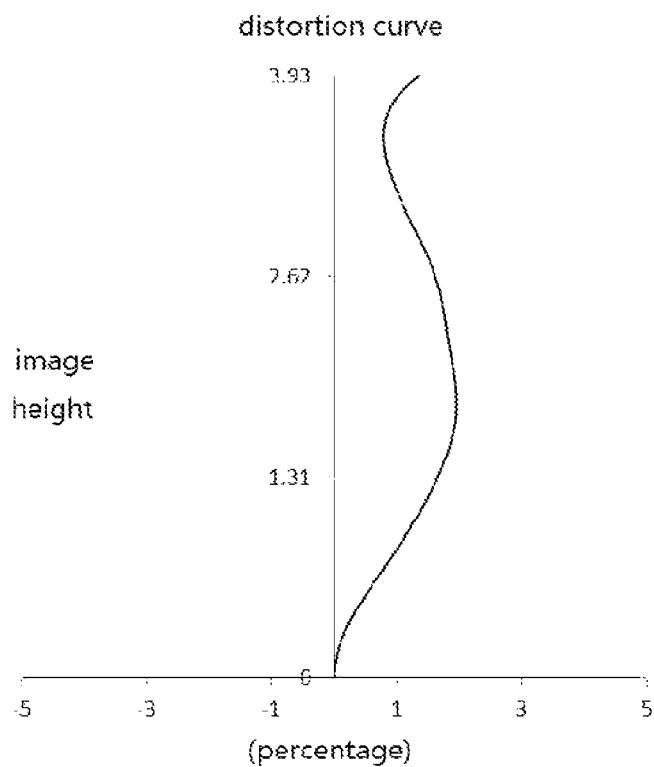
Figure 6D:
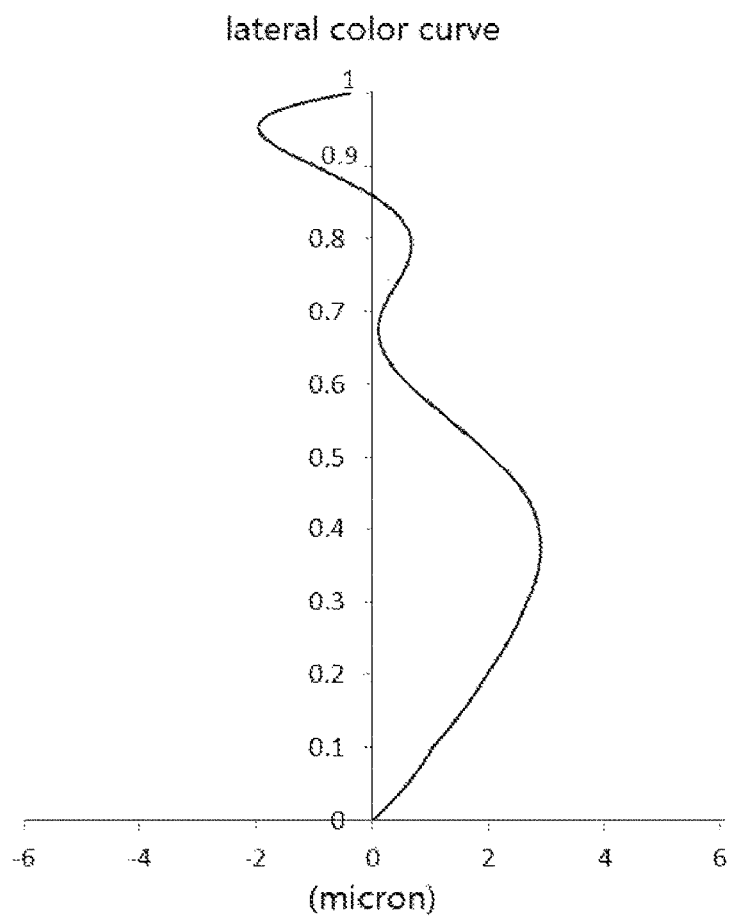

FIG. 6A shows a longitudinal aberration curve of the optical imaging lens according to embodiment 3 to represent deviation of a convergence focal point after light with different wavelengths passes through the lens. FIG. 6B shows an astigmatism curve of the optical imaging lens according to embodiment 3 to represent a meridian image surface curvature and a sagittal image surface curvature. FIG. 6C shows a distortion curve of the optical imaging lens according to embodiment 3 to represent distortion values corresponding to different image heights. FIG. 6D shows a lateral color curve of the optical imaging lens according to embodiment 3 to represent deviation of different image heights on the imaging surface after the light passes through the lens. According to FIG. 6A to FIG. 6D, it can be seen that the optical imaging lens provided in embodiment 3 may achieve high imaging quality.

Embodiment 4

Figure 7:
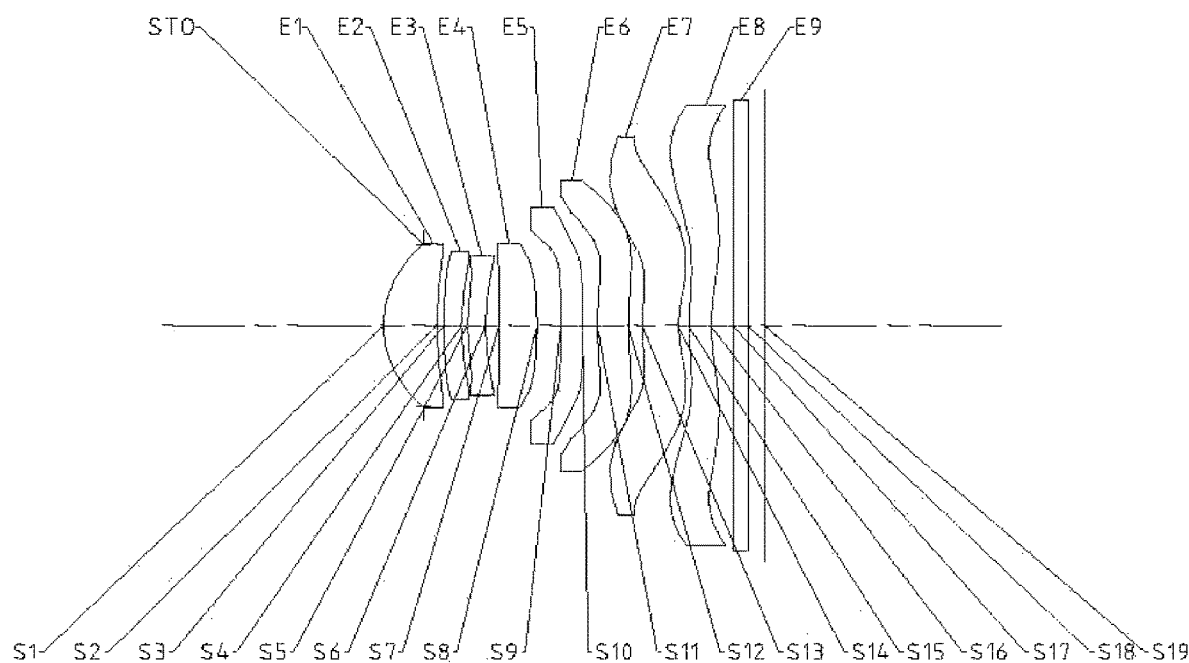
FIG. 7 shows a structure diagram of an optical imaging lens according to embodiment 4 of the disclosure.

An optical imaging lens according to embodiment 4 of the disclosure is described below with reference to FIG. 7 to FIG. 8D. FIG. 7 shows a structure diagram of an optical imaging lens according to embodiment 4 of the disclosure.

As shown in FIG. 7, the optical imaging lens according to an exemplary implementation mode of the disclosure sequentially includes, from an object side to an image side along an optical axis, a diaphragm STO, a first lens E1, a first lens E2, a third lens E3, a fourth lens E4, a fifth lens E5, a sixth lens E6, a seventh lens E7, an eighth lens E8, an optical filter E9 and an imaging surface S19.

The first lens E1 has positive refractive power, an object-side surface S1 thereof is a convex surface, and an image-side surface S2 is a concave surface. The second lens E2 has negative refractive power, an object-side surface S3 thereof is a convex surface, and an image-side surface S4 is a concave surface. The third lens E3 has negative refractive power, an object-side surface S5 thereof is a convex surface, and an image-side surface S6 is a concave surface. The fourth lens E4 has positive refractive power, an object-side surface S7 thereof is a convex surface, and an image-side surface S8 is a convex surface. The fifth lens E5 has positive refractive power, an object-side surface S9 thereof is a convex surface, and an image-side surface S10 is a concave surface. The sixth lens E6 has negative refractive power, an object-side surface S11 thereof is a convex surface, and an image-side surface S12 is a concave surface. The seventh lens E7 has negative refractive power, an object-side surface S13 thereof is a convex surface, and an image-side surface S14 is a concave surface. The eighth lens E8 has negative refractive power, an object-side surface S15 thereof is a convex surface, and an image-side surface S16 is a concave surface. The optical filter E9 has an object-side surface S17 and an image-side surface S18. Light from an object sequentially penetrates through each of the surfaces S1 to S18 and is finally imaged on the imaging surface S19.

Table 10 shows a surface type, curvature radius, thickness, material and Conic coefficient of each lens of the optical imaging lens according to embodiment 4. Units of the curvature radius and the thickness are millimeter (mm). Table 11 shows high-order coefficients applied to each aspherical mirror surface in embodiment 4. A surface type of each aspherical surface may be defined by formula (1) given in embodiment 1. Table 12 shows ImgH (ImgH is a half of a diagonal length of an effective pixel region on the imaging surface S19), TTL (TTL is a distance from the object-side surface S1 of the first lens E1 to the imaging surface S19 on the optical axis), a maximum half field of view HFOV, an F-number Fno, a total effective focal length f of the optical imaging lens and effective focal lengths f1 to f8 of each lens in embodiment 4.

TABLE 10

| Surface number | Surface type | Curvature radius | Thickness | Material Refractive index | Material Abbe number | Conic coefficient |
|---|---|---|---|---|---|---|
| OBJ | Spherical | Infinite | Infinite | | | |
| STO | Spherical | Infinite | −0.5741 | | | |
| S1 | Aspherical | 1.8271 | 0.7594 | 1.54 | 56.11 | −0.0542 |
| S2 | Aspherical | 5.2553 | 0.0982 | | | −15.8810 |
| S3 | Aspherical | 6.8033 | 0.2500 | 1.64 | 23.53 | −55.2798 |
| S4 | Aspherical | 4.0329 | 0.0896 | | | −4.4817 |
| S5 | Aspherical | 4.0292 | 0.2516 | 1.68 | 19.25 | −0.4277 |
| S6 | Aspherical | 3.8838 | 0.1935 | | | −0.4049 |
| S7 | Aspherical | 13.2750 | 0.5436 | 1.55 | 56.11 | 80.3765 |
| S8 | Aspherical | −12.2336 | 0.3341 | | | −19.5691 |
| S9 | Aspherical | 24.6886 | 0.3173 | 1.64 | 23.53 | −99.0000 |
| S10 | Aspherical | 42.4999 | 0.2081 | | | 99.0000 |
| S11 | Aspherical | 7.6488 | 0.4407 | 1.68 | 19.25 | 1.8465 |
| S12 | Aspherical | 7.4012 | 0.1993 | | | 4.5552 |
| S13 | Aspherical | 2.5769 | 0.5085 | 1.54 | 55.87 | −0.8055 |
| S14 | Aspherical | 1.8190 | 0.1510 | | | −0.8311 |
| S15 | Aspherical | 4.8120 | 0.3146 | 1.68 | 19.25 | −21.8241 |
| S16 | Aspherical | 3.4524 | 0.3234 | | | −1.1394 |
| S17 | Spherical | Infinite | 0.2100 | 1.52 | 64.17 | |
| S18 | Spherical | Infinite | 0.2392 | | | |
| S19 | Spherical | Infinite | Infinite | | | |

TABLE 11

| Surface number | A4 | A6 | A8 | A10 | A12 |
|---|---|---|---|---|---|
| S1 | 1.1235E−03 | −1.8613E−02 | 6.5064E−02 | −1.3514E−01 | 1.6963E−01 |
| S2 | −2.1162E−02 | 5.8782E−04 | −3.2912E−02 | 3.4185E−02 | −5.7277E−02 |
| S3 | −1.3064E−02 | 6.2845E−04 | 3.8840E−02 | −6.9118E−02 | 1.0649E−01 |
| S4 | −6.2565E−03 | 1.6257E−03 | −7.9128E−03 | 4.8669E−02 | −1.1902E−01 |
| S5 | −5.3569E−02 | −2.4376E−02 | 6.7944E−02 | −2.6138E−01 | 5.7946E−01 |
| S6 | −3.8672E−02 | 3.0664E−02 | −1.9512E−01 | 6.7152E−01 | −1.3762E+00 |
| S7 | −3.0733E−02 | 8.4393E−03 | −6.0639E−02 | 1.0312E−01 | −7.7572E−02 |
| S8 | −3.6123E−02 | −5.8892E−03 | −5.7753E−03 | −6.4187E−03 | 2.6795E−02 |
| S9 | −3.4692E−02 | 4.5180E−03 | −1.3521E−01 | 3.4448E−01 | −4.6093E−01 |
| S10 | 5.4595E−03 | −1.3977E−01 | 1.6291E−01 | −1.1034E−01 | 4.0152E−02 |
| S11 | 5.9948E−02 | −1.4843E−01 | 1.2003E−01 | −6.9446E−02 | 2.4588E−02 |
| S12 | −1.3485E−02 | −1.0245E−02 | −1.3775E−03 | 2.2124E−03 | −9.1782E−04 |
| S13 | −2.7395E−01 | 1.0525E−01 | −2.4242E−02 | 4.1252E−03 | −5.5758E−04 |
| S14 | −2.4201E−01 | 1.1556E−01 | −4.6216E−02 | 1.3115E−02 | −2.4346E−03 |
| S15 | −5.4386E−02 | 1.1653E−02 | −1.2693E−03 | 8.4428E−05 | −3.4424E−06 |
| S16 | −6.2348E−02 | 1.3344E−02 | −1.9908E−03 | 2.0504E−04 | −1.3204E−05 |

| Surface number | A14 | A16 | A18 | A20 |
|---|---|---|---|---|
| S1 | −1.3273E−01 | 6.3050E−02 | −1.6713E−02 | 1.8895E−03 |
| S2 | 4.5979E−02 | −1.9600E−02 | 3.9615E−03 | −2.1481E−04 |
| S3 | −1.2235E−01 | 8.8019E−02 | −3.4501E−02 | 5.6976E−03 |
| S4 | 1.3360E−01 | −8.6468E−02 | 2.9777E−02 | −4.3502E−03 |
| S5 | −7.6618E−01 | 5.9766E−01 | −2.5291E−01 | 4.4347E−02 |
| S6 | 1.7656E+00 | −1.3602E+00 | 5.7779E−01 | −1.0346E−01 |
| S7 | −5.2820E−02 | 1.4842E−01 | −1.0781E−01 | 2.8222E−02 |
| S8 | −4.5277E−02 | 3.8651E−02 | −1.6990E−02 | 3.1593E−03 |
| S9 | 3.5418E−01 | −1.5831E−01 | 3.8124E−02 | −3.7965E−03 |
| S10 | −5.0382E−03 | −1.0631E−03 | 3.8981E−04 | −3.3205E−05 |
| S11 | −4.7827E−03 | 4.4089E−04 | −7.5968E−06 | −1.0080E−06 |
| S12 | 2.1725E−04 | −2.8042E−05 | 1.6464E−06 | −2.2732E−08 |
| S13 | 5.7716E−05 | −4.1206E−06 | 1.7462E−07 | −3.2540E−09 |
| S14 | 2.8556E−04 | −2.0291E−05 | 7.9522E−07 | −1.3171E−08 |
| S15 | 8.6187E−08 | −1.2982E−09 | 1.0856E−11 | −3.8937E−14 |
| S16 | 5.1125E−07 | −1.1540E−08 | 1.3988E−10 | −7.0394E−13 |

TABLE 12

| ImgH (mm) | 3.93 | f3 (mm) | −528.02 | HFOV (°) | 41.8 | f5 (mm) | 90.76 |
|---|---|---|---|---|---|---|---|
| TTL (mm) | 5.43 | f4 (mm) | 11.75 | Fno | 1.59 | f6 (mm) | −1200.18 |

TABLE 12-continued

| f (mm) | 4.32 | f7 (mm) | −15.05 |
| f1 (mm) | 4.76 | f8 (mm) | −19.76 |
| f2 (mm) | −15.93 | | |

Figure 8A:
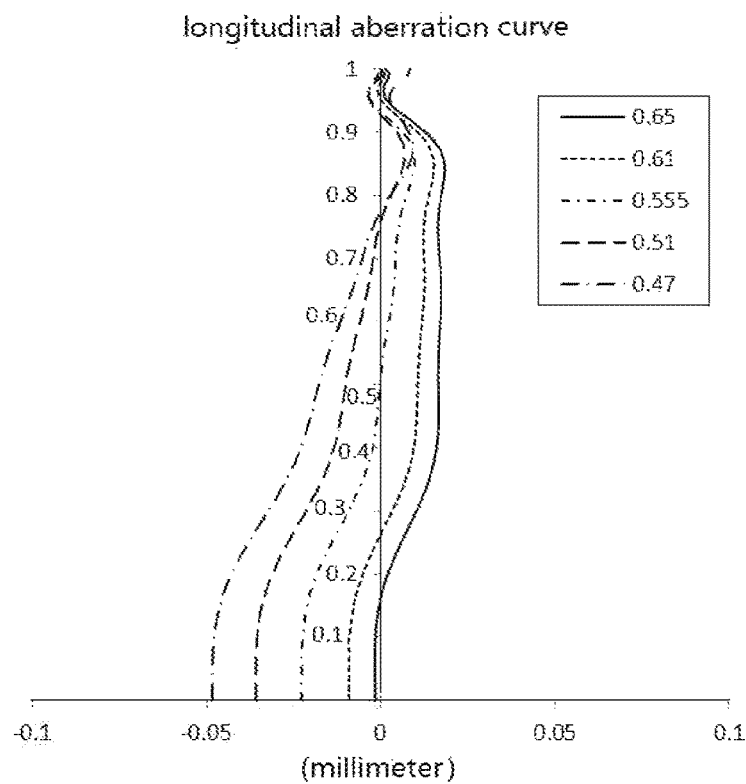
FIG. 8A to FIG. 8D show a longitudinal aberration curve, an astigmatism curve, a distortion curve and a lateral color curve of an optical imaging lens according to embodiment 4 respectively.
Figure 8B:
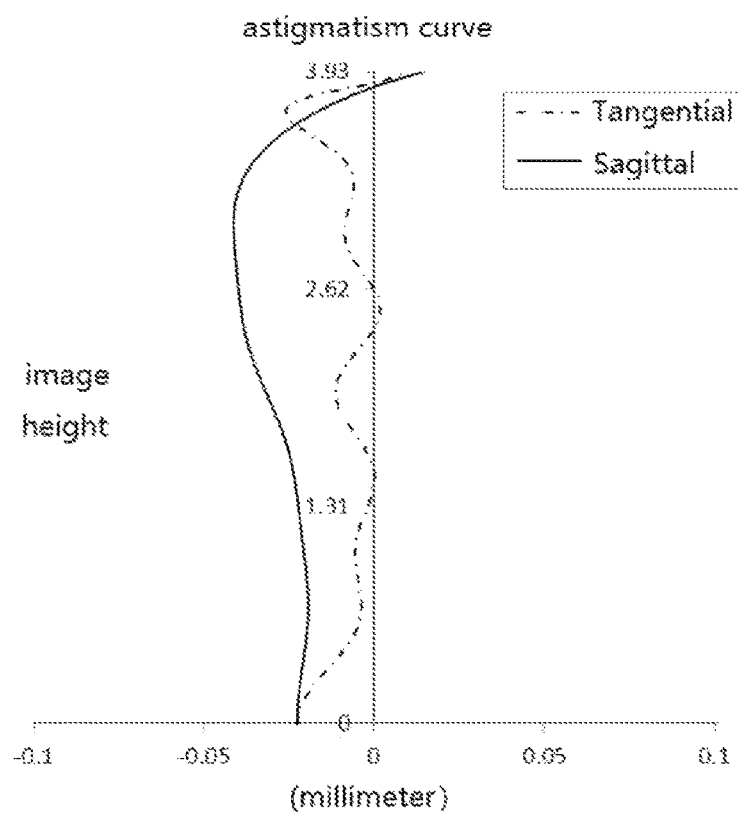
Figure 8C:
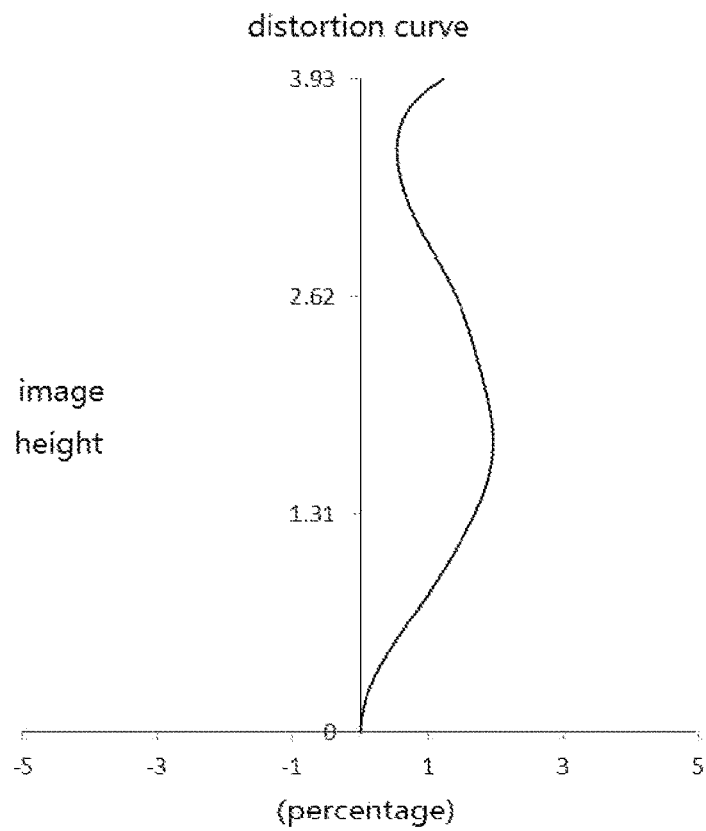
Figure 8D:
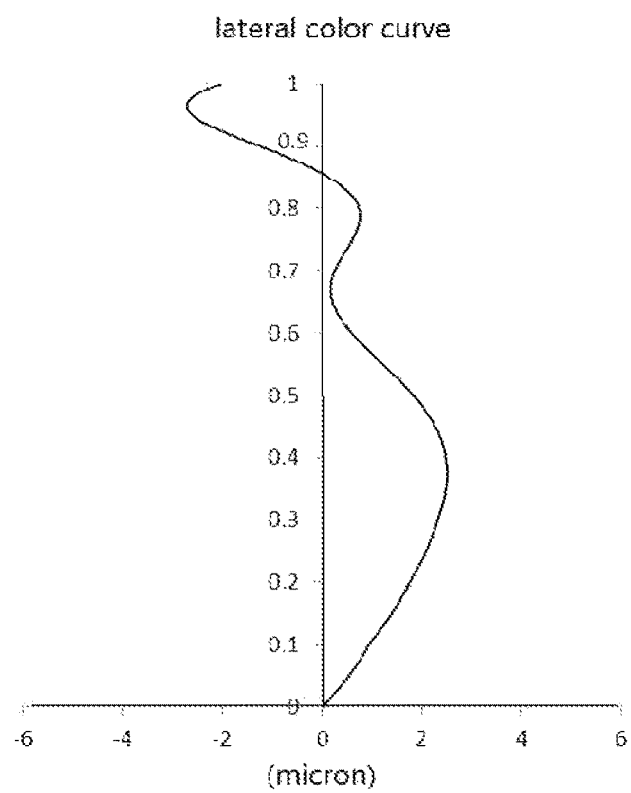

FIG. 8A shows a longitudinal aberration curve of the optical imaging lens according to embodiment 4 to represent deviation of a convergence focal point after light with different wavelengths passes through the lens. FIG. 8B shows an astigmatism curve of the optical imaging lens according to embodiment 4 to represent a meridian image surface curvature and a sagittal image surface curvature. FIG. 8C shows a distortion curve of the optical imaging lens according to embodiment 4 to represent distortion values corresponding to different image heights. FIG. 8D shows a lateral color curve of the optical imaging lens according to embodiment 4 to represent deviation of different image heights on the imaging surface after the light passes through the lens. According to FIG. 8A to FIG. 8D, it can be seen that the optical imaging lens provided in embodiment 4 may achieve high imaging quality.

Embodiment 5

Figure 9:
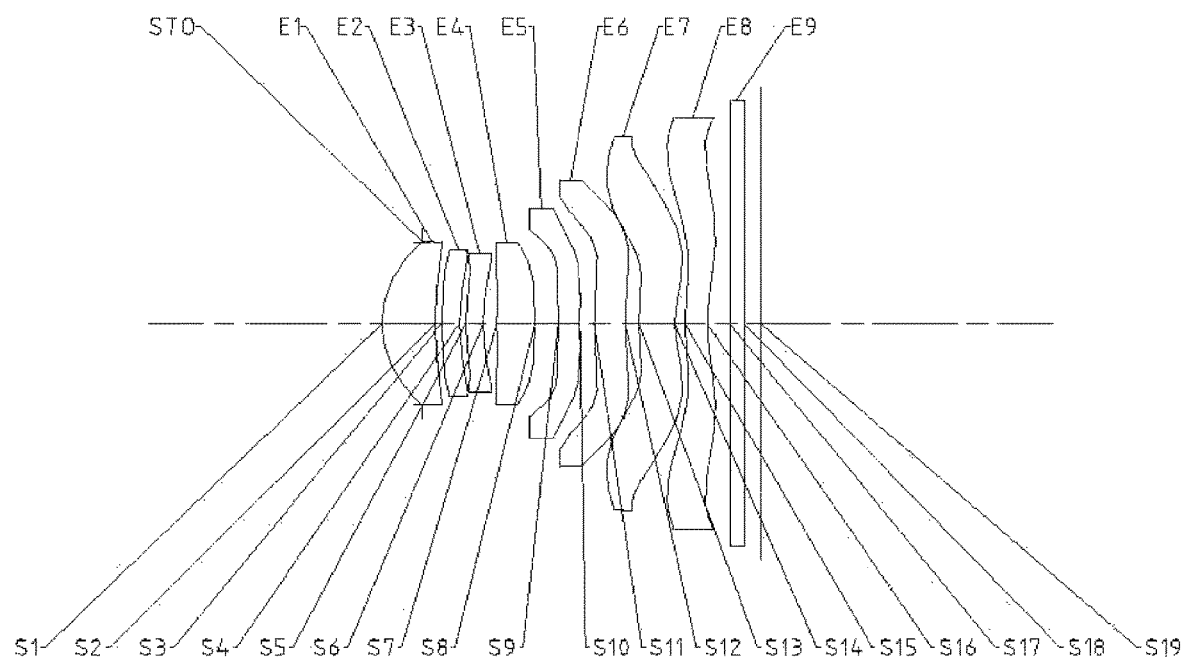
FIG. 9 shows a structure diagram of an optical imaging lens according to embodiment 5 of the disclosure.

An optical imaging lens according to embodiment 5 of the disclosure is described below with reference to FIG. 9 to FIG. 10D. FIG. 9 shows a structure diagram of an optical imaging lens according to embodiment 5 of the disclosure.

As shown in FIG. 9, the optical imaging lens according to an exemplary implementation mode of the disclosure sequentially includes, from an object side to an image side along an optical axis, a diaphragm STO, a first lens E1, a first lens E2, a third lens E3, a fourth lens E4, a fifth lens E5, a sixth lens E6, a seventh lens E7, an eighth lens E8, an optical filter E9 and an imaging surface S19.

The first lens E1 has positive refractive power, an object-side surface S1 thereof is a convex surface, and an image-side surface S2 is a concave surface. The second lens E2 has negative refractive power, an object-side surface S3 thereof is a convex surface, and an image-side surface S4 is a concave surface. The third lens E3 has positive refractive power, an object-side surface S5 thereof is a convex surface, and an image-side surface S6 is a concave surface. The fourth lens E4 has positive refractive power, an object-side surface S7 thereof is a convex surface, and an image-side surface S8 is a convex surface. The fifth lens E5 has positive refractive power, an object-side surface S9 thereof is a convex surface, and an image-side surface S10 is a concave surface. The sixth lens E6 has negative refractive power, an object-side surface S11 thereof is a convex surface, and an image-side surface S12 is a concave surface. The seventh lens E7 has negative refractive power, an object-side surface S13 thereof is a convex surface, and an image-side surface S14 is a concave surface. The eighth lens E8 has negative refractive power, an object-side surface S15 thereof is a convex surface, and an image-side surface S16 is a concave surface. The optical filter E9 has an object-side surface S17 and an image-side surface S18. Light from an object sequentially penetrates through each of the surfaces S1 to S18 and is finally imaged on the imaging surface S19.

Table 13 shows a surface type, curvature radius, thickness, material and Conic coefficient of each lens of the optical imaging lens according to embodiment 5. Units of the curvature radius and the thickness are millimeter (mm). Table 14 shows high-order coefficients applied to each aspherical mirror surface in embodiment 5. A surface type of each aspherical surface may be defined by formula (1) given in embodiment 1. Table 15 shows ImgH (ImgH is a half of a diagonal length of an effective pixel region on the imaging surface S19), TTL (TTL is a distance from the object-side surface S1 of the first lens E1 to the imaging surface S19 on the optical axis), a maximum half field of view HFOV, an F-number Fno, a total effective focal length f of the optical imaging lens and effective focal lengths f1 to f8 of each lens in embodiment 5.

TABLE 13

| Surface number | Surface type | Curvature radius | Thickness | Material Refractive index | Abbe number | Conic coefficient |
|---|---|---|---|---|---|---|
| OBJ | Spherical | Infinite | Infinite | | | |
| STO | Spherical | Infinite | −0.5751 | | | |
| S1 | Aspherical | 1.8270 | 0.7600 | 1.54 | 56.11 | −0.0556 |
| S2 | Aspherical | 5.2832 | 0.0981 | | | −15.7916 |
| S3 | Aspherical | 6.8358 | 0.2500 | 1.64 | 23.53 | −55.2915 |
| S4 | Aspherical | 3.9626 | 0.0891 | | | −4.4818 |
| S5 | Aspherical | 3.9597 | 0.2519 | 1.68 | 19.25 | −0.4252 |
| S6 | Aspherical | 3.8961 | 0.1940 | | | −0.4612 |
| S7 | Aspherical | 13.3902 | 0.5431 | 1.55 | 56.11 | 78.6934 |
| S8 | Aspherical | −12.3206 | 0.3343 | | | −19.9204 |
| S9 | Aspherical | 24.5670 | 0.3175 | 1.64 | 23.53 | −99.0000 |
| S10 | Aspherical | 42.2715 | 0.2081 | | | 99.0000 |
| S11 | Aspherical | 7.6718 | 0.4385 | 1.68 | 19.25 | 1.9543 |
| S12 | Aspherical | 7.4247 | 0.1990 | | | 4.5217 |
| S13 | Aspherical | 2.5777 | 0.5081 | 1.54 | 55.87 | −0.8056 |
| S14 | Aspherical | 1.8190 | 0.1508 | | | −0.8309 |
| S15 | Aspherical | 4.8126 | 0.3146 | 1.68 | 19.25 | −21.8031 |
| S16 | Aspherical | 3.4517 | 0.3220 | | | −1.1388 |
| S17 | Spherical | Infinite | 0.2100 | 1.52 | 64.17 | |
| S18 | Spherical | Infinite | 0.2378 | | | |
| S19 | Spherical | Infinite | Infinite | | | |

TABLE 14

| Surface number | A4 | A6 | A8 | A10 | A12 |
|---|---|---|---|---|---|
| S1 | 1.1241E-03 | -1.8628E-02 | 6.5134E-02 | -1.3532E-01 | 1.6990E-01 |
| S2 | -2.1116E-02 | 5.8591E-04 | -3.2769E-03 | 3.4000E-02 | -5.6905E-02 |
| S3 | -1.3055E-02 | 6.2783E-04 | 3.8789E-02 | -6.9004E-02 | 1.0628E-01 |
| S4 | -6.2532E-03 | 1.6245E-03 | -7.9045E-03 | 4.8605E-02 | -1.1883E-01 |
| S5 | -5.3580E-02 | -2.4383E-02 | 6.7970E-02 | -2.6151E-01 | 5.7979E-01 |
| S6 | -3.8641E-02 | 3.0627E-02 | -1.9481E-01 | 6.7017E-01 | -1.3729E+00 |
| S7 | -3.0766E-02 | 8.4527E-03 | -6.0768E-02 | 1.0340E-01 | -7.7820E-02 |
| S8 | -3.6112E-02 | -5.8865E-03 | -5.7718E-03 | -6.4138E-03 | 2.6770E-02 |
| S9 | -3.4617E-02 | 4.5033E-03 | -1.3463E-01 | 3.4263E-01 | -4.5795E-01 |
| S10 | 5.4537E-03 | -1.3955E-01 | 1.6256E-01 | -1.1004E-01 | 4.0024E-02 |
| S11 | 6.0028E-02 | -1.4873E-01 | 1.2035E-01 | -6.9678E-02 | 2.4687E-02 |
| S12 | -1.3469E-02 | -1.0226E-02 | -1.3741E-03 | 2.2057E-03 | -9.1444E-04 |
| S13 | -2.7396E-01 | 1.0526E-01 | -2.4245E-02 | 4.1257E-03 | -5.5765E-04 |
| S14 | -2.4191E-01 | 1.1549E-01 | -4.6176E-02 | 1.3101E-02 | -2.4315E-03 |
| S15 | -5.4185E-02 | 1.1570E-02 | -1.2557E-03 | 8.3265E-05 | -3.3849E-06 |
| S16 | -6.1998E-02 | 1.3168E-02 | -1.9613E-03 | 2.0253E-04 | -1.3082E-05 |

| Surface number | A14 | A16 | A18 | A20 |
|---|---|---|---|---|
| S1 | -1.3299E-01 | 6.3186E-02 | -1.6754E-02 | 1.8946E-03 |
| S2 | 4.5630E-02 | -1.9431E-02 | 3.9229E-03 | -2.1249E-04 |
| S3 | -1.2207E-01 | 8.7787E-02 | -3.4399E-02 | 5.6788E-03 |
| S4 | 1.3335E-01 | -8.6286E-02 | 2.9707E-02 | -4.3387E-03 |
| S5 | -7.6669E-01 | 5.9812E-01 | -2.5312E-01 | 4.4389E-02 |
| S6 | 1.7607E+00 | -1.3559E+00 | 5.7571E-01 | -1.0305E-01 |
| S7 | -5.3017E-02 | 1.4905E-01 | -1.0833E-01 | 2.8373E-02 |
| S8 | -4.5229E-02 | 3.8604E-02 | -1.6967E-02 | 3.1545E-03 |
| S9 | 3.5151E-01 | -1.5694E-01 | 3.7756E-02 | -3.7558E-03 |
| S10 | -5.0194E-03 | -1.0586E-03 | 3.8794E-04 | -3.3028E-05 |
| S11 | -4.8051E-03 | 4.4325E-04 | -7.6425E-06 | -1.0147E-06 |
| S12 | 2.1632E-04 | -2.7904E-05 | 1.6373E-06 | -2.2592E-08 |
| S13 | 5.7725E-05 | -4.1213E-06 | 1.7465E-07 | -3.2547E-09 |
| S14 | 2.8513E-04 | -2.0256E-05 | 7.9368E-07 | -1.3143E-08 |
| S15 | 8.4480E-08 | -1.2681E-09 | 1.0565E-11 | -3.7746E-14 |
| S16 | 5.0764E-07 | -1.1477E-08 | 1.3928E-10 | -7.0153E-13 |

TABLE 15

| | | | |
|---|---|---|---|
| ImgH (mm) | 3.93 | f3 (mm) | 596.53 |
| TTL (mm) | 5.43 | f4 (mm) | 11.84 |
| HFOV (°) | 41.9 | f5 (mm) | 90.36 |
| Fno | 1.59 | f6 (mm) | -1200.30 |
| f (mm) | 4.32 | f7 (mm) | -15.03 |
| f1 (mm) | 4.75 | f8 (mm) | -19.49 |
| f2 (mm) | -15.14 | | |

Figure 10A:
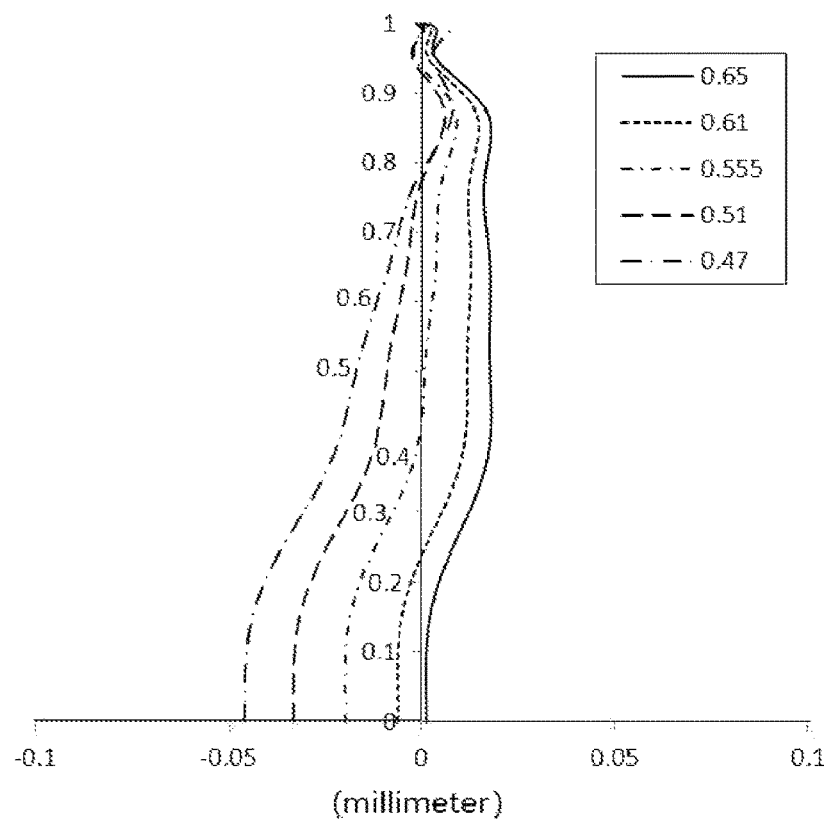
FIG. 10A to FIG. 10D show a longitudinal aberration curve, an astigmatism curve, a distortion curve and a lateral color curve of an optical imaging lens according to embodiment 5 respectively.
Figure 10B:
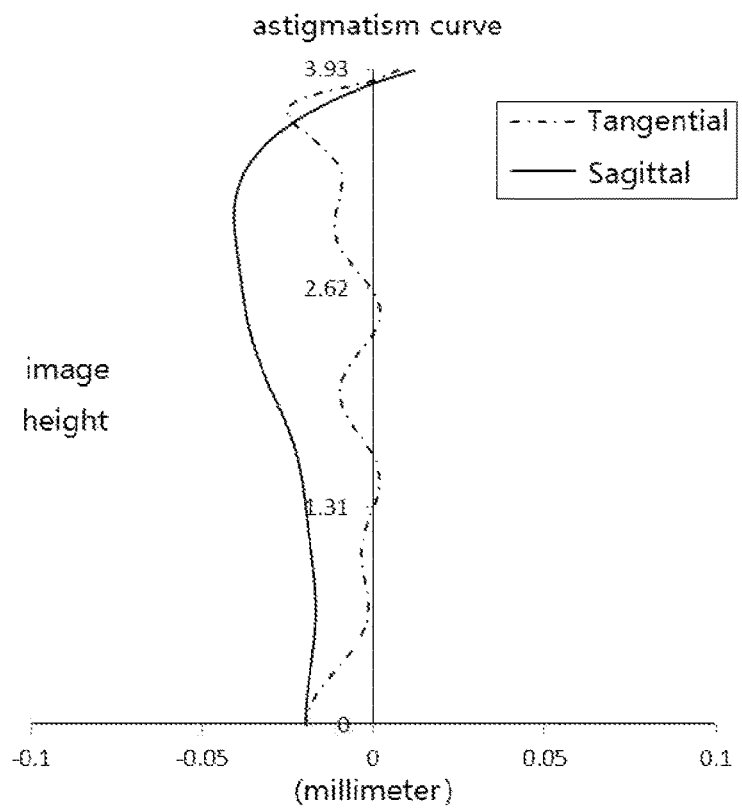
Figure 10C:
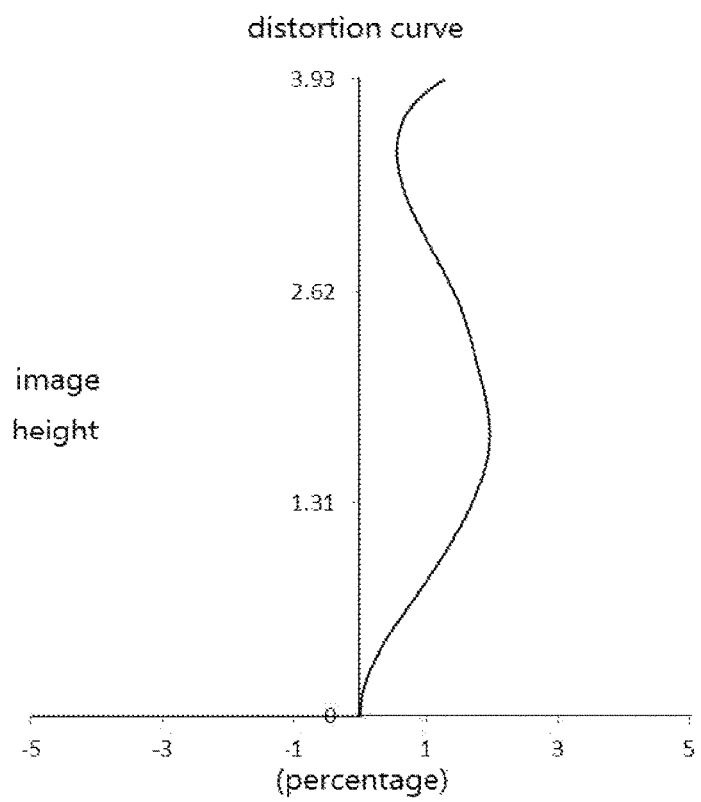
Figure 10D:
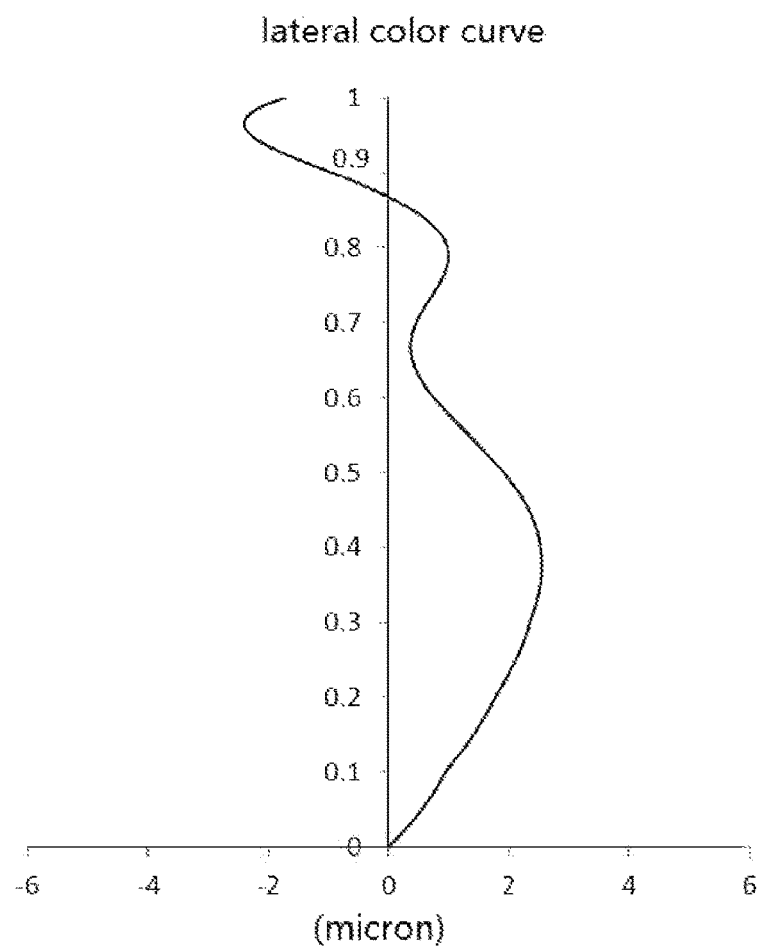

FIG. 10A shows a longitudinal aberration curve of the optical imaging lens according to embodiment 5 to represent deviation of a convergence focal point after light with different wavelengths passes through the lens. FIG. 10B shows an astigmatism curve of the optical imaging lens according to embodiment 5 to represent a meridian image surface curvature and a sagittal image surface curvature. FIG. 10C shows a distortion curve of the optical imaging lens according to embodiment 5 to represent distortion values corresponding to different image heights. FIG. 10D shows a lateral color curve of the optical imaging lens according to embodiment 5 to represent deviation of different image heights on the imaging surface after the light passes through the lens. According to FIG. 10A to FIG. 10D, it can be seen that the optical imaging lens provided in embodiment 5 may achieve high imaging quality.

Embodiment 6

Figure 11:
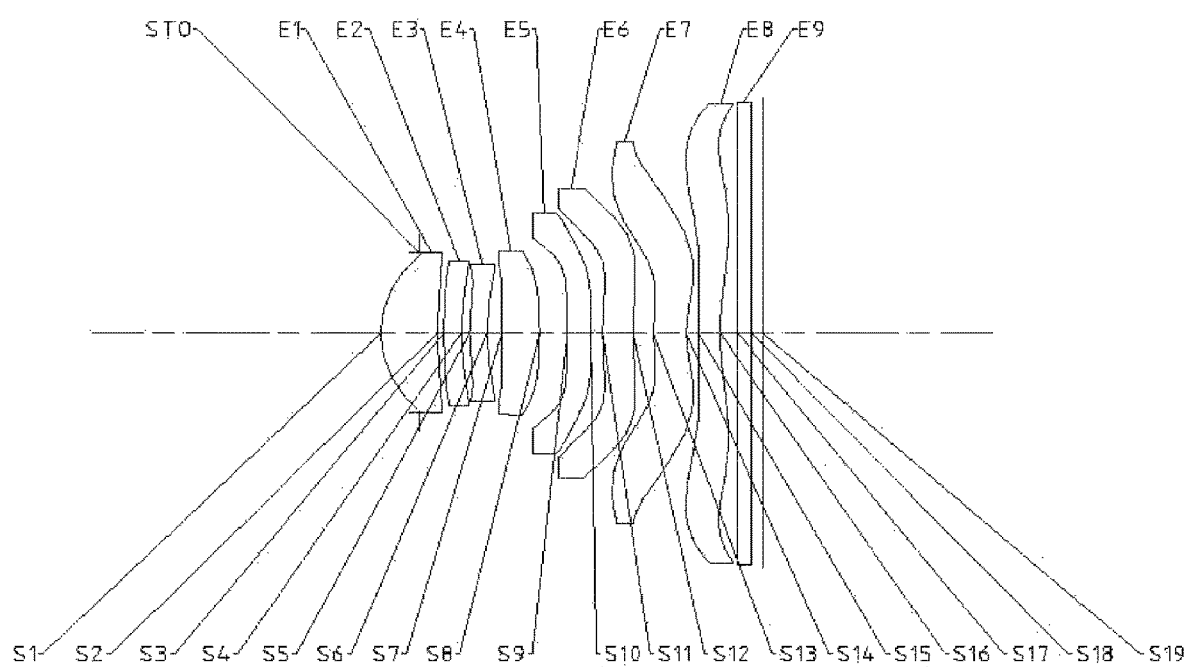
FIG. 11 shows a structure diagram of an optical imaging lens according to embodiment 6 of the disclosure.

An optical imaging lens according to embodiment 6 of the disclosure is described below with reference to FIG. 11 to FIG. 12D. FIG. 11 shows a structure diagram of an optical imaging lens according to embodiment 6 of the disclosure.

As shown in FIG. 11, the optical imaging lens according to an exemplary implementation mode of the disclosure sequentially includes, from an object side to an image side along an optical axis, a diaphragm STO, a first lens E1, a first lens E2, a third lens E3, a fourth lens E4, a fifth lens E5, a sixth lens E6, a seventh lens E7, an eighth lens E8, an optical filter E9 and an imaging surface S19.

The first lens E1 has positive refractive power, an object-side surface S1 thereof is a convex surface, and an image-side surface S2 is a concave surface. The second lens E2 has negative refractive power, an object-side surface S3 thereof is a convex surface, and an image-side surface S4 is a concave surface. The third lens E3 has negative refractive power, an object-side surface S5 thereof is a convex surface, and an image-side surface S6 is a concave surface. The fourth lens E4 has positive refractive power, an object-side surface S7 thereof is a convex surface, and an image-side surface S8 is a convex surface. The fifth lens E5 has positive refractive power, an object-side surface S9 thereof is a concave surface, and an image-side surface S10 is a convex surface. The sixth lens E6 has positive refractive power, an object-side surface S11 thereof is a convex surface, and an image-side surface S12 is a concave surface. The seventh lens E7 has negative refractive power, an object-side surface S13 thereof is a convex surface, and an image-side surface S14 is a concave surface. The eighth lens E8 has negative refractive power, an object-side surface S15 thereof is a convex surface, and an image-side surface S16 is a concave surface. The optical filter E9 has an object-side surface S17 and an image-side surface S18. Light from an object sequentially penetrates through each of the surfaces S1 to S18 and is finally imaged on the imaging surface S19.

Table 16 shows a surface type, curvature radius, thickness, material and Conic coefficient of each lens of the optical imaging lens according to embodiment 6. Units of the curvature radius and the thickness are millimeter (mm). Table 17 shows high-order coefficients applied to each aspherical mirror surface in embodiment 6. A surface type of each aspherical surface may be defined by formula (1) given in embodiment 1. Table 18 shows ImgH (ImgH is a half of a diagonal length of an effective pixel region on the imaging surface S19), TTL (TTL is a distance from the object-side surface S1 of the first lens E1 to the imaging surface S19 on the optical axis), a maximum half field of view HFOV, an F-number Fno, a total effective focal length f of the optical imaging lens and effective focal lengths f1 to f8 of each lens in embodiment 6.

TABLE 16

| Surface number | Surface type | Curvature radius | Thickness | Material Refractive index | Abbe number | Conic coefficient |
|---|---|---|---|---|---|---|
| OBJ | Spherical | Infinite | Infinite | | | |
| STO | Spherical | Infinite | −0.5543 | | | |
| S1 | Aspherical | 1.8051 | 0.8034 | 1.54 | 56.11 | 0.0098 |
| S2 | Aspherical | 6.9784 | 0.0939 | | | −15.4061 |
| S3 | Aspherical | 9.1759 | 0.2500 | 1.64 | 23.53 | −89.7526 |
| S4 | Aspherical | 4.4024 | 0.1189 | | | −4.6200 |
| S5 | Aspherical | 4.3549 | 0.2507 | 1.68 | 19.25 | −1.5256 |
| S6 | Aspherical | 4.1516 | 0.2097 | | | −0.9026 |
| S7 | Aspherical | 19.8307 | 0.5392 | 1.55 | 56.11 | 7.4582 |
| S8 | Aspherical | −13.5627 | 0.3986 | | | 3.8601 |
| S9 | Aspherical | −436.0271 | 0.3419 | 1.64 | 23.53 | −99.0000 |
| S10 | Aspherical | −176.3416 | 0.1630 | | | 99.0000 |
| S11 | Aspherical | 8.0718 | 0.4369 | 1.68 | 19.25 | −92.5483 |
| S12 | Aspherical | 9.1138 | 0.2902 | | | 9.2252 |
| S13 | Aspherical | 3.0804 | 0.4661 | 1.54 | 55.87 | −0.6139 |
| S14 | Aspherical | 2.0260 | 0.1787 | | | −0.8011 |
| S15 | Aspherical | 18.9338 | 0.3039 | 1.68 | 19.25 | −1.5773 |
| S16 | Aspherical | 5.2068 | 0.2435 | | | −0.7732 |
| S17 | Spherical | Infinite | 0.2100 | 1.52 | 64.17 | |
| S18 | Spherical | Infinite | 0.1593 | | | |
| S19 | Spherical | Infinite | Infinite | | | |

TABLE 17

| Surface number | A4 | A6 | A8 | A10 | A12 |
|---|---|---|---|---|---|
| S1 | 1.1487E−03 | −1.9242E−02 | 6.8011E−02 | −1.4283E−01 | 1.8128E−01 |
| S2 | −2.3077E−02 | 6.6939E−04 | −3.9138E−03 | 4.2452E−02 | −7.4276E−02 |
| S3 | −1.2562E−02 | 5.9264E−04 | 3.5917E−02 | −6.2679E−02 | 9.4697E−02 |
| S4 | −6.2906E−03 | 1.6391E−03 | −7.9993E−03 | 4.9335E−02 | −1.2098E−01 |
| S5 | −5.4162E−02 | −2.4782E−02 | 6.9456E−02 | −2.6867E−01 | 5.9891E−01 |
| S6 | −4.0284E−02 | 3.2601E−02 | −2.1172E−01 | 7.4369E−01 | −1.5555E+00 |
| S7 | −3.0741E−02 | 8.4424E−03 | −6.0669E−02 | 1.0318E−01 | −7.7629E−02 |
| S8 | −3.3378E−02 | −5.2307E−03 | −4.9308E−03 | −5.2677E−03 | 2.1138E−02 |
| S9 | −3.3775E−02 | 4.3400E−03 | −1.2816E−01 | 3.2216E−01 | −4.2533E−01 |
| S10 | 4.9983E−03 | −1.2244E−01 | 1.3654E−01 | −8.8485E−02 | 3.0810E−02 |
| S11 | 5.5945E−02 | −1.3382E−01 | 1.0454E−01 | −5.8429E−02 | 1.9985E−02 |
| S12 | −1.3004E−02 | −9.7024E−03 | −1.2811E−03 | 2.0205E−03 | −8.2313E−04 |
| S13 | −2.4873E−01 | 9.1054E−02 | −1.9984E−02 | 3.2402E−03 | −4.1731E−04 |
| S14 | −2.1330E−01 | 9.5616E−02 | −3.5899E−02 | 9.5639E−03 | −1.6668E−03 |
| S15 | −1.6032E−02 | 8.1543E−04 | 1.9562E−04 | −2.9520E−05 | 1.9067E−06 |
| S16 | −2.6439E−02 | 3.9156E−03 | −5.7579E−04 | 6.2821E−05 | −3.9497E−06 |

| Surface number | A14 | A16 | A18 | A20 |
|---|---|---|---|---|
| S1 | −1.4343E−01 | 6.8891E−02 | −1.8465E−02 | 2.1107E−03 |
| S2 | 6.2264E−02 | −2.7718E−02 | 5.8501E−03 | −3.3127E−04 |
| S3 | −1.0669E−01 | 7.5269E−02 | −2.8932E−02 | 4.6853E−03 |
| S4 | 1.3617E−01 | −8.8370E−02 | 3.0515E−02 | −4.4701E−03 |
| S5 | −7.9628E−01 | 6.2457E−01 | −2.6575E−01 | 4.6856E−02 |
| S6 | 2.0369E+00 | −1.6016E+00 | 6.9434E−01 | −1.2689E−01 |
| S7 | −5.2865E−02 | 1.4856E−01 | −1.0793E−01 | 2.8257E−02 |
| S8 | −3.4334E−02 | 2.8174E−02 | −1.1904E−02 | 2.1279E−03 |
| S9 | 3.2247E−01 | −1.4222E−01 | 3.3794E−02 | −3.3205E−03 |
| S10 | −3.6991E−03 | −7.4683E−04 | 2.6202E−04 | −2.1356E−05 |
| S11 | −3.7553E−03 | 3.3442E−04 | −5.5666E−06 | −7.1352E−07 |

TABLE 17-continued

| | | | | |
|---|---|---|---|---|
| S12 | 1.9133E−04 | −2.4253E−05 | 1.3983E−06 | −1.8959E−08 |
| S13 | 4.1159E−05 | −2.8000E−06 | 1.1306E−07 | −2.0075E−09 |
| S14 | 1.8354E−04 | −1.2243E−05 | 4.5046E−07 | −7.0043E−09 |
| S15 | −6.7457E−08 | 1.3442E−09 | −1.4143E−11 | 6.1161E−14 |
| S16 | 1.4092E−07 | −2.8448E−09 | 3.0378E−11 | −1.3361E−13 |

TABLE 18

| | | | |
|---|---|---|---|
| ImgH (mm) | 3.93 | f3 (mm) | −261.39 |
| TTL (mm) | 5.46 | f4 (mm) | 14.84 |
| HFOV (°) | 40.7 | f5 (mm) | 459.11 |
| Fno | 1.67 | f6 (mm) | 89.10 |
| f (mm) | 4.54 | f7 (mm) | −13.10 |
| f1 (mm) | 4.23 | f8 (mm) | −10.70 |
| f2 (mm) | −13.40 | | |

Figure 12A:
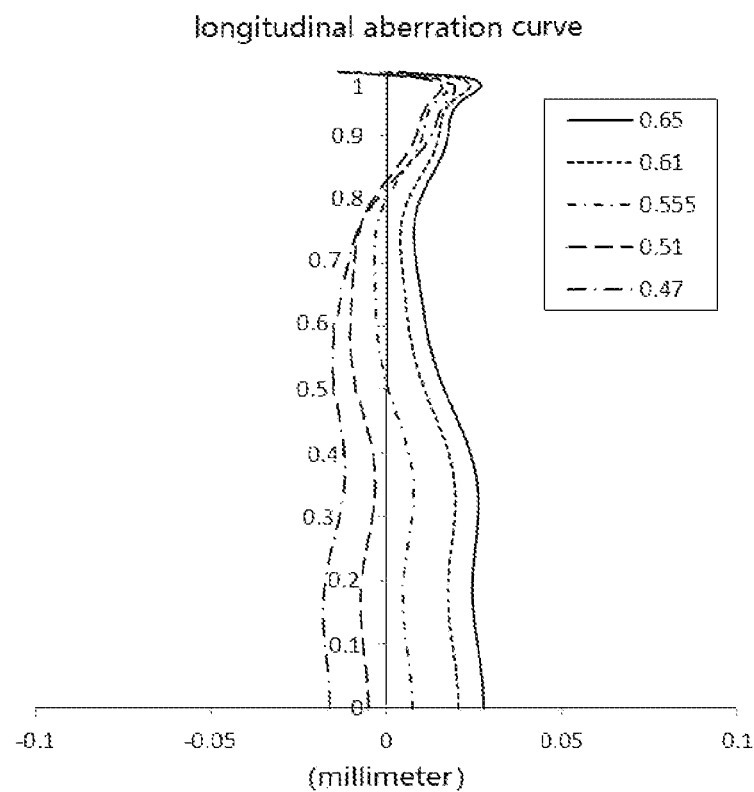
FIG. 12A to FIG. 12D show a longitudinal aberration curve, an astigmatism curve, a distortion curve and a lateral color curve of an optical imaging lens according to embodiment 6 respectively.
Figure 12B:
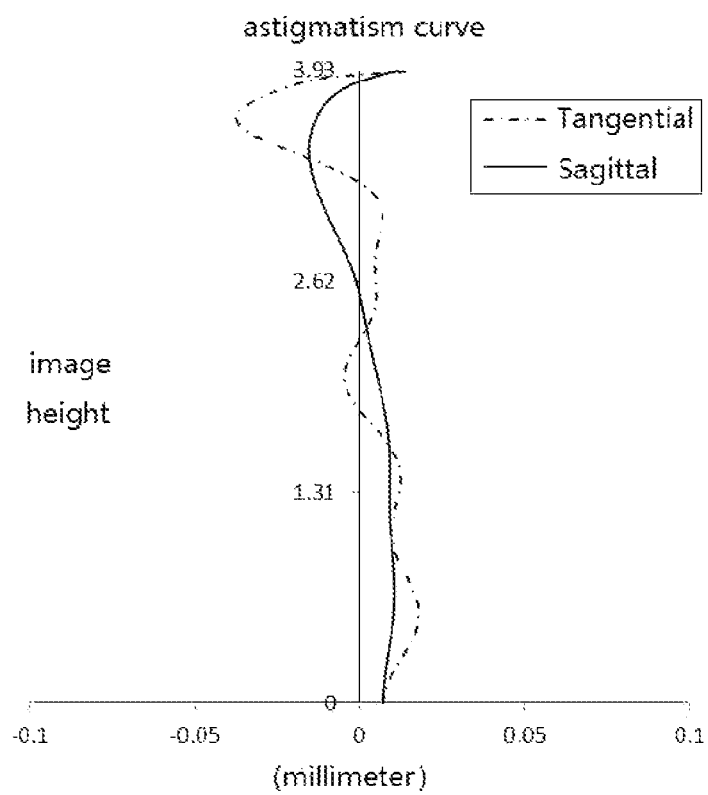
Figure 12C:
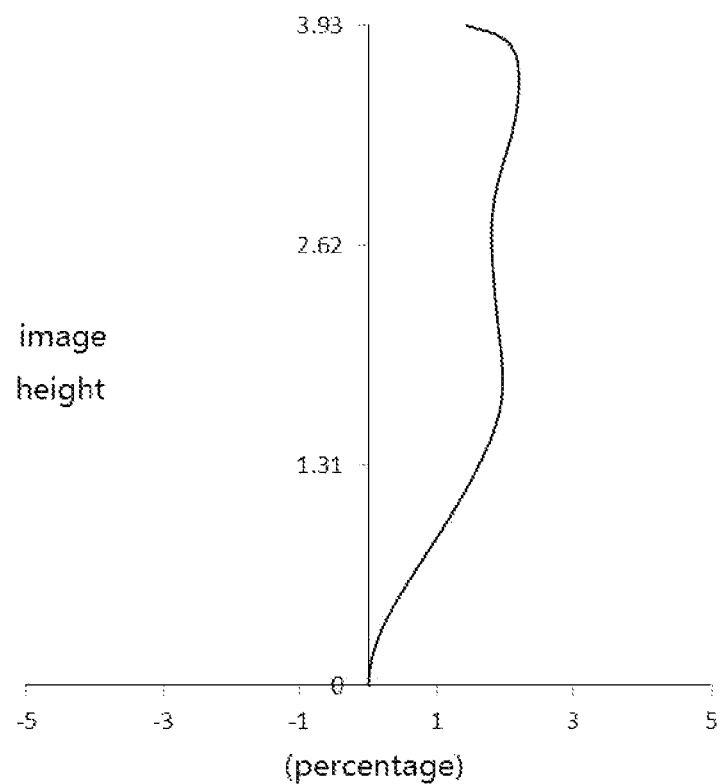
Figure 12D:
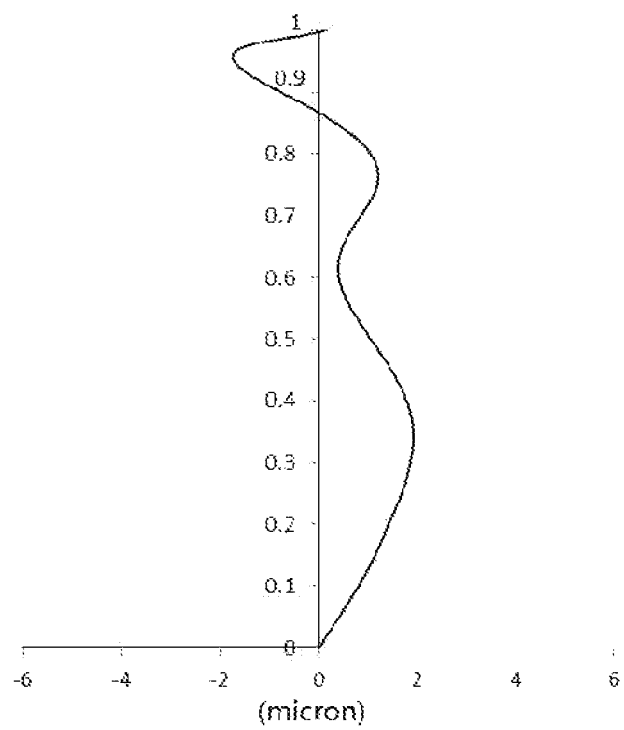

FIG. 12A shows a longitudinal aberration curve of the optical imaging lens according to embodiment 6 to represent deviation of a convergence focal point after light with different wavelengths passes through the lens. FIG. 12B shows an astigmatism curve of the optical imaging lens according to embodiment 6 to represent a meridian image surface curvature and a sagittal image surface curvature. FIG. 12C shows a distortion curve of the optical imaging lens according to embodiment 6 to represent distortion values corresponding to different image heights. FIG. 12D shows a lateral color curve of the optical imaging lens according to embodiment 6 to represent deviation of different image heights on the imaging surface after the light passes through the lens. According to FIG. 12A to FIG. 12D, it can be seen that the optical imaging lens provided in embodiment 6 may achieve high imaging quality.

Embodiment 7

Figure 13:
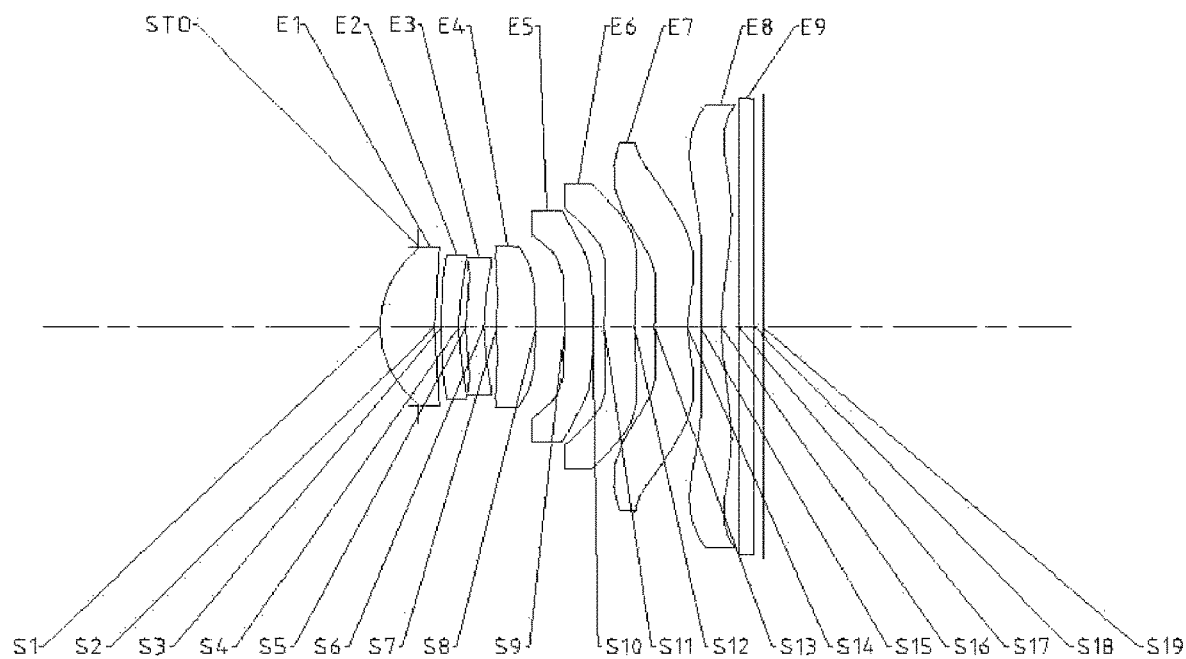
FIG. 13 shows a structure diagram of an optical imaging lens according to embodiment 7 of the disclosure.

An optical imaging lens according to embodiment 7 of the disclosure is described below with reference to FIG. 13 to FIG. 14D. FIG. 13 shows a structure diagram of an optical imaging lens according to embodiment 7 of the disclosure.

As shown in FIG. 13, the optical imaging lens according to an exemplary implementation mode of the disclosure sequentially includes, from an object side to an image side along an optical axis, a diaphragm STO, a first lens E1, a first lens E2, a third lens E3, a fourth lens E4, a fifth lens E5, a sixth lens E6, a seventh lens E7, an eighth lens E8, an optical filter E9 and an imaging surface S19.

The first lens E1 has positive refractive power, an object-side surface S1 thereof is a convex surface, and an image-side surface S2 is a concave surface. The second lens E2 has negative refractive power, an object-side surface S3 thereof is a convex surface, and an image-side surface S4 is a concave surface. The third lens E3 has positive refractive power, an object-side surface S5 thereof is a convex surface, and an image-side surface S6 is a concave surface. The fourth lens E4 has positive refractive power, an object-side surface S7 thereof is a convex surface, and an image-side surface S8 is a convex surface. The fifth lens E5 has negative refractive power, an object-side surface S9 thereof is a concave surface, and an image-side surface S10 is a convex surface. The sixth lens E6 has negative refractive power, an object-side surface S11 thereof is a convex surface, and an image-side surface S12 is a concave surface. The seventh lens E7 has negative refractive power, an object-side surface S13 thereof is a convex surface, and an image-side surface S14 is a concave surface. The eighth lens E8 has negative refractive power, an object-side surface S15 thereof is a convex surface, and an image-side surface S16 is a concave surface. The optical filter E9 has an object-side surface S17 and an image-side surface S18. Light from an object sequentially penetrates through each of the surfaces S1 to S18 and is finally imaged on the imaging surface S19.

Table 19 shows a surface type, curvature radius, thickness, material and Conic coefficient of each lens of the optical imaging lens according to embodiment 7. Units of the curvature radius and the thickness are millimeter (mm). Table 20 shows high-order coefficients applied to each aspherical mirror surface in embodiment 7. A surface type of each aspherical surface may be defined by formula (1) given in embodiment 1. Table 21 shows ImgH (ImgH is a half of a diagonal length of an effective pixel region on the imaging surface S19), TTL (TTL is a distance from the object-side surface S1 of the first lens E1 to the imaging surface S19 on the optical axis), a maximum half field of view HFOV, an F-number Fno, a total effective focal length f of the optical imaging lens and effective focal lengths f1 to f8 of each lens in embodiment 7.

TABLE 19

| | | | | Material | | |
|---|---|---|---|---|---|---|
| Surface number | Surface type | Curvature radius | Thickness | Refractive index | Abbe number | Conic coefficient |
| OBJ | Spherical | Infinite | Infinite | | | |
| STO | Spherical | Infinite | −0.5543 | | | |
| S1 | Aspherical | 1.8086 | 0.7907 | 1.54 | 56.11 | 0.0220 |
| S2 | Aspherical | 7.5541 | 0.0921 | | | −12.1360 |
| S3 | Aspherical | 9.8836 | 0.2500 | 1.64 | 23.53 | −82.8401 |
| S4 | Aspherical | 4.0295 | 0.1025 | | | −5.4032 |
| S5 | Aspherical | 3.9967 | 0.2584 | 1.68 | 19.25 | −3.9716 |
| S6 | Aspherical | 3.9212 | 0.1914 | | | −1.0823 |
| S7 | Aspherical | 14.1942 | 0.5621 | 1.55 | 56.11 | 99.0000 |
| S8 | Aspherical | −11.9795 | 0.4079 | | | −14.1475 |
| S9 | Aspherical | −123.6642 | 0.3961 | 1.64 | 23.53 | 99.0000 |
| S10 | Aspherical | −200.9093 | 0.1671 | | | −99.0000 |
| S11 | Aspherical | 9.0740 | 0.4319 | 1.68 | 19.25 | −99.0000 |
| S12 | Aspherical | 8.7819 | 0.2897 | | | 9.7504 |
| S13 | Aspherical | 3.0624 | 0.4734 | 1.54 | 55.87 | −0.5624 |
| S14 | Aspherical | 2.0156 | 0.1903 | | | −0.7820 |

TABLE 19-continued

| Surface number | Surface type | Curvature radius | Thickness | Material Refractive index | Abbe number | Conic coefficient |
|---|---|---|---|---|---|---|
| S15 | Aspherical | 19.6952 | 0.3000 | 1.68 | 19.25 | 5.8727 |
| S16 | Aspherical | 5.5641 | 0.2603 | | | −0.5657 |
| S17 | Spherical | Infinite | 0.2100 | 1.52 | 64.17 | |
| S18 | Spherical | Infinite | 0.1251 | | | |
| S19 | Spherical | Infinite | Infinite | | | |

TABLE 20

| Surface number | A4 | A6 | A8 | A10 | A12 |
|---|---|---|---|---|---|
| S1 | 1.1509E−03 | −1.9298E−02 | 6.8275E−02 | −1.4352E−01 | 1.8234E−01 |
| S2 | −2.1597E−02 | 6.0603E−04 | −3.4278E−03 | 3.5968E−02 | −6.0880E−02 |
| S3 | −1.2723E−02 | 6.0401E−04 | 3.6839E−02 | −6.4696E−02 | 9.8367E−02 |
| S4 | −6.4590E−03 | 1.7053E−03 | −8.4335E−03 | 5.2705E−02 | −1.3096E−01 |
| S5 | −5.4449E−02 | −2.4979E−02 | 7.0192E−02 | −2.7224E−01 | 6.0846E−01 |
| S6 | −4.0648E−02 | 3.3043E−02 | −2.1557E−01 | 7.6060E−01 | −1.5981E+00 |
| S7 | −3.0481E−02 | 8.3357E−03 | −5.9649E−02 | 1.0102E−01 | −7.5679E−02 |
| S8 | −3.3874E−02 | −5.3479E−03 | −5.0786E−02 | −5.4659E−03 | 2.2095E−02 |
| S9 | −3.5332E−02 | 4.6436E−03 | −1.4025E−01 | 3.6060E−01 | −4.8693E−01 |
| S10 | 4.9066E−03 | −1.1908E−01 | 1.3158E−01 | −8.4483E−02 | 2.9146E−02 |
| S11 | 5.5544E−02 | −1.3238E−01 | 1.0304E−01 | −5.7388E−02 | 1.9558E−02 |
| S12 | −1.2519E−02 | −9.1646E−03 | −1.1873E−02 | 1.8374E−03 | −7.3442E−04 |
| S13 | −2.5458E−01 | 9.4285E−02 | −2.0935E−02 | 3.4341E−03 | −4.4745E−04 |
| S14 | −2.2354E−01 | 1.0258E−01 | −3.9429E−02 | 1.0753E−02 | −1.9185E−03 |
| S15 | −7.1846E−03 | −2.4304E−03 | 7.3243E−04 | −7.9653E−05 | 4.7139E−06 |
| S16 | −1.7359E−02 | 1.5213E−03 | −2.5507E−04 | 3.6422E−05 | −2.5500E−06 |

| Surface number | A14 | A16 | A18 | A20 |
|---|---|---|---|---|
| S1 | −1.4441E−01 | 6.9427E−02 | −1.8626E−02 | 2.1313E−03 |
| S2 | 4.9370E−02 | −2.1261E−02 | 4.3411E−03 | −2.3780E−04 |
| S3 | −1.1153E−01 | 7.9184E−02 | −3.0630E−02 | 4.9919E−03 |
| S4 | 1.4936E−01 | −9.8224E−02 | 3.4369E−02 | −5.1016E−03 |
| S5 | −8.1110E−01 | 6.3787E−01 | −2.7213E−01 | 4.8108E−02 |
| S6 | 2.1020E+00 | −1.6602E+00 | 7.2301E−01 | −1.3273E−01 |
| S7 | −5.1319E−02 | 1.4361E−01 | −1.0389E−01 | 2.7084E−02 |
| S8 | −3.6155E−02 | 2.9888E−02 | −1.2722E−02 | 2.2909E−03 |
| S9 | 3.7760E−01 | −1.7032E−01 | 4.1395E−02 | −4.1602E−03 |
| S10 | −3.4670E−03 | −6.9353E−04 | 2.4108E−04 | −1.9468E−05 |
| S11 | −3.6619E−03 | 3.2494E−04 | −5.3893E−06 | −6.8832E−07 |
| S12 | 1.6750E−04 | −2.0832E−05 | 1.1784E−06 | −1.5677E−08 |
| S13 | 4.4648E−05 | −3.0728E−06 | 1.2553E−07 | −2.2550E−09 |
| S14 | 2.1627E−04 | −1.4769E−05 | 5.5628E−07 | −8.8548E−09 |
| S15 | −1.6266E−07 | 3.2502E−09 | −3.4825E−11 | 1.5479E−13 |
| S16 | 9.4100E−08 | −1.9036E−09 | 2.0062E−11 | −8.6392E−14 |

TABLE 21

| | | | |
|---|---|---|---|
| ImgH (mm) | 3.93 | f3 (mm) | 800.46 |
| TTL (mm) | 5.50 | f4 (mm) | 11.99 |
| HFOV (°) | 40.5 | f5 (mm) | −500.00 |
| Fno | 1.68 | f6 (mm) | −999.85 |
| f (mm) | 4.56 | f7 (mm) | −13.04 |
| f1 (mm) | 5.15 | f8 (mm) | −11.54 |
| f2 (mm) | −10.73 | | |

Figure 14A:
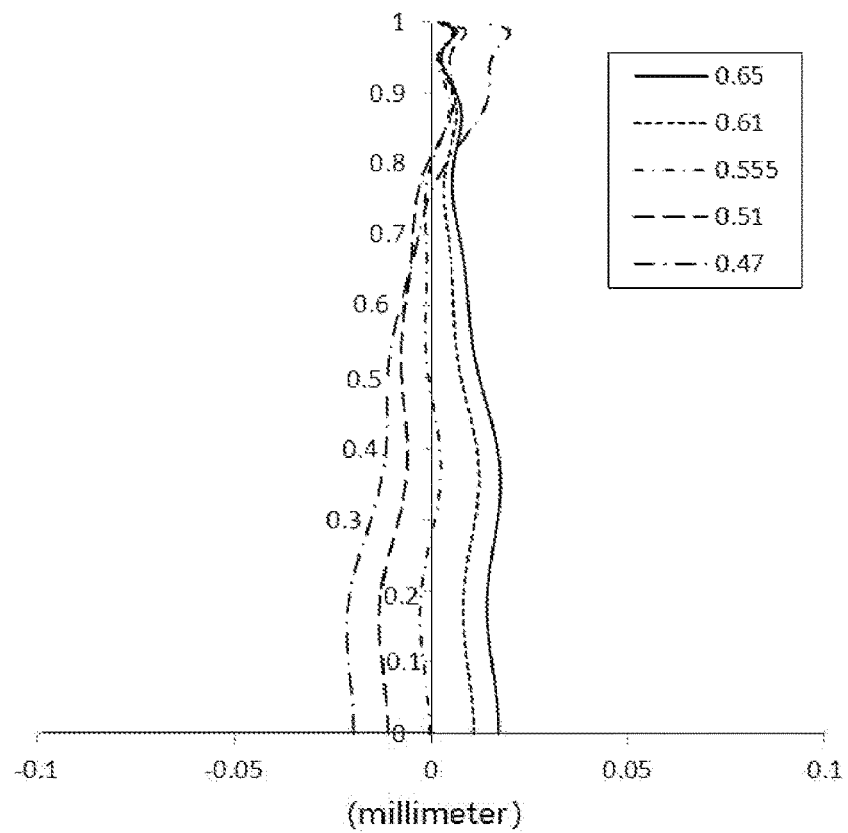
FIG. 14A to FIG. 14D show a longitudinal aberration curve, an astigmatism curve, a distortion curve and a lateral color curve of an optical imaging lens according to embodiment 7 respectively.
Figure 14B:
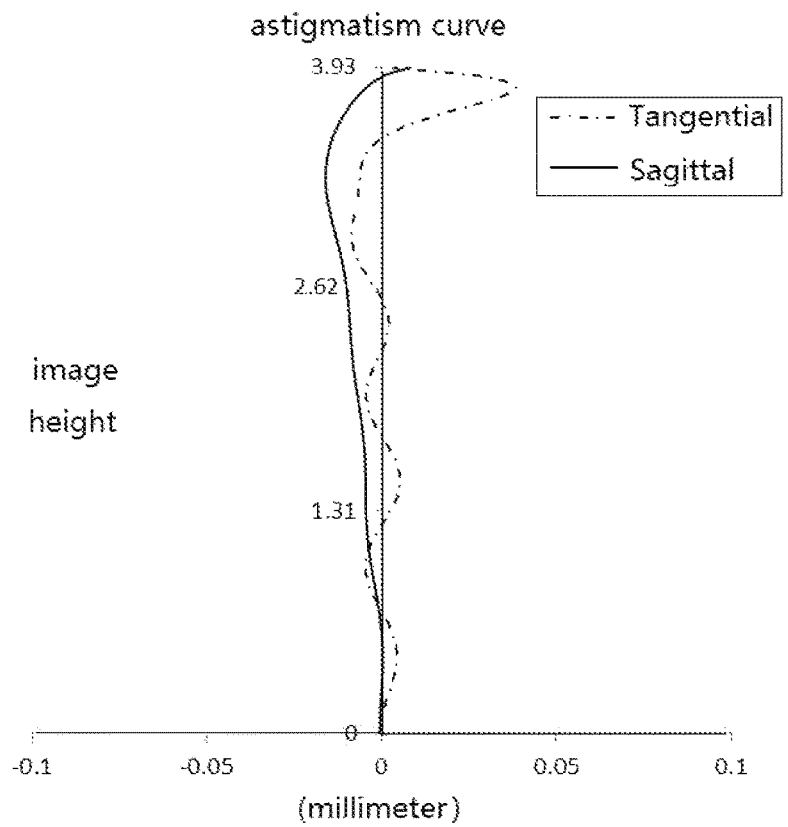
Figure 14C:
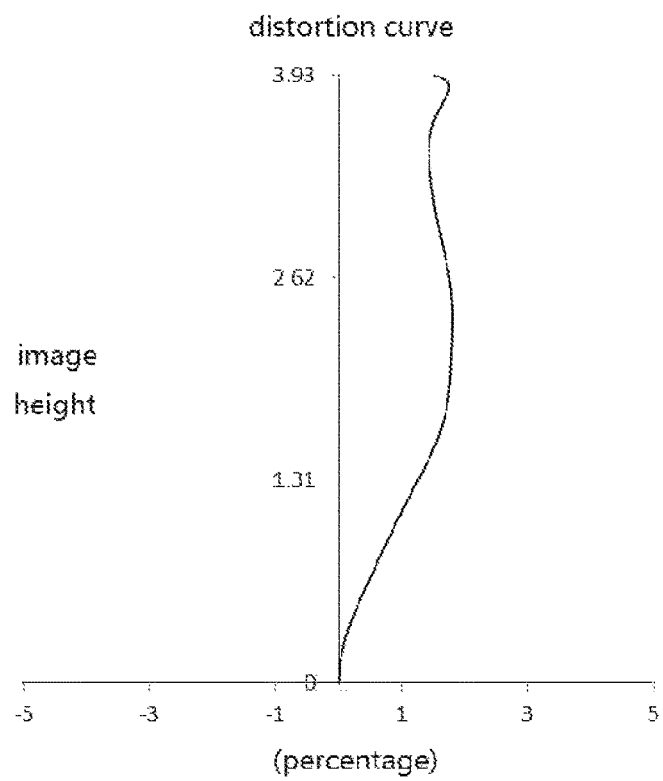
Figure 14D:
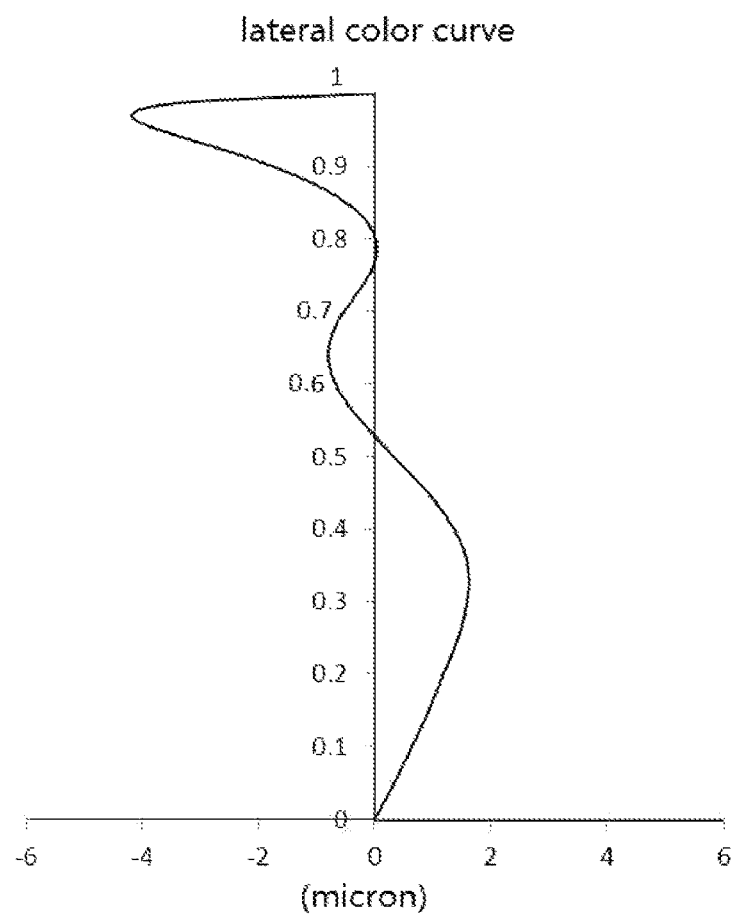

FIG. 14A shows a longitudinal aberration curve of the optical imaging lens according to embodiment 7 to represent deviation of a convergence focal point after light with different wavelengths passes through the lens. FIG. 14B shows an astigmatism curve of the optical imaging lens according to embodiment 7 to represent a meridian image surface curvature and a sagittal image surface curvature. FIG. 14C shows a distortion curve of the optical imaging lens according to embodiment 7 to represent distortion values corresponding to different image heights. FIG. 14D shows a lateral color curve of the optical imaging lens according to embodiment 7 to represent deviation of different image heights on the imaging surface after the light passes through the lens. According to FIG. 14A to FIG. 14D, it can be seen that the optical imaging lens provided in embodiment 7 may achieve high imaging quality.

Embodiment 8

Figure 15:
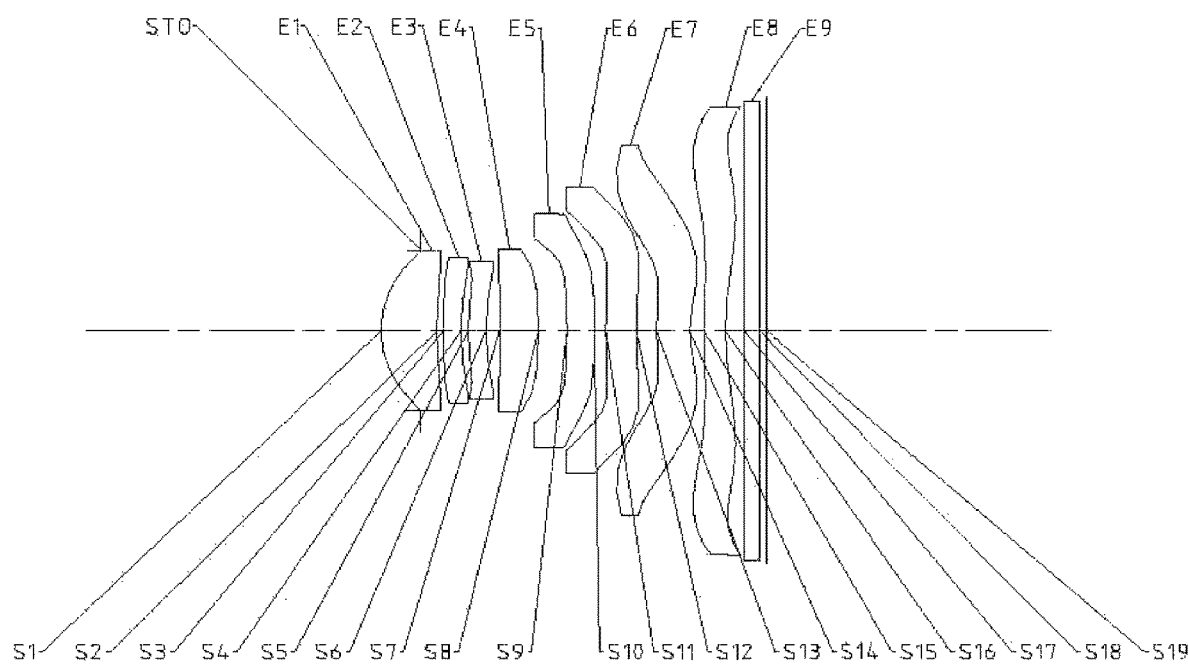
FIG. 15 shows a structure diagram of an optical imaging lens according to embodiment 8 of the disclosure.

An optical imaging lens according to embodiment 8 of the disclosure is described below with reference to FIG. 15 to FIG. 16D. FIG. 15 shows a structure diagram of an optical imaging lens according to embodiment 8 of the disclosure.

As shown in FIG. 15, the optical imaging lens according to an exemplary implementation mode of the disclosure sequentially includes, from an object side to an image side along an optical axis, a diaphragm STO, a first lens E1, a first lens E2, a third lens E3, a fourth lens E4, a fifth lens E5, a sixth lens E6, a seventh lens E7, an eighth lens E8, an optical filter E9 and an imaging surface S19.

The first lens E1 has positive refractive power, an object-side surface S1 thereof is a convex surface, and an image-side surface S2 is a concave surface. The second lens E2 has negative refractive power, an object-side surface S3 thereof is a convex surface, and an image-side surface S4 is a concave surface. The third lens E3 has negative refractive power, an object-side surface S5 thereof is a convex surface, and an image-side surface S6 is a concave surface. The fourth lens E4 has positive refractive power, an object-side surface S7 thereof is a convex surface, and an image-side surface S8 is a convex surface. The fifth lens E5 has negative refractive power, an object-side surface S9 thereof is a concave surface, and an image-side surface S10 is a convex surface. The sixth lens E6 has negative refractive power, an object-side surface S11 thereof is a convex surface, and an image-side surface S12 is a concave surface. The seventh lens E7 has negative refractive power, an object-side surface S13 thereof is a convex surface, and an image-side surface S14 is a concave surface. The eighth lens E8 has negative refractive power, an object-side surface S15 thereof is a convex surface, and an image-side surface S16 is a concave surface. The optical filter E9 has an object-side surface S17 and an image-side surface S18. Light from an object sequentially penetrates through each of the surfaces S1 to S18 and is finally imaged on the imaging surface S19.

Table 22 shows a surface type, curvature radius, thickness, material and Conic coefficient of each lens of the optical imaging lens according to embodiment 8. Units of the curvature radius and the thickness are millimeter (mm). Table 23 shows high-order coefficients applied to each aspherical mirror surface in embodiment 8. A surface type of each aspherical surface may be defined by formula (1) given in embodiment 1. Table 24 shows ImgH (ImgH is a half of a diagonal length of an effective pixel region on the imaging surface S19), TTL (TTL is a distance from the object-side surface S1 of the first lens E1 to the imaging surface S19 on the optical axis), a maximum half field of view HFOV, an F-number Fno, a total effective focal length f of the optical imaging lens and effective focal lengths f1 to f8 of each lens in embodiment 8.

TABLE 22

| Surface number | Surface type | Curvature radius | Thickness | Material Refractive index | Abbe number | Conic coefficient |
|---|---|---|---|---|---|---|
| OBJ | Spherical | Infinite | Infinite | | | |
| STO | Spherical | Infinite | −0.5543 | | | |
| S1 | Aspherical | 1.8073 | 0.7963 | 1.54 | 56.11 | 0.0229 |
| S2 | Aspherical | 7.4951 | 0.0924 | | | −12.6964 |
| S3 | Aspherical | 9.8432 | 0.2500 | 1.64 | 23.53 | −82.8316 |
| S4 | Aspherical | 4.1365 | 0.1051 | | | −4.5692 |
| S5 | Aspherical | 4.1156 | 0.2517 | 1.68 | 19.25 | −3.5763 |
| S6 | Aspherical | 3.9539 | 0.1921 | | | −1.3189 |
| S7 | Aspherical | 14.4964 | 0.5574 | 1.55 | 56.11 | 99.0000 |
| S8 | Aspherical | −12.1855 | 0.4050 | | | −10.0907 |
| S9 | Aspherical | −123.6643 | 0.3954 | 1.64 | 23.53 | 99.0000 |
| S10 | Aspherical | −200.9093 | 0.1667 | | | −99.0000 |
| S11 | Aspherical | 9.0345 | 0.4334 | 1.68 | 19.25 | −99.0000 |
| S12 | Aspherical | 8.7429 | 0.2875 | | | 9.3249 |
| S13 | Aspherical | 3.0437 | 0.4736 | 1.54 | 55.87 | −0.5860 |
| S14 | Aspherical | 2.0120 | 0.2078 | | | −0.7876 |
| S15 | Aspherical | 20.1463 | 0.3000 | 1.68 | 19.25 | 7.2972 |
| S16 | Aspherical | 5.6988 | 0.2760 | | | −0.4499 |
| S17 | Spherical | Infinite | 0.2100 | 1.52 | 64.17 | |
| S18 | Spherical | Infinite | 0.0989 | | | |
| S19 | Spherical | Infinite | Infinite | | | |

TABLE 23

| Surface number | A4 | A6 | A8 | A10 | A12 |
|---|---|---|---|---|---|
| S1 | 1.1489E−03 | −1.9246E−02 | 6.8031E−02 | −1.4288E−01 | 1.8136E−01 |
| S2 | −2.1835E−02 | 6.1607E−04 | −3.5037E−03 | 3.6967E−02 | −6.2914E−02 |
| S3 | −1.2747E−02 | 6.0575E−04 | 3.6981E−02 | −6.5007E−02 | 9.8935E−02 |
| S4 | −6.5113E−03 | 1.7261E−03 | −8.5706E−03 | 5.3778E−02 | −1.3416E−01 |
| S5 | −5.4787E−02 | −2.5212E−02 | 7.1067E−02 | −2.7648E−01 | 6.1987E−01 |
| S6 | −4.0816E−02 | 3.3249E−02 | −2.1736E−01 | 7.6850E−01 | −1.6180E+00 |
| S7 | −3.0340E−02 | 8.2779E−03 | −5.9099E−02 | 9.9856E−02 | −7.4634E−02 |
| S8 | −3.3768E−02 | −5.3227E−03 | −5.0467E−03 | −5.4231E−03 | 2.1888E−02 |
| S9 | −3.5316E−02 | 4.6405E−03 | −1.4013E−01 | 3.6019E−01 | −4.8627E−01 |
| S10 | 4.8682E−03 | −1.1769E−01 | 1.2953E−01 | −8.2839E−02 | 2.8467E−02 |
| S11 | 5.5088E−02 | −1.3075E−01 | 1.0136E−01 | −5.6216E−02 | 1.9080E−02 |
| S12 | −1.2501E−02 | −9.1449E−03 | −1.1839E−03 | 1.8308E−03 | −7.3127E−04 |
| S13 | −2.4962E−01 | 9.1544E−02 | −2.0127E−02 | 3.2693E−03 | −4.2181E−04 |
| S14 | −2.1960E−01 | 9.9887E−02 | −3.8053E−02 | 1.0286E−02 | −1.8190E−03 |
| S15 | −7.1962E−03 | −2.4685E−03 | 7.5858E−04 | −8.4147E−05 | 5.0635E−06 |
| S16 | −1.6259E−02 | 1.0916E−03 | −1.6595E−04 | 2.6566E−05 | −1.9403E−06 |

| Surface number | A14 | A16 | A18 | A20 |
|---|---|---|---|---|
| S1 | −1.4351E−01 | 6.8932E−02 | −1.8477E−02 | 2.1123E−03 |
| S2 | 5.1300E−02 | −2.2213E−02 | 4.5604E−03 | −2.5119E−04 |

TABLE 23-continued

| | | | | |
|---|---|---|---|---|
| S3 | −1.1228E−01 | 7.9793E−02 | −3.0896E−02 | 5.0400E−03 |
| S4 | 1.5364E−01 | −1.0144E−01 | 3.5639E−02 | −5.3115E−03 |
| S5 | −8.2887E−01 | 6.5387E−01 | −2.7982E−01 | 4.9620E−02 |
| S6 | 2.1327E+00 | −1.6879E+00 | 7.3660E−01 | −1.3550E−01 |
| S7 | −5.0494E−02 | 1.4097E−01 | −1.0175E−01 | 2.6464E−02 |
| S8 | −3.5760E−02 | 2.9515E−02 | −1.2544E−02 | 2.2552E−03 |
| S9 | 3.7700E−01 | −1.7002E−01 | 4.1312E−02 | −4.1508E−03 |
| S10 | −3.3729E−03 | −6.7206E−04 | 2.3269E−04 | −1.8718E−05 |
| S11 | −3.5576E−03 | 3.1439E−04 | −5.1928E−06 | −6.6048E−07 |
| S12 | 1.6666E−04 | −2.0712E−05 | 1.1709E−06 | −1.5565E−08 |
| S13 | 4.1678E−05 | −2.8404E−06 | 1.1489E−07 | −2.0438E−09 |
| S14 | 2.0324E−04 | −1.3756E−05 | 5.1356E−07 | −8.1025E−09 |
| S15 | −1.7704E−07 | 3.5761E−09 | −3.8677E−11 | 1.7338E−13 |
| S16 | 7.2335E−08 | −1.4586E−09 | 1.5224E−11 | −6.4688E−14 |

TABLE 24

| | | | |
|---|---|---|---|
| ImgH (mm) | 3.93 | f3 (mm) | −400.06 |
| TTL (mm) | 5.50 | f4 (mm) | 12.22 |
| HFOV (°) | 40.5 | f5 (mm) | −500.00 |
| Fno | 1.68 | f6 (mm) | −1000.08 |
| f (mm) | 4.56 | f7 (mm) | −13.17 |
| f1 (mm) | 4.16 | f8 (mm) | −11.93 |
| f2 (mm) | −11.26 | | |

Figure 16A:
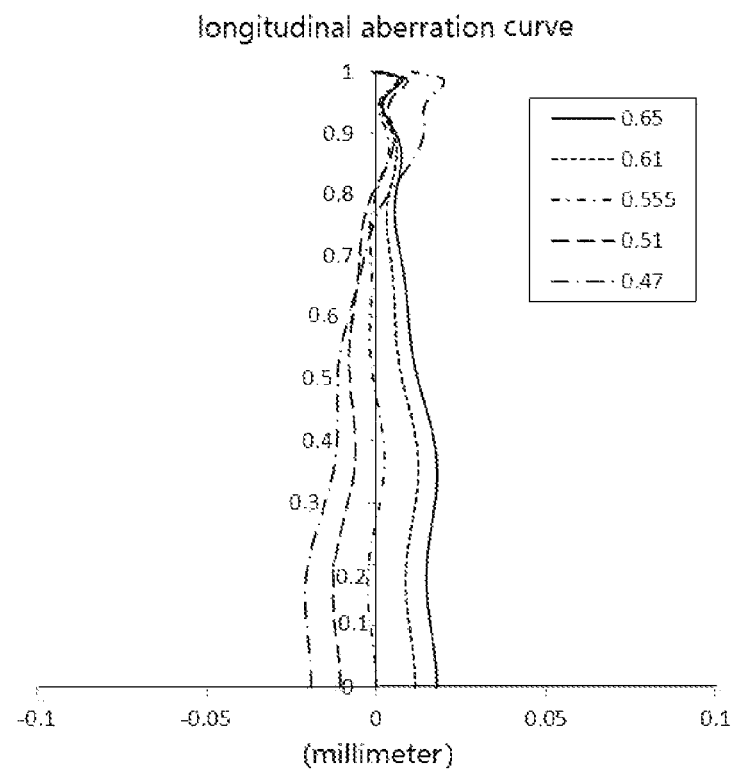
FIG. 16A to FIG. 16D show a longitudinal aberration curve, an astigmatism curve, a distortion curve and a lateral color curve of an optical imaging lens according to embodiment 8 respectively.
Figure 16B:
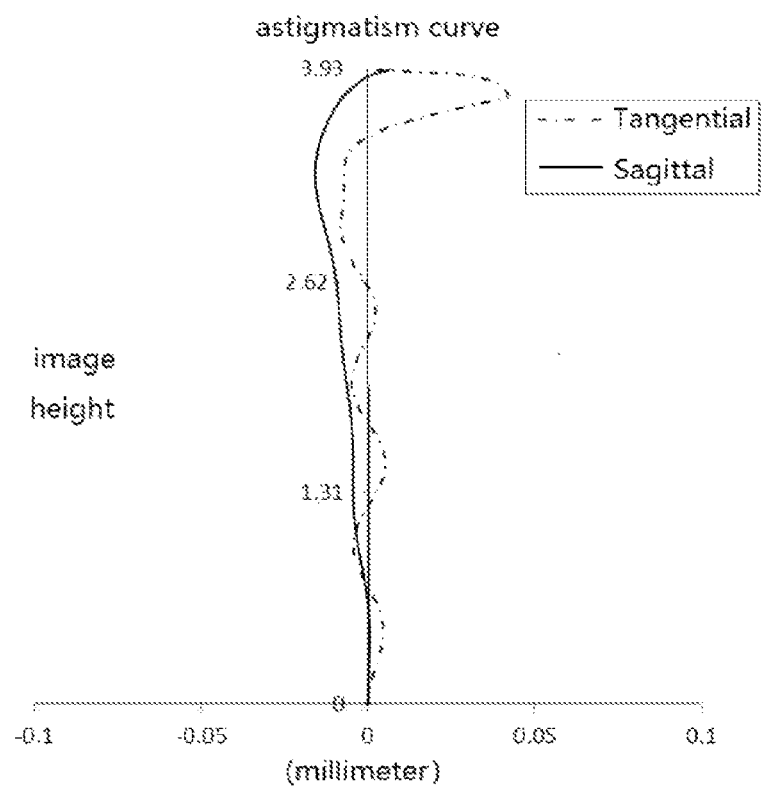
Figure 16C:
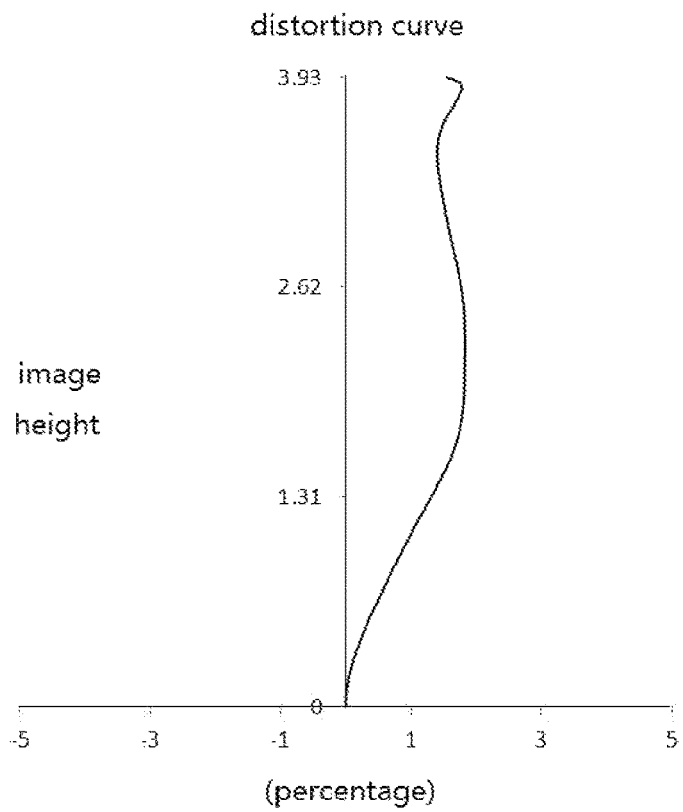
Figure 16D:
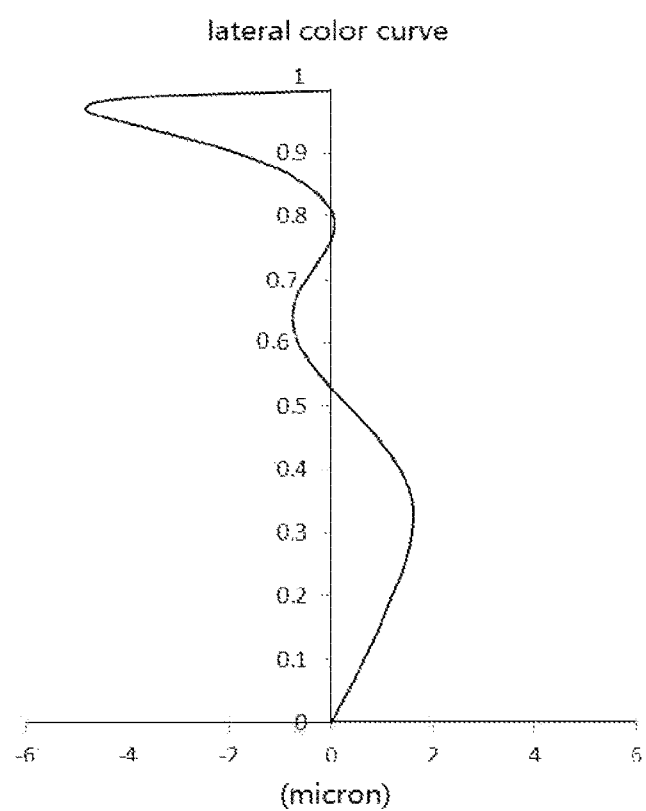

FIG. 16A shows a longitudinal aberration curve of the optical imaging lens according to embodiment 8 to represent deviation of a convergence focal point after light with different wavelengths passes through the lens. FIG. 16B shows an astigmatism curve of the optical imaging lens according to embodiment 8 to represent a meridian image surface curvature and a sagittal image surface curvature. FIG. 16C shows a distortion curve of the optical imaging lens according to embodiment 8 to represent distortion values corresponding to different image heights. FIG. 16D shows a lateral color curve of the optical imaging lens according to embodiment 8 to represent deviation of different image heights on the imaging surface after the light passes through the lens. According to FIG. 16A to FIG. 16D, it can be seen that the optical imaging lens provided in embodiment 8 may achieve high imaging quality.

Embodiment 9

Figure 17:
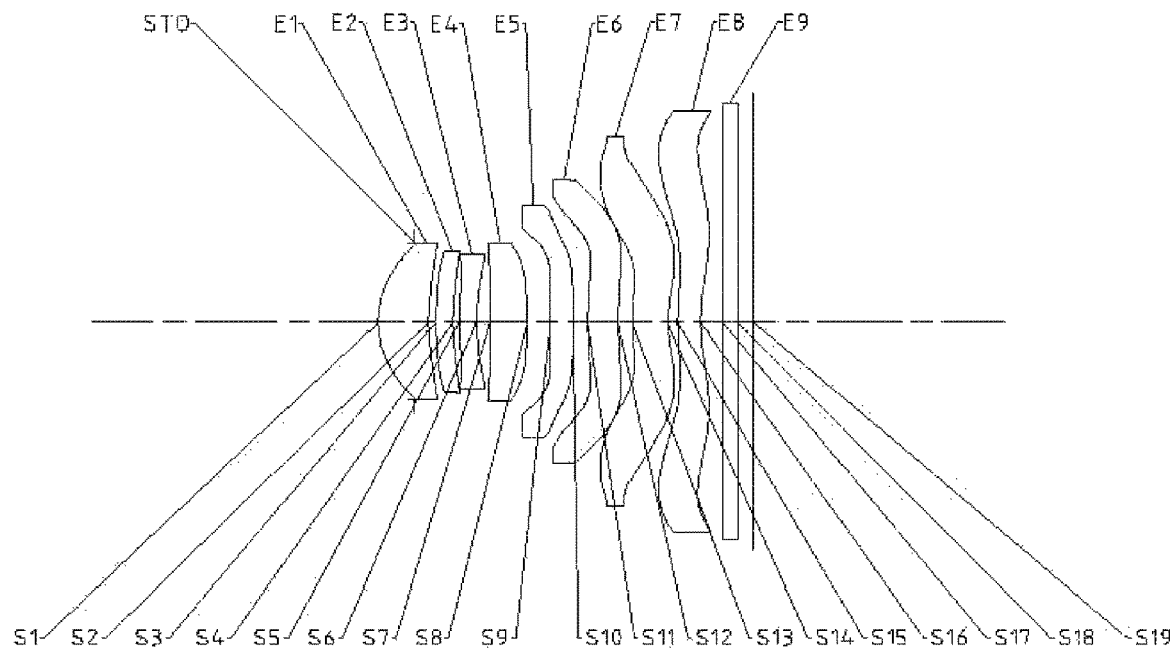
FIG. 17 shows a structure diagram of an optical imaging lens according to embodiment 9 of the disclosure.

An optical imaging lens according to embodiment 9 of the disclosure is described below with reference to FIG. 17 to FIG. 18D. FIG. 17 shows a structure diagram of an optical imaging lens according to embodiment 9 of the disclosure.

As shown in FIG. 17, the optical imaging lens according to an exemplary implementation mode of the disclosure sequentially includes, from an object side to an image side along an optical axis, a diaphragm STO, a first lens E1, a first lens E2, a third lens E3, a fourth lens E4, a fifth lens E5, a sixth lens E6, a seventh lens E7, an eighth lens E8, an optical filter E9 and an imaging surface S19.

The first lens E1 has positive refractive power, an object-side surface S1 thereof is a convex surface, and an image-side surface S2 is a concave surface. The second lens E2 has positive refractive power, an object-side surface S3 thereof is a convex surface, and an image-side surface S4 is a concave surface. The third lens E3 has negative refractive power, an object-side surface S5 thereof is a convex surface, and an image-side surface S6 is a concave surface. The fourth lens E4 has positive refractive power, an object-side surface S7 thereof is a convex surface, and an image-side surface S8 is a convex surface. The fifth lens E5 has positive refractive power, an object-side surface S9 thereof is a convex surface, and an image-side surface S10 is a concave surface. The sixth lens E6 has positive refractive power, an object-side surface S11 thereof is a convex surface, and an image-side surface S12 is a concave surface. The seventh lens E7 has negative refractive power, an object-side surface S13 thereof is a convex surface, and an image-side surface S14 is a concave surface. The eighth lens E8 has negative refractive power, an object-side surface S15 thereof is a convex surface, and an image-side surface S16 is a concave surface. The optical filter E9 has an object-side surface S17 and an image-side surface S18. Light from an object sequentially penetrates through each of the surfaces S1 to S18 and is finally imaged on the imaging surface S19.

Table 25 shows a surface type, curvature radius, thickness, material and Conic coefficient of each lens of the optical imaging lens according to embodiment 9. Units of the curvature radius and the thickness are millimeter (mm). Table 26 shows high-order coefficients applied to each aspherical mirror surface in embodiment 9. A surface type of each aspherical surface may be defined by formula (1) given in embodiment 1. Table 27 shows ImgH (ImgH is a half of a diagonal length of an effective pixel region on the imaging surface S19), TTL (TTL is a distance from the object-side surface S1 of the first lens E1 to the imaging surface S19 on the optical axis), a maximum half field of view HFOV, an F-number Fno, a total effective focal length f of the optical imaging lens and effective focal lengths f1 to f8 of each lens in embodiment 9.

TABLE 25

| | | | | Material | | |
|---|---|---|---|---|---|---|
| Surface number | Surface type | Curvature radius | Thickness | Refractive index | Abbe number | Conic coefficient |
| OBJ | Spherical | Infinite | Infinite | | | |
| STO | Spherical | Infinite | −0.5300 | | | |
| S1 | Aspherical | 1.8280 | 0.7283 | 1.54 | 56.11 | −0.0676 |
| S2 | Aspherical | 3.9206 | 0.1033 | | | −16.6582 |
| S3 | Aspherical | 4.8113 | 0.2514 | 1.64 | 23.53 | −43.6296 |
| S4 | Aspherical | 4.7571 | 0.0902 | | | −5.7785 |
| S5 | Aspherical | 4.7503 | 0.2500 | 1.68 | 19.25 | 0.4049 |
| S6 | Aspherical | 3.8066 | 0.2002 | | | −1.3580 |

TABLE 25-continued

| Surface number | Surface type | Curvature radius | Thickness | Material Refractive index | Abbe number | Conic coefficient |
|---|---|---|---|---|---|---|
| S7 | Aspherical | 12.9468 | 0.5412 | 1.55 | 56.11 | 66.3153 |
| S8 | Aspherical | −13.2043 | 0.3342 | | | −26.7727 |
| S9 | Aspherical | 17.9715 | 0.3137 | 1.64 | 23.53 | 25.2249 |
| S10 | Aspherical | 26.9362 | 0.2093 | | | 98.7678 |
| S11 | Aspherical | 6.8515 | 0.4384 | 1.68 | 19.25 | 0.5499 |
| S12 | Aspherical | 7.1380 | 0.2100 | | | 4.9484 |
| S13 | Aspherical | 2.5968 | 0.5070 | 1.54 | 55.87 | −0.8020 |
| S14 | Aspherical | 1.8314 | 0.1518 | | | −0.8255 |
| S15 | Aspherical | 5.0007 | 0.3289 | 1.68 | 19.25 | −21.7297 |
| S16 | Aspherical | 3.4705 | 0.3250 | | | −1.1027 |
| S17 | Spherical | Infinite | 0.2100 | 1.52 | 64.17 | |
| S18 | Spherical | Infinite | 0.2408 | | | |
| S19 | Spherical | Infinite | Infinite | | | |

TABLE 26

| Surface number | A4 | A6 | A8 | A10 | A12 |
|---|---|---|---|---|---|
| S1 | 1.1130E−03 | −1.8352E−02 | 6.3852E−02 | −1.3200E−01 | 1.6491E−01 |
| S2 | −2.2225E−02 | 6.3264E−04 | −3.6299E−03 | 3.8638E−02 | −6.6343E−02 |
| S3 | −1.3246E−02 | 6.4167E−04 | 3.9933E−02 | −7.1558E−02 | 1.1102E−01 |
| S4 | −6.2872E−03 | 1.6377E−03 | −7.9908E−02 | 4.9269E−02 | −1.2078E−01 |
| S5 | −5.3115E−02 | −2.4067E−02 | 6.6796E−02 | −2.5587E−01 | 5.6483E−01 |
| S6 | −3.9223E−02 | 3.1321E−02 | −2.0072E−01 | 6.9567E−01 | −1.4358E+00 |
| S7 | −3.1296E−02 | 8.6722E−03 | −6.2881E−02 | 1.0791E−01 | −8.1912E−02 |
| S8 | −3.6943E−02 | −6.0908E−03 | −6.0403E−02 | −6.7890E−03 | 2.8660E−02 |
| S9 | −3.4308E−02 | 4.4431E−03 | −1.3224E−01 | 3.3503E−01 | −4.4579E−01 |
| S10 | 5.4098E−03 | −1.3787E−01 | 1.5996E−01 | −1.0784E−01 | 3.9065E−02 |
| S11 | 5.9853E−02 | −1.4808E−01 | 1.1965E−01 | −6.9173E−02 | 2.4472E−02 |
| S12 | −1.3446E−02 | −1.0200E−02 | −1.3695E−03 | 2.1963E−03 | −9.0980E−04 |
| S13 | −2.7086E−01 | 1.0347E−01 | −2.3698E−02 | 4.0098E−03 | −5.3891E−04 |
| S14 | −2.4218E−01 | 1.1568E−01 | −4.6282E−02 | 1.3138E−02 | −2.4398E−03 |
| S15 | −5.4410E−02 | 1.1298E−02 | −1.1796E−03 | 7.5292E−05 | −2.9485E−06 |
| S16 | −5.8189E−02 | 1.1893E−02 | −1.8006E−03 | 1.9160E−04 | −1.2615E−05 |

| Surface number | A14 | A16 | A18 | A20 |
|---|---|---|---|---|
| S1 | −1.2844E−01 | 6.0724E−02 | −1.6021E−02 | 1.8027E−03 |
| S2 | 5.4576E−02 | −2.3842E−02 | 4.9383E−03 | −−2.7442E−04 |
| S3 | −1.2843E−01 | 9.3042E−02 | −3.6724E−02 | 6.1068E−03 |
| S4 | 1.3591E−01 | −8.8181E−02 | 3.0442E−02 | −4.4582E−03 |
| S5 | −7.4367E−01 | 5.7764E−01 | −2.4340E−01 | 4.2498E−02 |
| S6 | 1.8552E+00 | −1.4394E+00 | 6.1574E−01 | −1.1104E−01 |
| S7 | −5.6283E−02 | 1.5959E−01 | −1.1699E−01 | 3.0903E−02 |
| S8 | −4.8976E−02 | 4.2280E−02 | −1.8795E−02 | 3.5344E−03 |
| S9 | 3.4064E−01 | −1.5141E−01 | 3.6262E−02 | −3.5910E−03 |
| S10 | −4.8794E−03 | −1.0249E−03 | 3.7409E−04 | −3.1721E−05 |
| S11 | −4.7563E−03 | 4.3811E−04 | −7.5429E−06 | −1.0000E−06 |
| S12 | 2.1504E−04 | −2.7716E−05 | 1.6248E−06 | −2.2401E−08 |
| S13 | 5.5467E−05 | −3.9377E−06 | 1.6592E−07 | −3.0744E−09 |
| S14 | 2.8628E−04 | −2.0349E−05 | 7.9779E−07 | −1.3218E−08 |
| S15 | 7.0769E−08 | −1.0187E−09 | 8.1189E−12 | −2.7731E−14 |
| S16 | 4.9433E−07 | −1.1224E−08 | 1.3642E−10 | −6.8709E−13 |

TABLE 27

| | | | |
|---|---|---|---|
| ImgH (mm) | 3.93 | f3 (mm) | −31.67 |
| TTL (mm) | 5.43 | f4 (mm) | 12.06 |
| HFOV (°) | 42.0 | f5 (mm) | 82.64 |
| Fno | 1.60 | f6 (mm) | 155.71 |
| f (mm) | 4.31 | f7 (mm) | −15.06 |
| f1 (mm) | 5.59 | f8 (mm) | −18.33 |
| f2 (mm) | 800.28 | | |

Figure 18A:
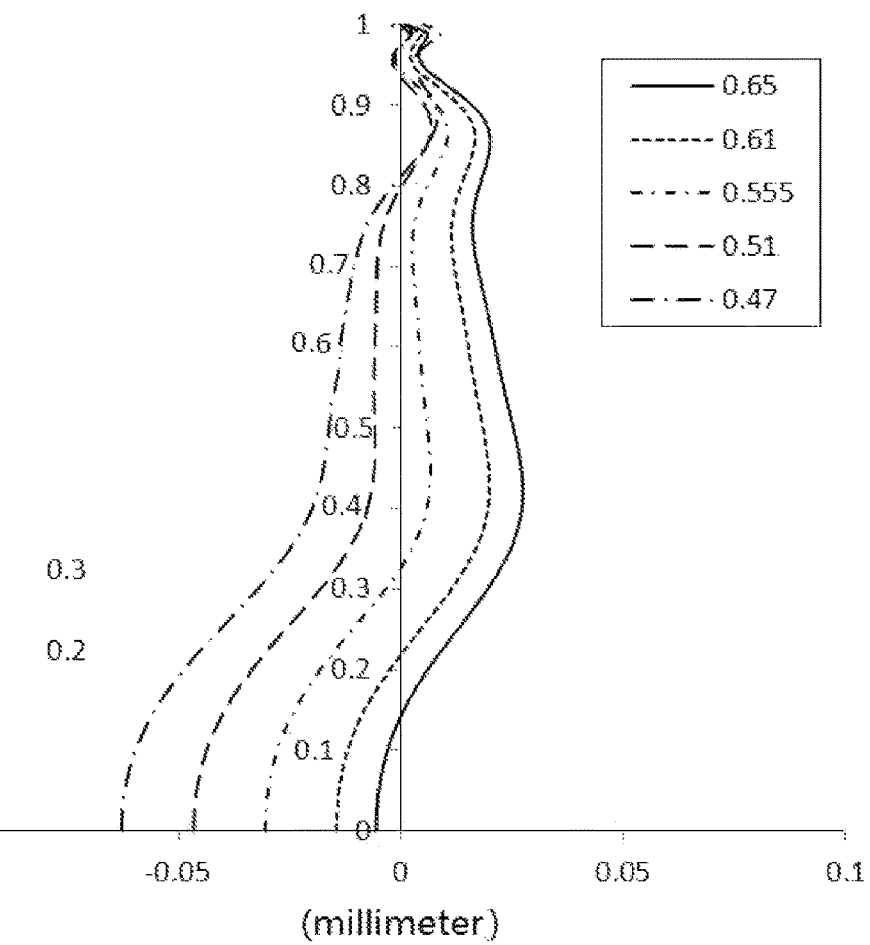
FIG. 18A to FIG. 18D show a longitudinal aberration curve, an astigmatism curve, a distortion curve and a lateral color curve of an optical imaging lens according to embodiment 9 respectively.
Figure 18B:
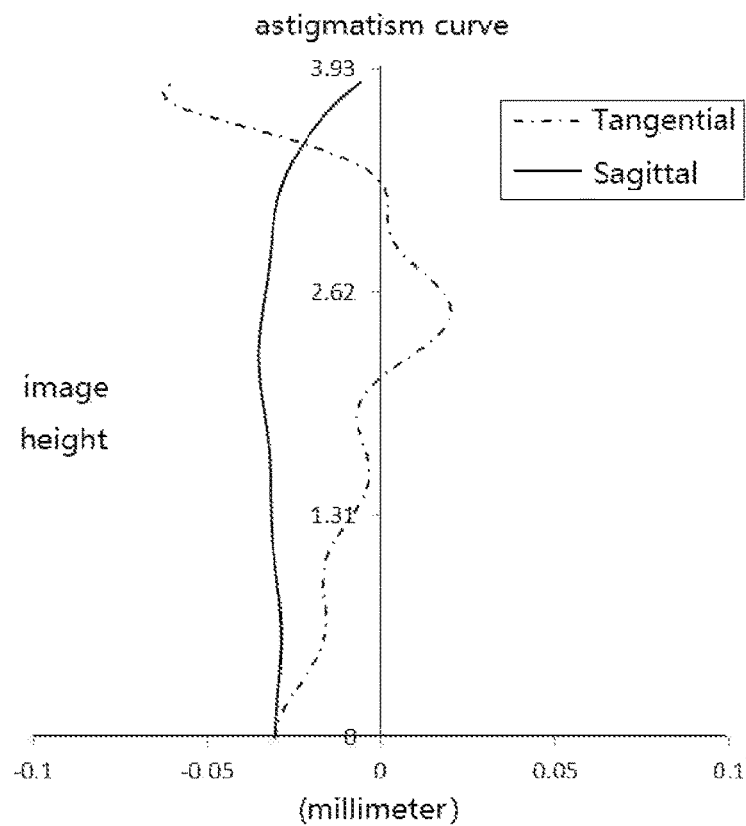
Figure 18C:
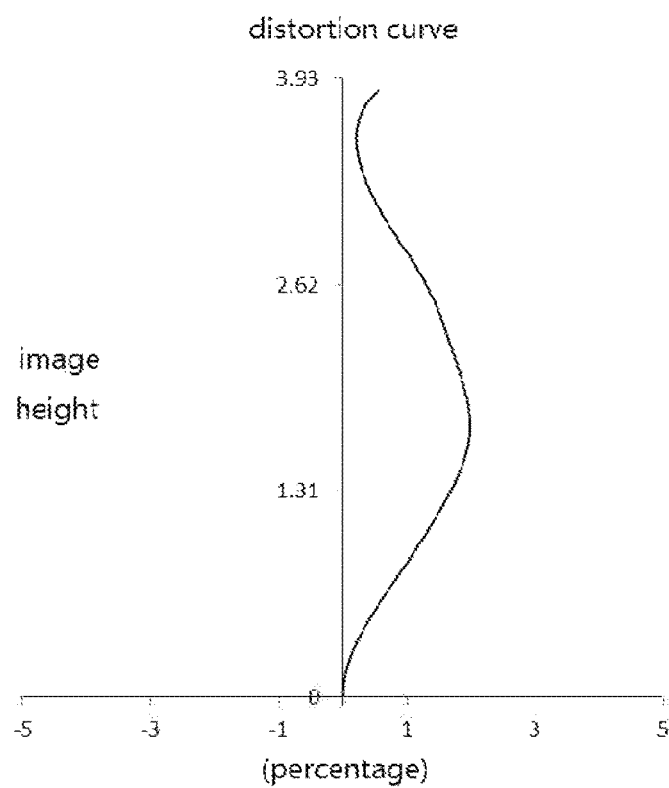
Figure 18D:
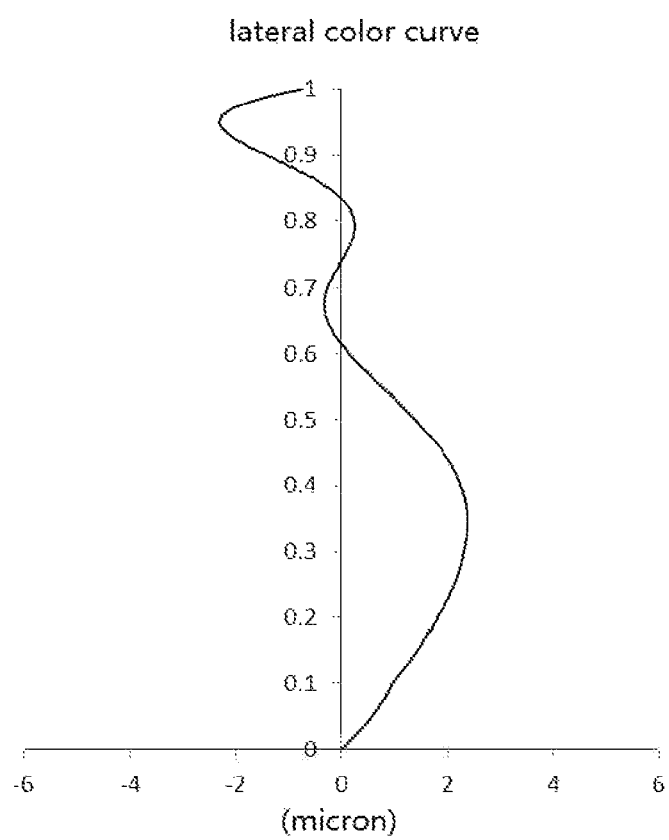

FIG. 18A shows a longitudinal aberration curve of the optical imaging lens according to embodiment 9 to represent deviation of a convergence focal point after light with different wavelengths passes through the lens. FIG. 18B shows an astigmatism curve of the optical imaging lens according to embodiment 9 to represent a meridian image surface curvature and a sagittal image surface curvature. FIG. 18C shows a distortion curve of the optical imaging lens according to embodiment 9 to represent distortion values corresponding to different image heights. FIG. 18D shows a lateral color curve of the optical imaging lens according to embodiment 9 to represent deviation of different image heights on the imaging surface after the light passes through the lens. According to FIG. 18A to FIG. 18D, it can be seen that the optical imaging lens provided in embodiment 9 may achieve high imaging quality.

From the above, embodiment 1 to embodiment 9 meet a relationship shown in Table 27 respectively.

TABLE 28

| Conditional expression | embodiment | | | | | | | | |
|---|---|---|---|---|---|---|---|---|---|
| | 1 | 2 | 3 | 4 | 5 | 6 | 7 | 8 | 9 |
| \| f4/f1 \| | 2.46 | 2.48 | 2.52 | 2.47 | 2.49 | 3.51 | 2.33 | 2.94 | 2.16 |
| f/f7 | −0.29 | −0.29 | −0.29 | −0.29 | −0.29 | −0.35 | −0.35 | −0.35 | −0.29 |
| R1/f | 0.42 | 0.42 | 0.42 | 0.42 | 0.42 | 0.40 | 0.40 | 0.40 | 0.42 |
| (R13 − R14)/(R13 + R14) | 0.17 | 0.17 | 0.17 | 0.17 | 0.17 | 0.21 | 0.21 | 0.20 | 0.17 |
| \| R4/R3 \| | 0.63 | 0.63 | 0.59 | 0.59 | 0.58 | 0.48 | 0.41 | 0.42 | 0.99 |
| CT5/CT1 | 0.35 | 0.40 | 0.40 | 0.42 | 0.42 | 0.43 | 0.50 | 0.50 | 0.43 |
| TTL/ImgH | 1.38 | 1.38 | 1.38 | 1.38 | 1.38 | 1.39 | 1.40 | 1.40 | 1.38 |
| (T12 + T23 + T34)/T45 | 1.16 | 1.16 | 1.16 | 1.14 | 1.14 | 1.06 | 0.95 | 0.96 | 1.18 |
| CT8/f | 0.07 | 0.07 | 0.07 | 0.07 | 0.07 | 0.07 | 0.07 | 0.07 | 0.08 |
| DT32/DT81 | 0.28 | 0.26 | 0.27 | 0.28 | 0.29 | 0.27 | 0.28 | 0.27 | 0.29 |
| T56*f*tan(HFOV) (mm$^2$) | 0.80 | 0.81 | 0.81 | 0.81 | 0.81 | 0.64 | 0.65 | 0.65 | 0.81 |
| ΣCT/TTL | 0.61 | 0.62 | 0.62 | 0.62 | 0.62 | 0.62 | 0.63 | 0.63 | 0.62 |

The disclosure also provides an imaging device, of which an electronic photosensitive element may be a Charge Coupled Device (CCD) or a Complementary Metal Oxide Semiconductor (CMOS). The imaging device may be an independent imaging device such as a digital camera, and may also be an imaging module integrated into a mobile electronic device such as a mobile phone. The imaging device is provided with the abovementioned optical imaging lens.

The above description is only description about the preferred embodiments of the disclosure and adopted technical principles. It is understood by those skilled in the art that the scope of invention involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens, sequentially comprising, from an object side to an image side along an optical axis, a first lens, a second lens, a third lens, a fourth lens, a fifth lens, a sixth lens, a seventh lens and an eighth lens with refractive power, wherein
    an object-side surface of the first lens is a convex surface;
    the fourth lens has positive refractive power;
    the seventh lens has negative refractive power, and an object-side surface thereof is a convex surface;
    there is an air space between any two adjacent lenses in the first lens to the eighth lens; and
    an effective focal length f1 of the first lens and an effective focal length f4 of the fourth lens meet 1.7<|f4/f1|<4;
    a spacing distance T12 between the first lens and the second lens on the optical axis, a spacing distance T23 between the second lens and the third lens on the optical axis, a spacing distance T34 between the third lens and the fourth lens on the optical axis and a spacing distance T45 between the fourth lens and the fifth lens on the optical axis meet 0.5<(T12+T23+T34)/T45<1.5.

2. The optical imaging lens as claimed in claim 1, wherein a total effective focal length f of the optical imaging lens and an effective focal length f7 of the seventh lens meet −1<f/f7<0.

3. The optical imaging lens as claimed in claim 1, wherein a total effective focal length f of the optical imaging lens and a curvature radius R1 of the object-side surface of the first lens meet 0<R1/f<1.

4. The optical imaging lens as claimed in claim 1, wherein a curvature radius R13 of the object-side surface of the seventh lens and a curvature radius R14 of an image-side surface of the seventh lens meet 0<(R13−R14)/(R13+R14)<0.5.

5. The optical imaging lens as claimed in claim 1, wherein a curvature radius R3 of an object-side surface of the second lens and a curvature radius R4 of an image-side surface of the second lens meet 0<|R4/R3|<1.5.

6. The optical imaging lens as claimed in claim 1, wherein a center thickness CT1 of the first lens on the optical axis and a center thickness CT5 of the fifth lens on the optical axis meet 0<CT5/CT1<1.

7. The optical imaging lens as claimed in claim 1, wherein a total effective focal length f of the optical imaging lens and a center thickness CT8 of the eighth lens on the optical axis meet 0<CT8/f<0.5.

8. The optical imaging lens as claimed in claim 1, wherein a maximum effective semi-diameter DT32 of an image-side surface of the third lens and a maximum effective semi-diameter DT81 of an object-side surface of the eighth lens meet 0<DT32/DT81<0.5.

9. The optical imaging lens as claimed in claim 1, wherein a total effective focal length f of the optical imaging lens, a spacing distance T56 between the fifth lens and the sixth lens on the optical axis and a maximum half field of view HFOV of the optical imaging lens meet 0.5 mm$^2$<T56*f*tan(HFOV)<1 mm$^2$.

10. The optical imaging lens as claimed in claim 1, wherein TTL is a distance from the object-side surface of the first lens to an imaging surface of the optical imaging lens on the optical axis, ImgH is a half of a diagonal length of an effective pixel region on the imaging surface of the optical imaging lens, TTL and ImgH meet TTL/ImgH<1.6.

11. The optical imaging lens as claimed in claim 1, wherein TTL is a distance from the object-side surface of the first lens to the imaging surface of the optical imaging lens on the optical axis, a sum ΣAT of center thicknesses of the first lens to the eighth lens on the optical axis and TTL meet 0.5≤ΣCT/TTL<0.8.

* * * * *